(12) United States Patent
Tippery et al.

(10) Patent No.: US 10,932,450 B2
(45) Date of Patent: *Mar. 2, 2021

(54) FULL LIVESTOCK SYSTEM

(71) Applicant: RealmFive, Inc., Lincoln, NE (US)

(72) Inventors: Steve R. Tippery, Gretna, NE (US); Brant Burkey, Denton, NE (US); Kyle Gerber, Lincoln, NE (US)

(73) Assignee: REALMFIVE, INC., Lincoln, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/390,736

(22) Filed: Apr. 22, 2019

(65) Prior Publication Data
US 2019/0289826 A1 Sep. 26, 2019

Related U.S. Application Data

(63) Continuation-in-part of application No. 15/384,132, filed on Dec. 19, 2016, now Pat. No. 10,149,422.
(Continued)

(51) Int. Cl.
*A01K 29/00* (2006.01)
*A01K 11/00* (2006.01)
(Continued)

(52) U.S. Cl.
CPC .......... *A01K 29/005* (2013.01); *A01K 11/008* (2013.01); *G06N 20/20* (2019.01); *G06Q 50/02* (2013.01)

(58) Field of Classification Search
CPC .... A01K 11/008; A01K 29/005; G06N 20/20; G06Q 50/02
See application file for complete search history.

(56) References Cited

U.S. PATENT DOCUMENTS 3,186,493 A 6/1965 Barry
3,841,717 A 10/1974 Parisotto et al.
(Continued)

FOREIGN PATENT DOCUMENTS

GB 1052808 A 12/1966
WO 2014134218 A1 9/2014

OTHER PUBLICATIONS

Mittek, Mateusz et al., "Health Monitoring of Group-Housed Pigs using Depth-Enabled Multi-Object Tracking", http://homepages.inf.ed.ac.uk/rbf/VAIB16PAPERS/vaibmittek.pdf, 4 pages.
(Continued)

*Primary Examiner* — Mussa A Shaawat
(74) *Attorney, Agent, or Firm* — Suiter Swantz pc llo

(57) ABSTRACT

A livestock management system is disclosed. The system includes a gantry assembly and a controller. The gantry assembly includes a support assembly including one or more work tool rails and one or more support structures. The gantry assembly further includes one or more propulsion units disposed on one or more support rails within a livestock facility and configured to provide movement of the support assembly along the one or more support rails. The gantry assembly further includes one or more work tool assemblies actuatable along the one or more work tool rails so to provide one or more work tool attachments selective access within the livestock facility. The controller may be configured to actuate the support assembly to along the one or more support rails and further configured to actuate the one or more work tool assemblies to along the one or more work tool rails.

34 Claims, 60 Drawing Sheets

Related U.S. Application Data

(60) Provisional application No. 62/660,844, filed on Apr. 20, 2018, provisional application No. 62/368,080, filed on Jul. 28, 2016, provisional application No. 62/335,260, filed on May 12, 2016, provisional application No. 62/319,861, filed on Apr. 8, 2016, provisional application No. 62/269,800, filed on Dec. 18, 2015, provisional application No. 62/269,770, filed on Dec. 18, 2015.

(51) Int. Cl.
*G06N 20/20* (2019.01)
*G06Q 50/02* (2012.01)

(56) References Cited

U.S. PATENT DOCUMENTS

| | | | |
|---|---|---|---|
| 4,683,969 A | | 8/1987 | Littau |
| 4,704,851 A | | 11/1987 | Manor |
| 4,735,365 A | | 4/1988 | Smeller et al. |
| 5,348,226 A | | 9/1994 | Heiniger et al. |
| 7,650,737 B1 | * | 1/2010 | Lovett .................... A01D 57/02 56/220 |
| 9,538,696 B2 | * | 1/2017 | Katupitiya ............ B62D 15/027 |
| 10,149,422 B2 | | 12/2018 | Tippery et al. |
| 2002/0158765 A1 | * | 10/2002 | Pape .................... A01K 11/006 340/573.3 |
| 2004/0061606 A1 | * | 4/2004 | Gronvold ........... G08B 21/0227 340/539.11 |
| 2007/0088194 A1 | * | 4/2007 | Tahar .................... A01K 11/007 600/102 |
| 2007/0288249 A1 | * | 12/2007 | Rowe ..................... A01K 29/00 705/7.11 |
| 2008/0046130 A1 | * | 2/2008 | Faivre .................. A01G 25/092 700/284 |
| 2012/0095652 A1 | * | 4/2012 | Anderson ................. G06F 7/00 701/50 |
| 2014/0121807 A1 | * | 5/2014 | Jung .................... G06Q 10/087 700/115 |
| 2014/0182519 A1 | * | 7/2014 | Tupin, Jr. ............. A01K 27/009 119/859 |
| 2014/0259897 A1 | * | 9/2014 | Godbole ................. B05B 15/68 47/1.5 |
| 2015/0053436 A1 | * | 2/2015 | Thompson ............... A01B 3/64 172/23 |
| 2015/0237791 A1 | * | 8/2015 | Bassett ................ A01B 51/023 172/3 |
| 2015/0251309 A1 | | 12/2015 | Gaus |
| 2015/0351309 A1 | * | 12/2015 | Gaus ..................... A01B 76/00 172/1 |
| 2016/0042038 A1 | * | 2/2016 | Schumacher ..... G06F 16/24575 707/722 |
| 2017/0156288 A1 | * | 6/2017 | Singh .................... A01K 11/004 |
| 2017/0325399 A1 | * | 11/2017 | Heinrich .................. A01C 7/06 |
| 2018/0255705 A1 | * | 9/2018 | Keski-Luopa ........ A01D 34/008 |
| 2019/0053470 A1 | * | 2/2019 | Singh .................... A01K 11/006 |

OTHER PUBLICATIONS

Psota, Eric T. et al., "Multi-Pig Part Detection and Association with a Fully-Convolutional Network", Sensors 2019, 19, 852; doi: 10.3390/s19040852, https://www.mdpi.com/1424-8220/19/4/852/htm, pp. 1-24.
International Search Report and Written Opinion dated Apr. 21, 2017 for PCT/US2016/067625.
Chinese Office Action for Chinese Application No. 2016800804077 dated Nov. 23, 2020, 12 pages.

\* cited by examiner

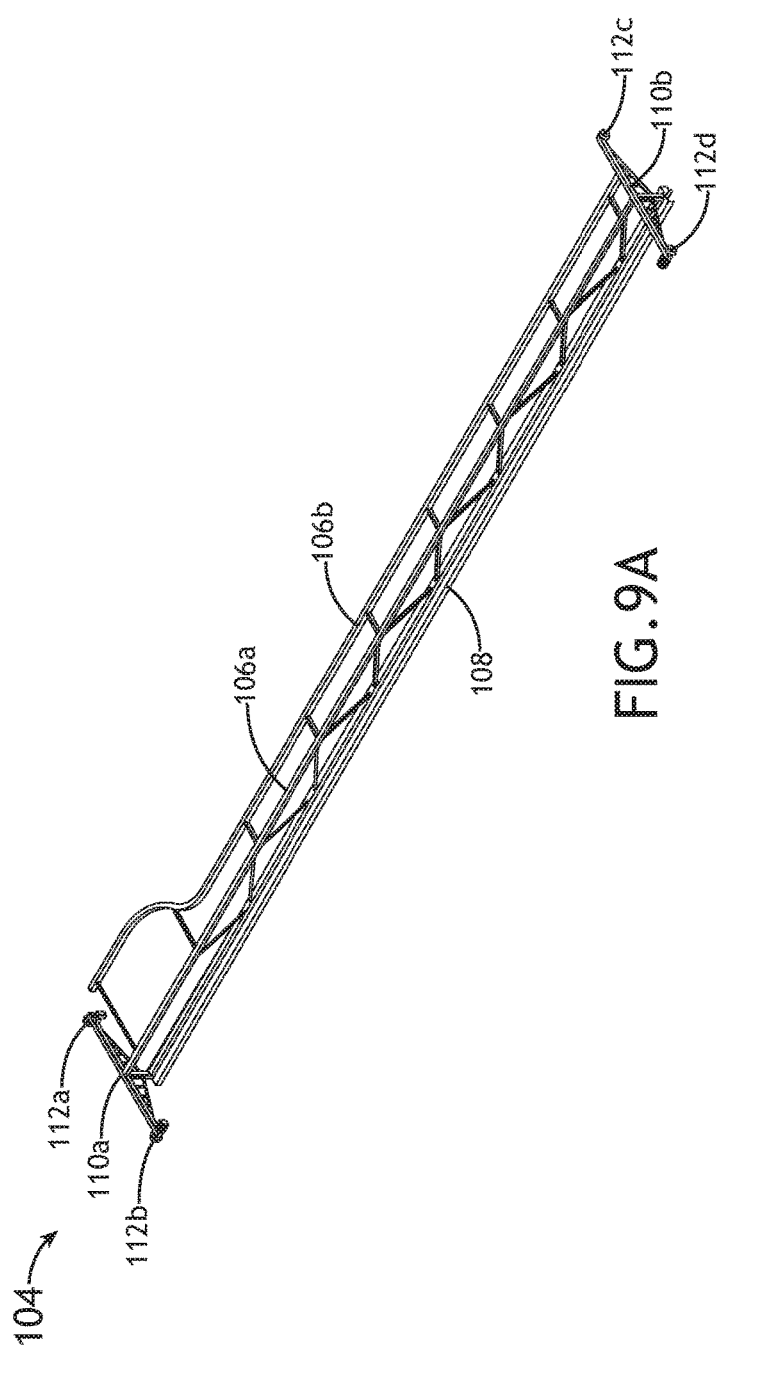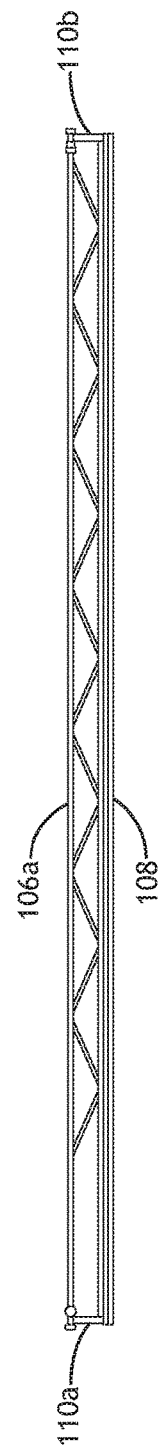

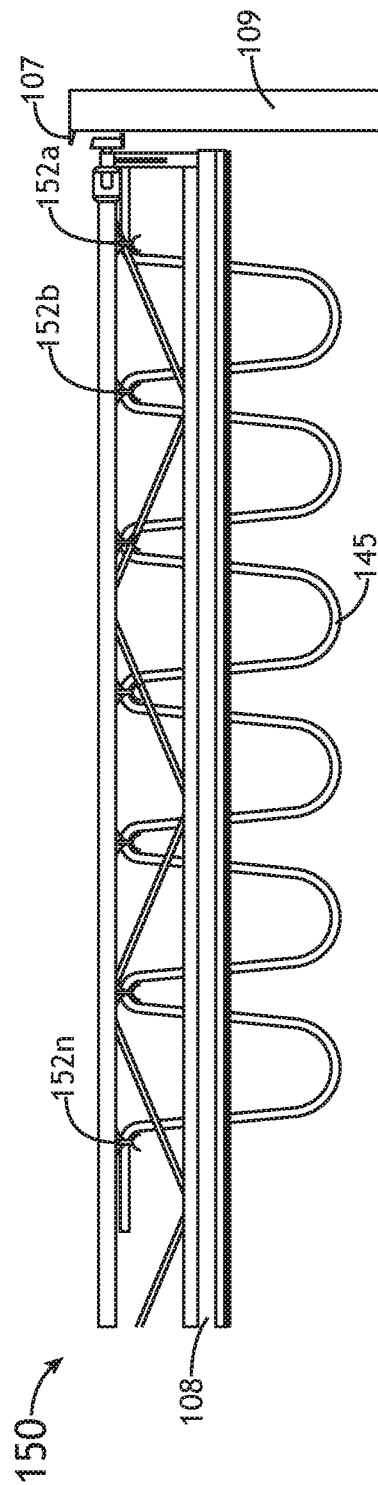
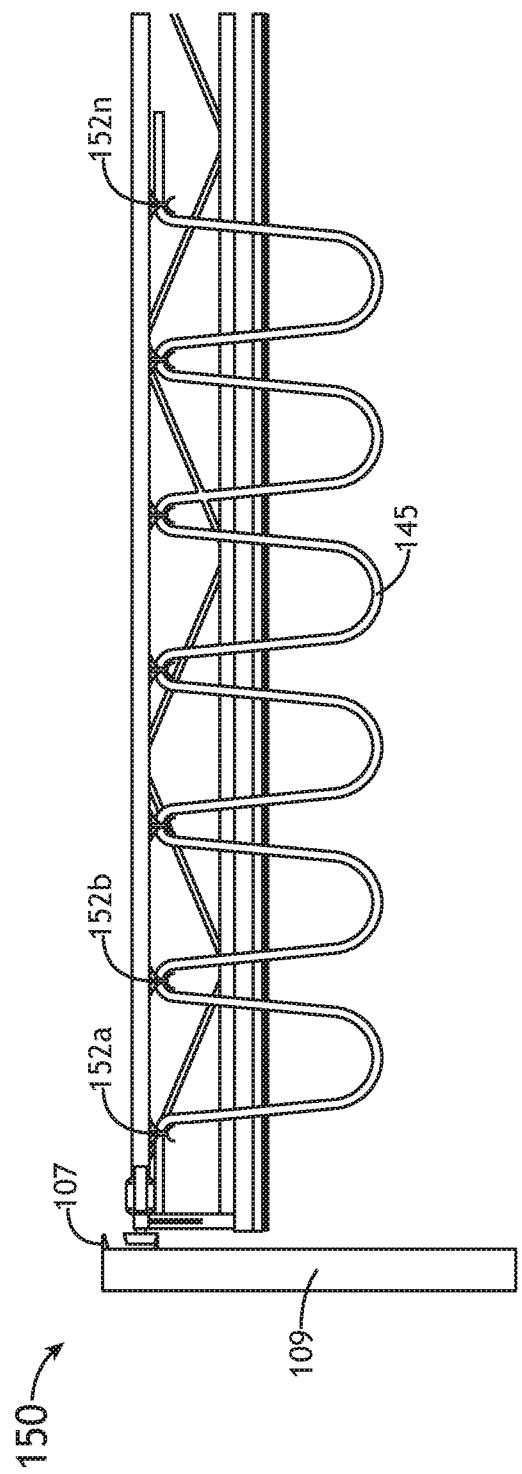
FIG. 12B
FIG. 12C

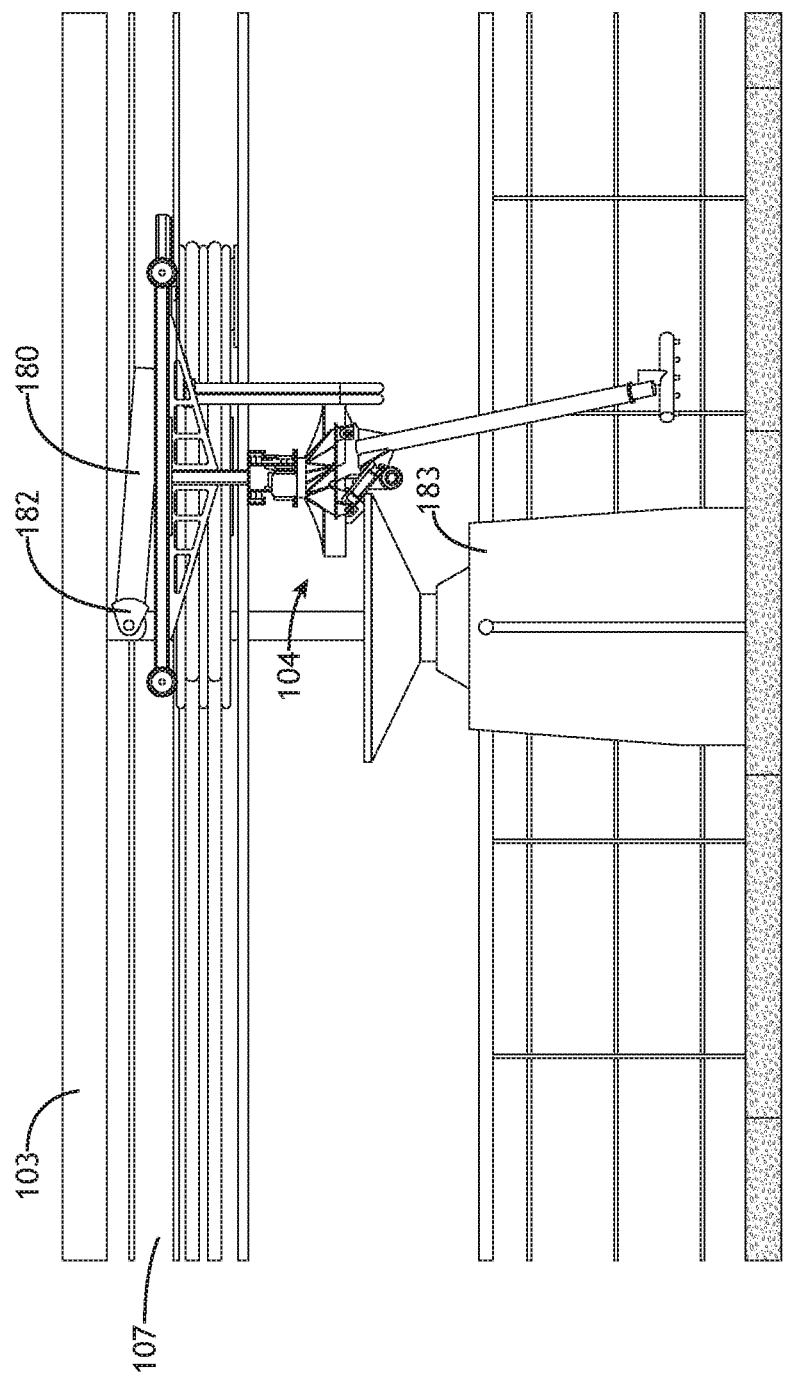

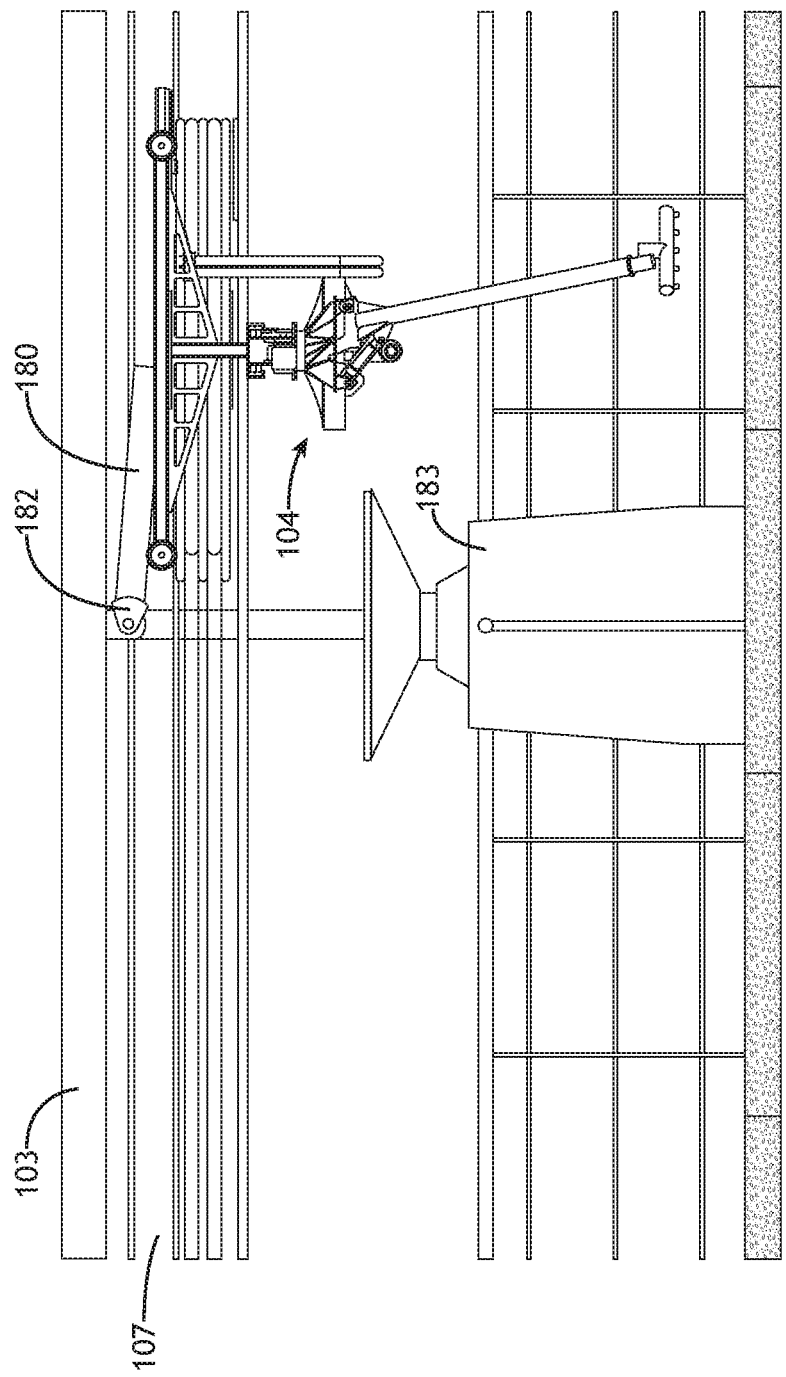

FULL LIVESTOCK SYSTEM

CROSS-REFERENCE TO RELATED APPLICATIONS

The present application is related to and claims benefit of the earliest available effective filing date from the following applications: The present application is a regular (non-provisional) patent application of U.S. Provisional Patent Application Ser. No. 62/660,844, filed Apr. 20, 2018; The present disclosure also constitutes a continuation-in-part (CIP) of U.S. patent application Ser. No. 15/384,132, filed Dec. 19, 2016, which is a regular (non-provisional) patent application of U.S. Provisional Patent Application Ser. No. 62/269,770, filed Dec. 18, 2015, U.S. Provisional Patent Application Ser. No. 62/269,800, filed Dec. 18, 2015, U.S. Provisional Patent Application Ser. No. 62/319,861, filed Apr. 8, 2016, U.S. Provisional Patent Application Ser. No. 62/335,260, filed May 12, 2016, and U.S. Provisional Patent Application Ser. No. 62/368,080, filed Jul. 28, 2016, whereby each of the above-listed patent applications is incorporated herein by reference in their entirety.

TECHNICAL FIELD

The present invention generally relates to agriculture and livestock, and, in particular, to an integrated livestock system capable of carrying out various livestock management activities.

BACKGROUND

Many types of livestock are commonly raised in livestock facilities. However, even with commonly available technological advances in the field of agriculture, current livestock raising practices suffer from numerous drawbacks. For example, there is a need in the art for more frequent livestock monitoring, increased data feedback to herdsmen, and improving livestock efficiencies. However, there is also a competing desire for less frequent interaction between humans and livestock in order to reduce and/or prevent the spread of disease. Additionally, tasks involving livestock and containment buildings are often very dirty and laborious tasks. As such, it is increasingly difficult to find herdsmen who are willing to perform these tasks, much less experienced herdsmen who are qualified to make intelligent, informed decisions in the raising of the livestock.

Additionally, currently used livestock raising techniques do not adequately monitor and control animal health activity. There is a need in the art to monitor physical locations, movements, and body temperatures of animals in order to monitor animal health, reduce stress, and track/predict animal growth. There is also a desire to prompt animals to wake up more often, which is believed to increase eating and drinking, and thereby facilitate average daily weight gain. Additionally, currently used livestock raising techniques typically rely on physical human activity to sort animals into particular locations, and to remove dead animals from the livestock facilities. This required human activity increases ranch operating costs, and increases the probability of disease. Furthermore, there is a need in the art to leverage qualified animal husbandry experts across multiple livestock facilities in order to reduce labor costs and most efficiently capitalize on the expertise of the animal husbandry experts.

Furthermore, conventional livestock raising practices suffer in that they do not adequately monitor and quantify gas levels within the livestock facilities. These gasses may include carbon dioxide ($CO_2$), ammonia ($NH_3$), hydrogen sulfide ($H_2S$), methane ($CH_4$), carbon monoxide (CO), and the like. Failure to monitor these gasses may result in livestock sickness and other destructive events. Furthermore, hydrogen sulfide ($H_2S$) and carbon monoxide (CO) are poisonous, thereby heightening the need to effectively monitor these gas concentrations both for the health of the livestock and herdsmen entering the livestock facilities. Similarly, conventional livestock raising practices suffer from a lack of available data which may be used to facilitate efficient farming practices. For example, metrics which suffer from a lack of data transparency may include, but are not limited to: lagoon levels, soil moisture, feed bin levels, effluent pit levels, fan operating states, temperature, humidity, animal temperature, pit level, water pressure/flow/level, personnel activity, animal activity, electricity usage, sound levels, pest/predator monitoring, staff shower in/out, animal vaccinations, animal fighting, and the like.

Therefore, it would be desirable to provide a system and method which cures one or more of the shortfalls of the previous approaches as identified above.

SUMMARY

A livestock management system is disclosed, in accordance with one or more embodiments of the present disclosure. In one embodiment, the system includes a gantry assembly and a controller. In another embodiment, the gantry assembly includes a support assembly including one or more work tool rails and one or more support structures. The gantry assembly may further include one or more propulsion units coupled to the one or more support structures of the support assembly, the one or more propulsion units disposed on one or more support rails within a livestock facility and configured to provide movement of the support assembly along the one or more support rails. The gantry assembly may further include one or more work tool assemblies actuatable along the one or more work tool rails so to provide one or more work tool attachments of the one or more work tool assemblies selective access to one or more regions located beneath the support assembly. In another embodiment, the controller is configured to actuate the support assembly to a selected position along the one or more support rails via the one or more propulsion units. In another embodiment, the controller is configured to actuate the one or more work tool assemblies to a selected position along the one or more work tool rails via one or more carriage assemblies.

A livestock management system is disclosed, in accordance with one or more embodiments of the present disclosure. In one embodiment, the system includes a plurality of gantry assemblies, wherein the plurality of gantry assemblies each comprise: a support assembly including one or more work tool rails and one or more support structures; one or more propulsion units coupled to the one or more support structures of the support assembly, the one or more propulsion units disposed on one or more support rails of a livestock facility and configured to provide movement of the support assembly along the one or more support rails; and one or more work tool assemblies actuatable along the one or more work tool rails so to provide one or more work tool attachments of the one or more work tool assemblies selective access to one or more regions located beneath the one or more work tool rails. In another embodiment, the system includes a controller including one or more processors configured to execute a set of program instructions stored in memory, wherein the program instructions are configured to cause the one or more processors to: actuate the gantry assembly to a selected position along the one or more support rails via the one or more propulsion units; actuate the one or more work tool assemblies to a selected position along the one or more work tool rails via one or more carriage assemblies; and generate one or more control signals configured to cause the one or more work tool attachments of the one or more work tool assemblies to interact with one or more objects beneath the support frame. In another embodiment, the system includes a server communicatively coupled to each controller of the plurality of gantry assemblies, the server configured to cause the one or more processors to coordinate one or more actions of two or more of the plurality of gantry assemblies.

A method is disclosed, in accordance with one or more embodiments of the present disclosure. In one embodiment, the method includes: actuating a support assembly of a gantry assembly along one or more support rails of a livestock facility, the support assembly including one or more work tool rails; actuating one or more work tool assemblies along the one or more work tool rails; selectively accessing one or more regions located beneath the support assembly with the one or more work tool assemblies; and interacting with one or more objects within the one or more regions located beneath the support assembly with the one or more work tool assemblies.

It is to be understood that both the foregoing general description and the following detailed description are exemplary and explanatory only and are not necessarily restrictive of the present disclosure. The accompanying drawings, which are incorporated in and constitute a part of the characteristic, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which:

FIG. 9A illustrates a perspective view of a support assembly of a gantry assembly, in accordance with one or more embodiments of the present disclosure.

FIG. 9B illustrates a side view of a support assembly of a gantry assembly, in accordance with one or more embodiments of the present disclosure.

FIG. 12B illustrates a side view of a festoon system of a support assembly, in accordance with one or more embodiments of the present disclosure.

FIG. 12C illustrates a side view of a festoon system of a support assembly, in accordance with one or more embodiments of the present disclosure.

DETAILED DESCRIPTION OF THE INVENTION

Reference will now be made in detail to the subject matter disclosed, which is illustrated in the accompanying drawings.

An integrated livestock management system 100 and a related method are shown and described, in accordance with one or more embodiments of the present disclosure. For the purposes of the present disclosure, the term "integrated livestock management system" may be used interchangeably with the terms "livestock management system" and "full livestock system (FLS)."

Embodiments of the present disclosure are directed to a livestock management system capable of performing one or more agricultural and/or livestock functions (i.e. farming and/or ranching functions) in an agricultural setting (e.g., livestock facility, crop field, livestock enclosure, etc.). Further embodiments of the present disclosure are also directed to a gantry assembly of a livestock management system configured to autonomously, semi-autonomously, and/or manually carry out one or more agricultural and/or livestock functions.

Figure 1A:
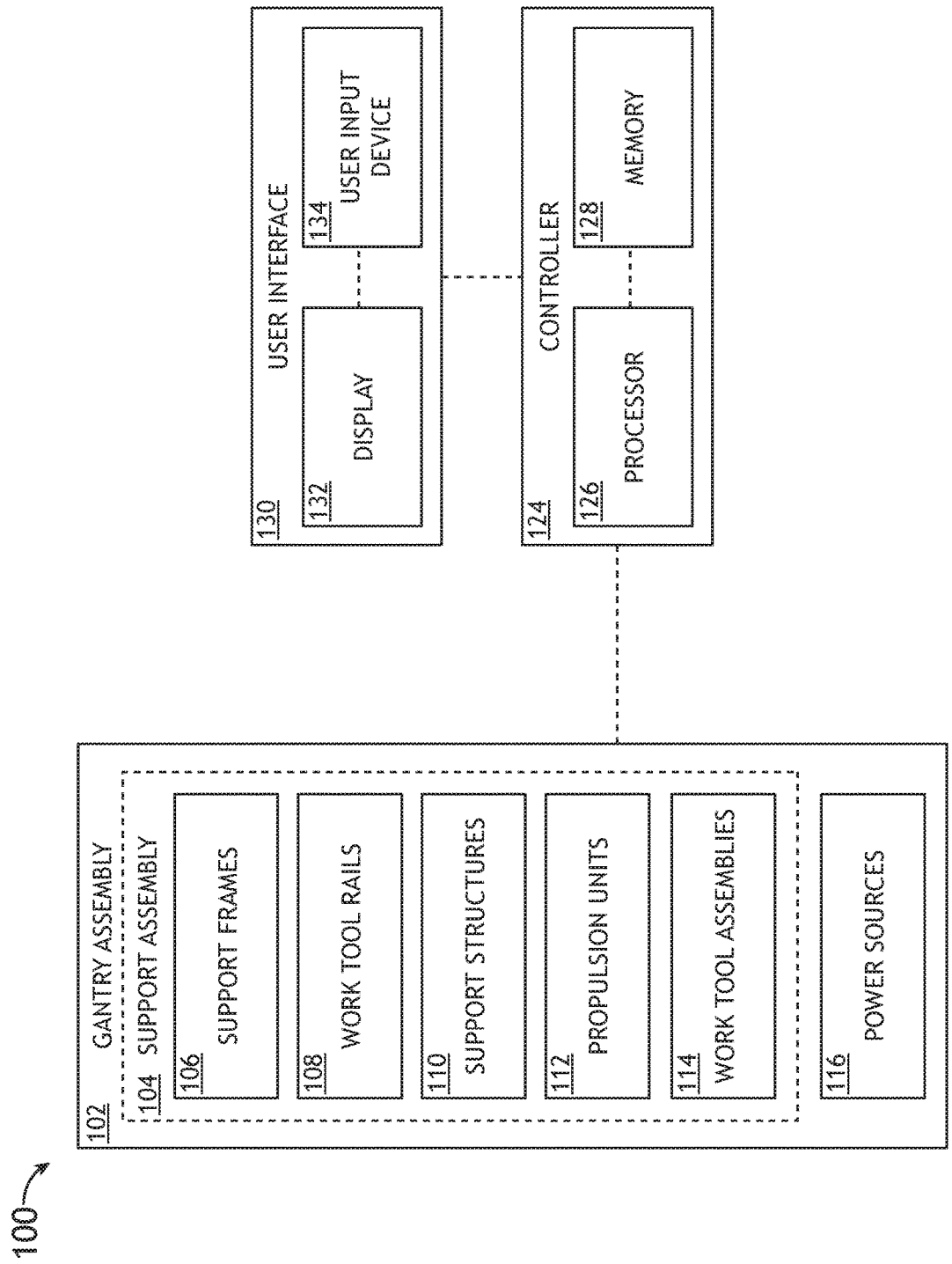
FIG. 1A illustrates a block diagram of a full livestock system, in accordance with one or more embodiments of the present disclosure.
Figure 1B:
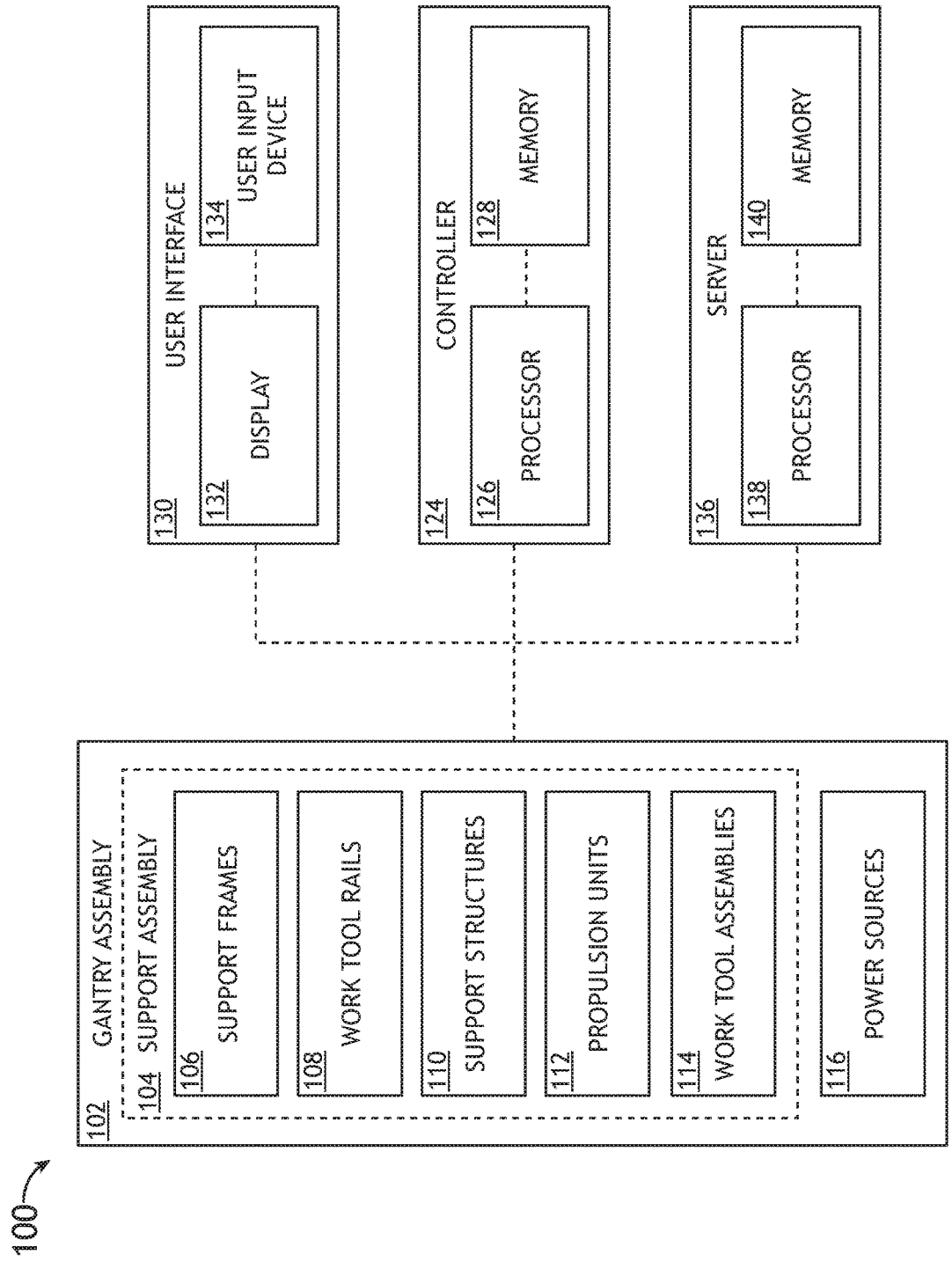
FIG. 1B illustrates a block diagram of a farming system, in accordance with one or more embodiments of the present disclosure.

FIGS. 1A-1B illustrate a block diagrams of a full livestock system 100 (e.g., livestock management system 100), in accordance with one or more embodiments of the present disclosure.

In one embodiment, the livestock management system 100 includes a gantry assembly 102. The gantry assembly 102 is configured for engaging with a selected region or area of agricultural interest in one or more modes. For example, the gantry assembly 102 allows for the system 100 to autonomously, semi-autonomously, and/or manually (e.g., remote control) carry out one or more livestock and/or ranching functions. For instance, such livestock and/or ranching functions may include, but are not limited to, power washing, feeding, retrieving dead animals, branding, corralling animals, harvesting and the like. By way of another example, the gantry assembly 102 allows for the full livestock system 100 to autonomously or semi-autonomously carry out one or more ranching functions such as, but not limited to, livestock poultry management. It is noted that the gantry assembly 102 may include any number and type of components and sub-systems to carry out the various modes of the gantry assembly 102, which are described in detail further herein.

In one embodiment, the gantry assembly 102 includes one or more support assemblies 104. For the purposes of the present disclosure, a single gantry assembly 102 is generally described in the context of a single support assembly 104 for reasons of clarity. It is noted, however, that such a configuration is not a limitation on the scope of the present disclosure as it is noted that the livestock management system 100 may include any number of gantry assemblies 102 (e.g., one, two, three, etc.), which each may include any number of support assemblies 104 (e.g., one, two, three, etc.). In another embodiment, a support assembly 104 of the gantry assembly 102 includes one or more support frames 106, one or more work tool rails 108 and one or more support structures 110.

In another embodiment, the gantry assembly 102 includes one or more propulsion units 112. In another embodiment, the gantry assembly 102 includes one or more work tool assemblies 114. For example, as discussed further herein, the one or more work tool assemblies 114 are coupled to the one or more work tool rails 108. By way of another example, the one or more work tool assemblies 114 include one or more components, discussed in detail further herein. In another embodiment, the gantry assembly 102 includes one or more power sources/supplies 116.

For purposes of the present disclosure, the phrase "one or more components of the gantry assembly 102" is interpreted to extend to at least, but is not limited to, the following: a portion of the one or more support assemblies 104; the one or more support frames 106; the one or more work tool rails 108; the one or more support structures 110; the one or more propulsion units 112; the one or more work tool assemblies 114; the one or more components of the work tool assemblies 114 including, but not limited to, a carriage assembly, a chassis, and a work tool attachment; the one or more power sources 116; and the like.

In another embodiment, the livestock management system 100 includes one or more controllers 124. The one or more controllers 124 are configured to control any of the various functions of the portions of the full livestock system 100 (livestock management system 100). For example, the one or more controllers 124 may communicatively coupled to the one or more gantry assemblies 102 and may be programmed to control one or more functions of the gantry assembly 102. For instance, the one or more controllers 124 may be programmed to transmit one or more control commands and/or sets of information to control one or more functions of any of the one or more components of the gantry assembly 102. The one or more controllers 124 may include one or more processors 126 and memory 128. The one or more processors 126 may be configured to execute program instructions stored in memory 128 configured for causing the one or more processors 126 to execute one or more of the various steps described throughout the present disclosure. In another embodiment, the one or more controllers 124 may be configured to allow a user to remotely access and/or control the gantry assembly 102, the manifold assembly 128 and/or the material storage container 126 (or any other portion of system 100).

While the one or more controllers 124 are shown in FIGS. 1A-1B as being contained outside/off the one or more gantry assemblies 102, this is not to be regarded as a limitation on the scope of the present disclosure, unless noted otherwise herein. In this regard, the one or more controllers 124 may be located on/within the one or more gantry assemblies 102 such that the controller 124 is considered to be a component of the gantry assembly 102. In an additional and/or alternative embodiment, the controller 124 may be located remotely with respect to the gantry assemblies 102. For example, in the context of a livestock facility with one or more gantry assemblies 102, a controller 124 may be disposed on an inner wall of the containment building such that it is not physically located on/within a gantry assembly 102. Similarly, it is contemplated that a single controller 124 may be associated with one or more gantry assemblies 102. For example, in the context of a livestock facility with two gantry assemblies 102a, 102b, a single controller 124 may be disposed on an inner wall of the livestock facility such that the controller 124 is configured to transmit information and/or control signals to both the first gantry assembly 102a and the second gantry assembly 102b.

In one embodiment, the controller 124 may be communicatively coupled to various other components of system 100 via one or more wireline connections (e.g., direct fiber optic cable, direct copper wire, DSL-based interconnection, Cable-based interconnection, T9-based interconnection, and the like etc.). By way of another example, the controller 124 and the controller 124 may be communicatively coupled via one or more wireless connections (e.g., GSM, GPRS, CDMA, EV-DO, EDGE, WiMAX, 3G, 4G, 4G LTE, 5G, WiFi, RF, LoRa, Bluetooth, a customized wireless protocol and the like).

In one embodiment, as illustrated in FIG. 1B, the one or more controllers 124 may be configured to indirectly communicate with each other and various other components of system 100 via one or more servers 136. In one embodiment, the server 136 is configured to cause the one or more controllers 124 of one or more gantry assemblies 102 to coordinate one or more actions of two or more of the plurality of gantry assemblies. For example, the controller 124, and the one or more servers 136 may each include network interface circuitry (not shown) for connecting to a network (not shown). The network interface circuitry of the controller 124 and/or the one or more servers 136 may include any network interface circuitry known in the art. For instance, the network interface circuitry may include wireline-based interface devices (e.g., DSL-based interconnection, Cable-based interconnection, T9-based interconnection, and the like). In another instance, the network interface circuitry may include a wireless-based interface device employing GSM, GPRS, CDMA, EV-DO, EDGE, WiMAX, 3G, 4G, 4G LTE, 5G, WiFi protocols, RF, LoRa, and the like.

Figure 2A:
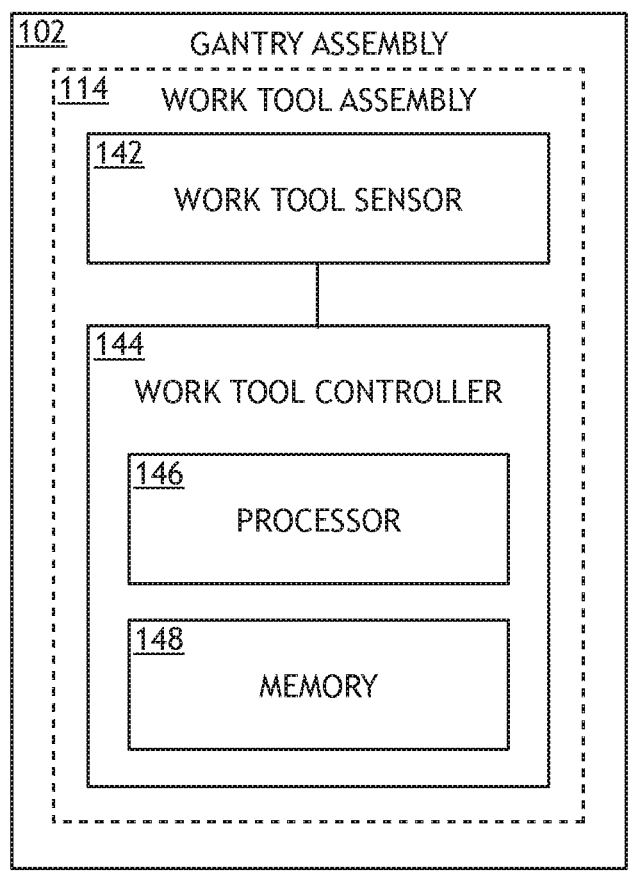
FIG. 2A illustrates a block diagram of a gantry assembly, in accordance with one or more embodiments of the present disclosure.
Figure 2B:
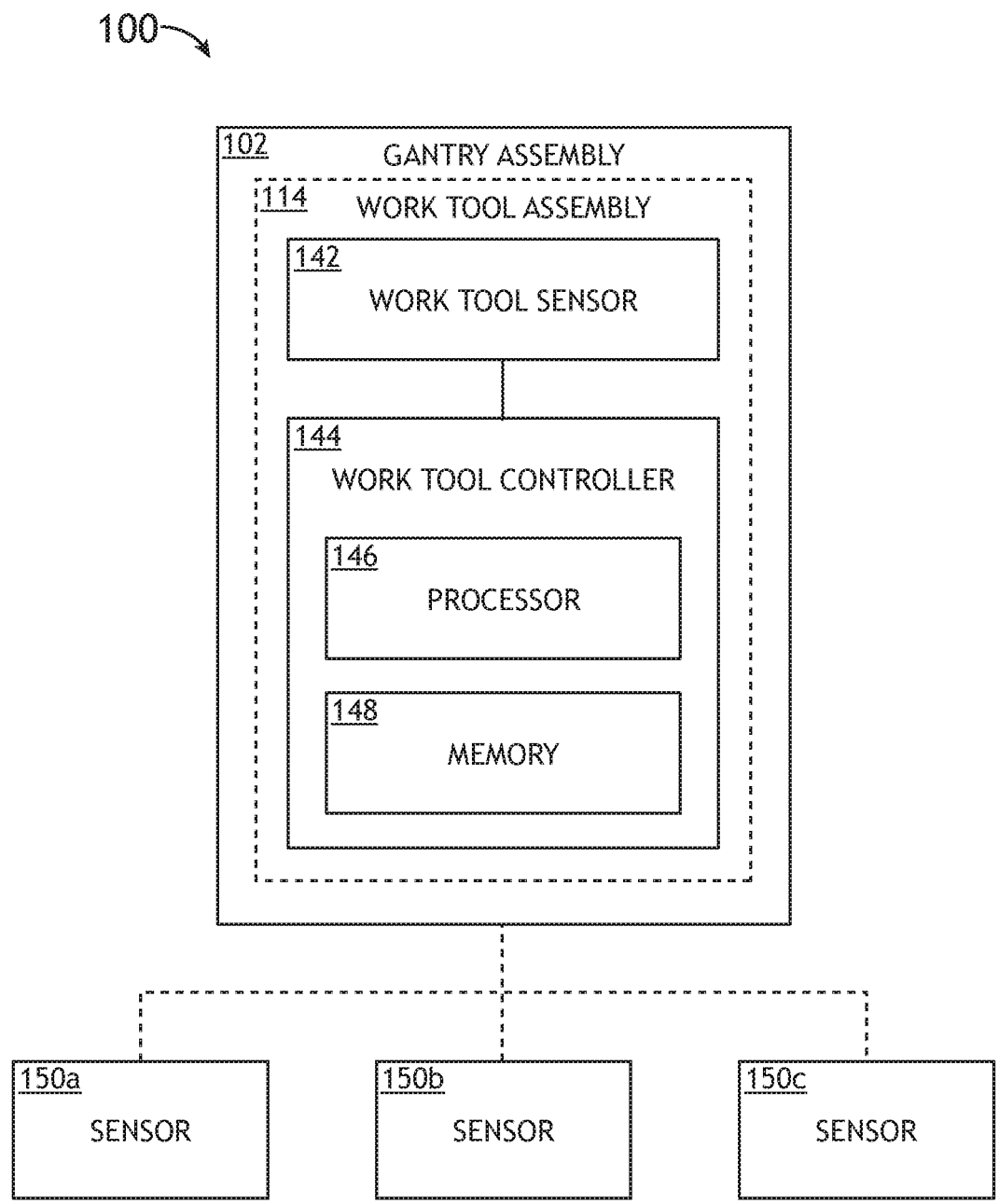
FIG. 2B illustrates a block diagram of a gantry assembly, in accordance with one or more embodiments of the present disclosure.

FIGS. 2A-2B illustrate block diagram views of the gantry assembly 102, in accordance with one or more embodiments of the present disclosure.

In one embodiment, as illustrated in FIGS. 2A-2B, the one or more work tool assemblies 114 include one or more work tool sensors 142 and one or more work tool controllers 144. The one or more work tool controllers 144 are configured to control any of the one or more work tool assemblies 114. For example, the one or more work tool controllers 144 may be programmed to control one or more functions of the work tool assemblies 114. In another embodiment, the one or more work tool controllers 144 may include one or more processors 146 and memory 148. The one or more processors 146 may be configured to execute program instructions stored in memory 148 configured for causing the one or more processors 146 to execute one or more of the various steps described throughout the present disclosure. In embodiments, the work tool controllers 144 are communicatively coupled to various components of the work tool assemblies 114 (e.g., carriage assemblies, motors, power units, hydraulic cylinders, and the like) in order to facilitate the various motions and functions of the work tool assemblies 114.

In one embodiment, the one or more work tool assemblies 114 include one or more work tool sensors 142. The one or more work tool sensors 142 may include any type of sensor known in the art including, but not limited to, temperature sensors, pressure sensors, moisture sensors, humidity sensors, weight sensors, pressure sensors, light sensors, noise sensors, position sensors, and the like. In another embodiment, the one or more work tool sensors 142 are configured to communicate with the one or more work tool controllers 144. In another embodiment, the one or more work tool sensors 142 are configured to communicate indirectly with the controller 124. In another embodiment, the one or more work tool sensors 142 are further configured to communicate indirectly with the controller 124 via the one or more servers 136. In another embodiment, the one or more work tool sensors 142 assist in maintaining the height and overall position of the work tool assembly 128 relative to the instructions given.

In another embodiment, the one or more work tool sensors 142 are configured to transmit one or more sets of information to the work tool controller 144. For example, the one or more sets of information may include one or more operational parameters of the work tool assembly 114 such as, but are not limited to, power consumption, rotational speed of actuators, rotational capability of actuators, level of loaded material in a material storage container, position coordinates of the work tool assembly 114 location on the gantry assembly 102, position coordinates of the work tool assembly 114 relative to other work tool assemblies 114, position coordinates of the work tool assembly 114 relative to surrounding environment locations (e.g. a wall/structure of a containment building, an additional gantry assemblies 102, and the like), distance coordinates to/from other work tool assemblies 114, and the like.

It is noted herein the one or more components of gantry assembly 102 may include one or more sensors. For example, the one or more sensors may include one or more linear encoders, one or more level measurement devices, one or more actuation sensors, one or more accelerometers, and the like.

In another embodiment, as illustrated in FIG. 2B, the controller 124 is configured to communicate with one or more sensors 150. The one or more sensors 150 may include one or more sensors 150 disposed within a livestock facility and configured to monitor one or more characteristics of the livestock facility environment, animals within the livestock facility, tools within the livestock facility, and the like. In this regard, the one or more sensors 150a, 150b, 150c may include, but are not limited to, temperature sensors, pressure sensors, moisture sensors, humidity sensors, weight sensors, pressure sensors, light sensors, noise sensors, position sensors, level sensors, and the like. For example, in another embodiment, the one or more sensors 150 may include one or more proximity sensors disposed on one or more obstructions within a livestock facility (e.g., feed tubes, farm implement units, above-ground pipes, valves, gates, pens, columns, and the like). In another embodiment, the one or more in-field sensors include one or more health and/or identification sensors disposed on one or more livestock such as, but not limited to, poultry, swine, dairies, fish, goats, cattle, and the like. In another embodiment, the controller 124 is configured to communicate directly with the sensors 150. In another embodiment, the controller 124 is configured to communicate indirectly with the sensors 150 via the one or more servers 136 and/or controller 124. It is further noted herein the work tool controllers 144 may be configured to communicate directly or indirectly with the in-field sensors 150.

In another embodiment, as illustrated in FIG. 1A-1B, the one or more work tool controllers 144 may be configured to directly communicate with the one or more controllers 124. In another embodiment, the one or more work tools controllers 144, the one or more servers 136, and/or the controller 124 may be configured to indirectly communicate with each other via network interface circuitry.

In another embodiment, the one or more servers 136 function as a cloud-based architecture for one or more of storage, analysis, and computation of data received from and transmitted to the one or more controllers 124, the one or more controllers 124, and/or the one or more work tool controllers 144.

In another embodiment, the one or more controllers 124 are communicatively coupled to a user interface 146. For example, the user interface 146 includes a display 148 and/or a user input device 150.

In another embodiment, the display 148 includes any display device known in the art. For example, the display device may include, but is not limited to, a liquid crystal display (LCD). By way of another example, the display device may include, but is not limited to, an organic light-emitting diode (OLED) based display. By way of another example, the display device may include, but is not limited to a CRT display. Those skilled in the art should recognize that a variety of display devices may be suitable for implementation in the present disclosure and the particular choice of display device may depend on a variety of factors, including, but not limited to, form factor, cost, and the like. In a general sense, any display device capable of integration with the user input device (e.g., touchscreen, bezel mounted interface, keyboard, mouse, trackpad, and the like) is suitable for implementation in the present disclosure.

In one embodiment, the user input device 150 includes any user input device known in the art. For example, user input device 124 may include, but is not limited to, a keyboard, a keypad, a touchscreen, a lever, a knob, a scroll wheel, a track ball, a switch, a dial, a sliding bar, a scroll bar, a slide, a handle, a touch pad, a paddle, a steering wheel, a joystick, a bezel input device or the like. In the case of a touchscreen interface, those skilled in the art should recognize that a large number of touchscreen interfaces may be suitable for implementation in the present disclosure. For instance, the display device 128 may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device is suitable for implementation in the present disclosure. In another embodiment, the user input device 134 may include, but is not limited to, a bezel mounted interface.

In another embodiment (although not shown), the livestock management system 100 includes a local user interface communicatively coupled to the controller 124. For example, the local user interface may include a display and/or a user input device. It is noted herein the display and/or the user input device of the local user interface may include any display and/or user input device known in the art.

Figure 3:
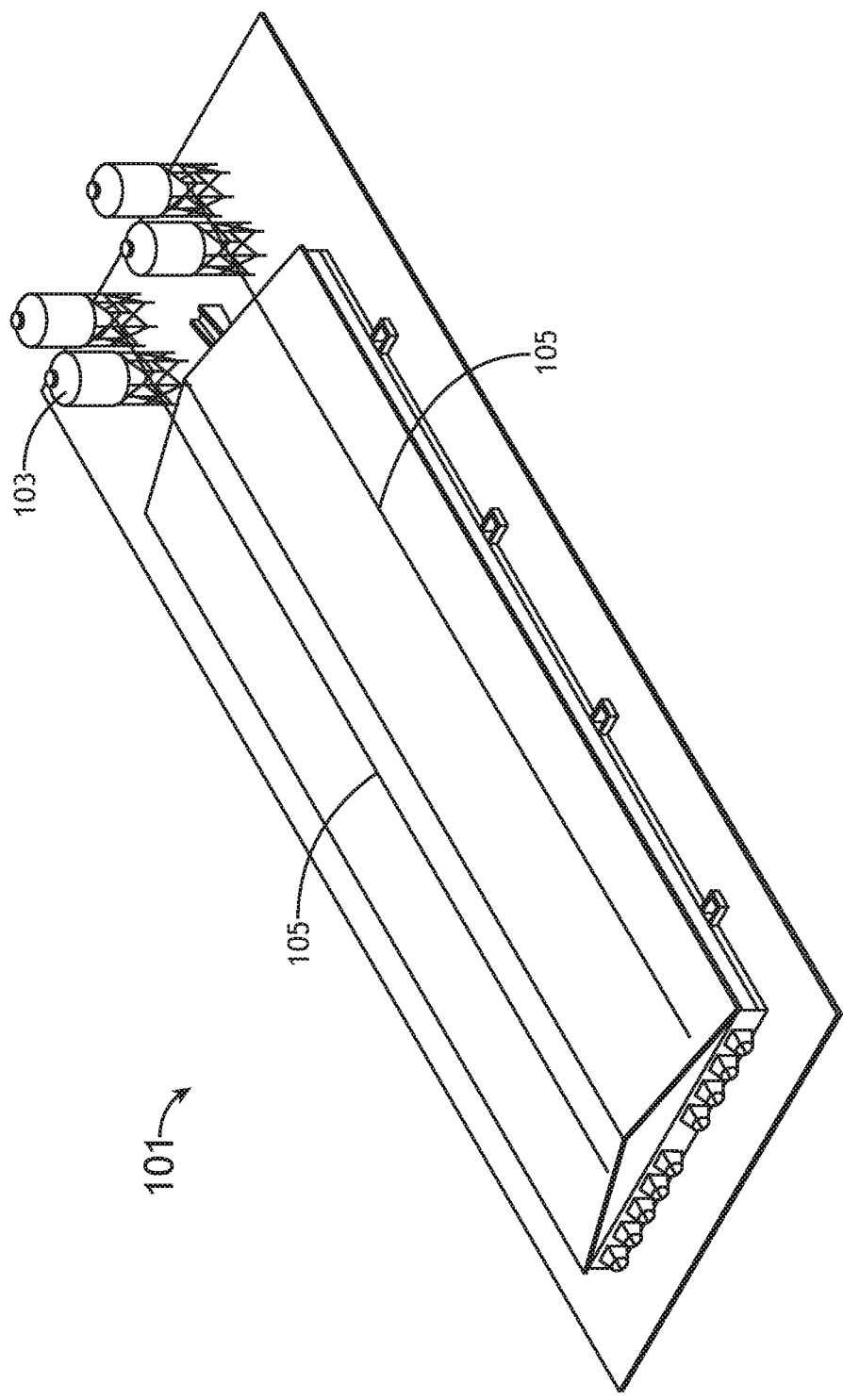
FIG. 3 illustrates a livestock facility, in accordance with one or more embodiments of the present disclosure.

FIG. 3 illustrates a livestock facility 101, in accordance with one or more embodiments of the present disclosure.

The livestock facility 101 may illustrate a typical livestock facility within which livestock are commonly held and raised. It is contemplated herein that a livestock facility 101 may take on many different shapes, sizes, styles, and room configurations. For example, livestock facility 101 shown in FIG. 3 may include 48 pens which are configured to contain approximately 2400 hogs. The livestock facility 101 may include an indoor livestock facility 101, an outdoor livestock facility 101, an indoor/outdoor livestock facility 101, and the like. In embodiments, grain and other products may be fed into the livestock facility 101 from one or more feed bins 103 through one or more feed tubes 105 with an auger that rotates inside the feed tubes 105. Conveyed grain is dropped from the feed tube into the feeders through product drop tubes, which will be described in further detail herein. The floors of a livestock facility 101 often contain slats. Effluent from the livestock within the livestock facility 101 falls through the slats into a pit below the floor of the livestock facility 101. When the pit is full, the effluent is gravity fed or pumped from the pit into lagoons or directly onto fields.

As noted previously herein, it is contemplated that system 100 may be implemented in contexts other than livestock and/or livestock facilities including, but not limited to, open agricultural fields, industrial facilities, manufacturing plants, and the like.

Figure 4A:
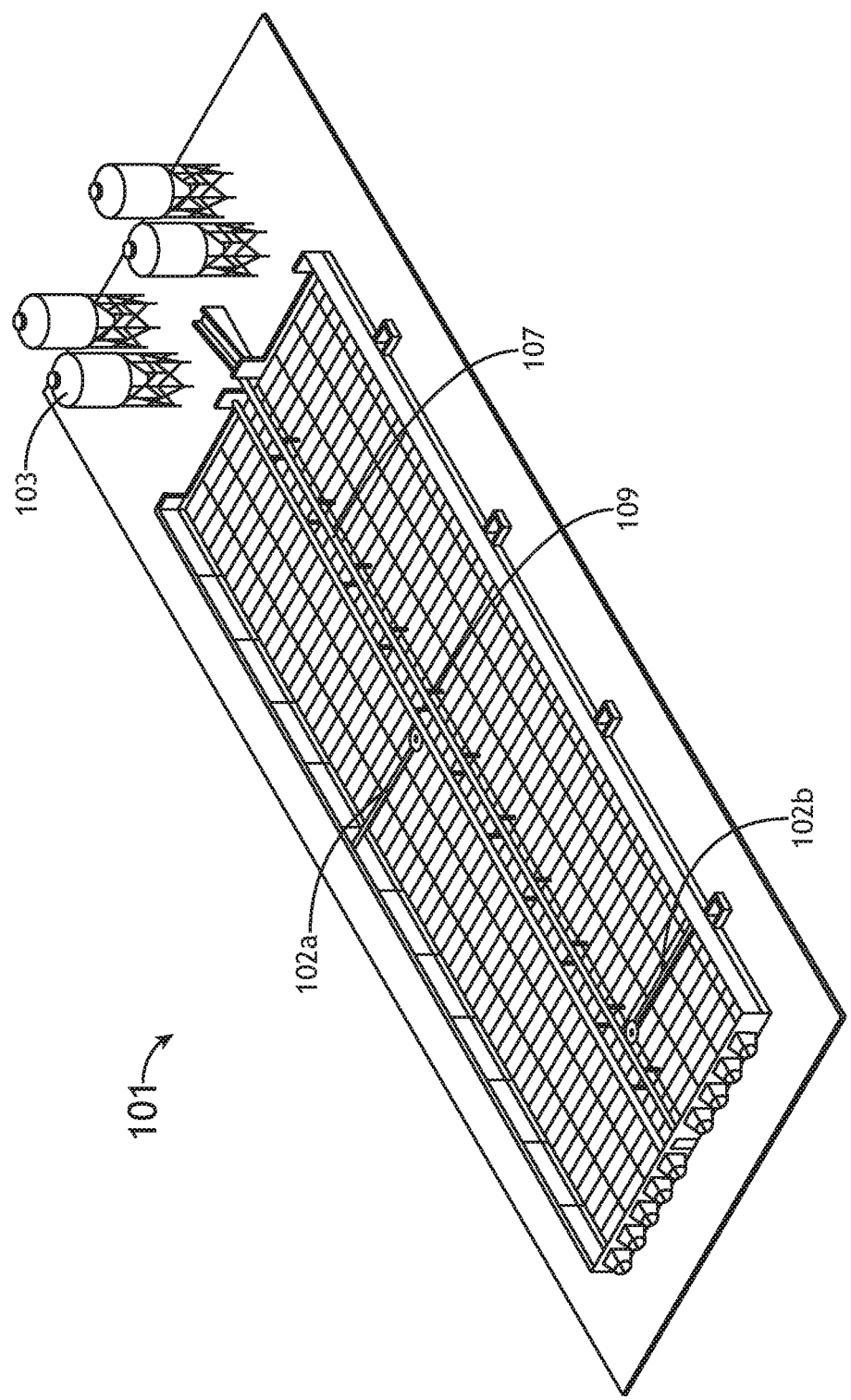
FIG. 4A illustrates a livestock facility equipped with a livestock management system, in accordance with one or more embodiments of the present disclosure.
Figure 4B:
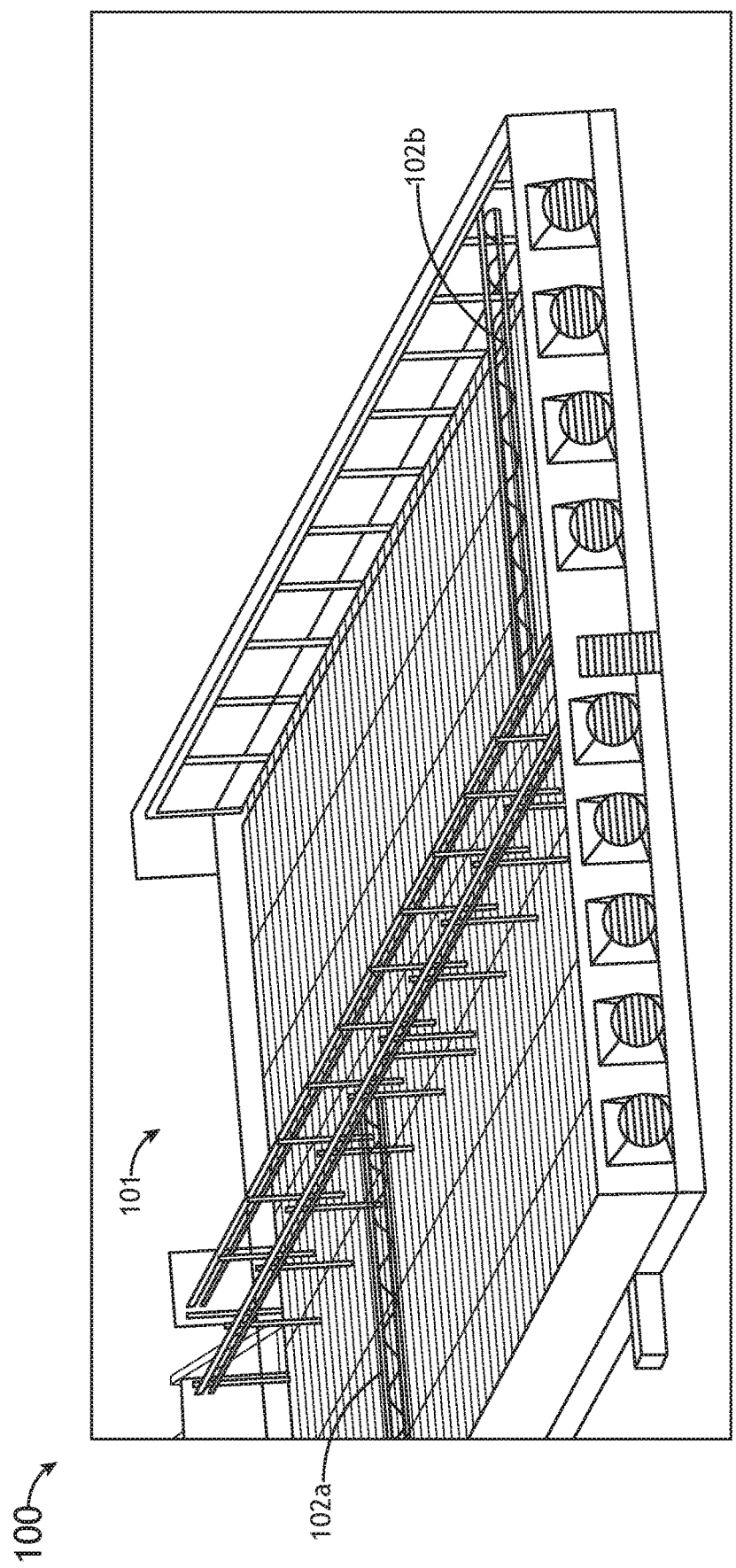
FIG. 4B illustrates a livestock facility equipped with a livestock management system, in accordance with one or more embodiments of the present disclosure.

FIGS. 4A-4B illustrate a livestock facility 101 equipped with a livestock management system 100, in accordance with one or more embodiments of the present disclosure.

As shown in FIGS. 4A-4B, a livestock facility 101 may be equipped with a full farming system 100 including one or more gantry assemblies 102. In one embodiment, the gantry assemblies 102 are configured to be selectively actuated within the livestock facility 101 such that the gantry assemblies 102 may access one or more areas/regions (e.g., pens, rooms, and the like) of the livestock facility 101. For example, the one or more gantry assemblies 102 may be configured to selectively actuate along a set of one or more support rails 107. The gantry assemblies 102 may be disposed on the support rails 107 at a sufficient height such that the gantry assemblies 102 may be able to actuate across at least a portion of the livestock facility 101 without hitting, damaging, or being obstructed by objects within the livestock facility 101, such as pens, beams, machinery, and the like. Accordingly, the support rails 107 may be coupled to a plurality of support structures 109 which are configured to hold the support rails 107 in place. The plurality of support structures 109 may extend from the ground/floor, be suspended from the ceiling of the livestock facility 101, and/or may extend from one or more walls of the livestock facility 101. In this regard, the plurality of support structures 109 may include any support structures known in the art including, but not limited to, beams, columns, poles, brackets, wires, cables, and the like.

In another embodiment, the gantry assemblies 102 include one or more work tool assemblies and work tool attachments may be configured to engage and interact with one or more objects and/or regions beneath the gantry assemblies 102. In embodiments where the gantry assemblies 102 are capable of being selectively actuated across the entire livestock facility 101, the gantry assemblies 102 may be capable of engaging and/or interacting with objects and regions across the entire livestock facility 101. Additionally, it is contemplated herein that a farm/ranch with multiple livestock facilities 101 may be equipped with the livestock management system 100 such that each livestock facility 101 includes one or more gantry assemblies 102. Furthermore, support rails 107 may be configured to transfer gantry assemblies 102 between multiple livestock facilities 101.

Figure 5:
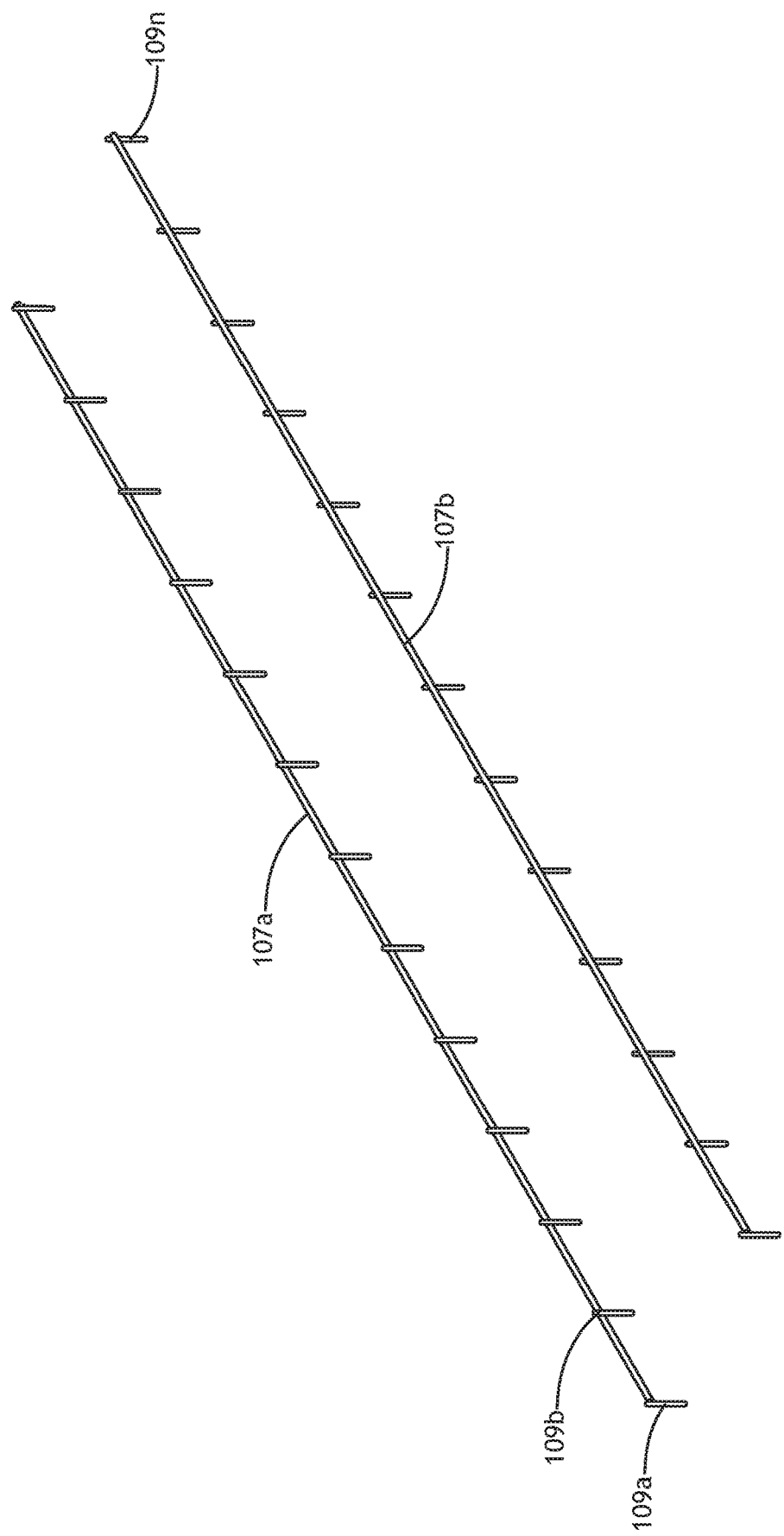
FIG. 5 illustrates support rails and support structures of a livestock management system, in accordance with one or more embodiments of the present disclosure.

FIG. 5 illustrates support rails 107 and support structures 109 of a livestock management system 100, in accordance with one or more embodiments of the present disclosure.

As noted previously herein, a gantry assembly 102 may be disposed on one or more support rails 107 such that the gantry assembly 102 may be selectively actuated along the support rails 107. Furthermore, the one or more support rails 107 may be held in place (e.g., held in place within a livestock facility 101) via a plurality of support structures 109. The plurality of support structures 109 may include any support structures known in the art including, but not limited to, beams, columns, poles, brackets, wires, cables, and the like.

Figure 6:
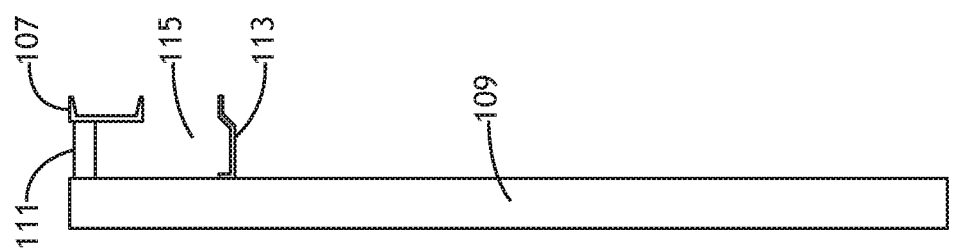
FIG. 6 illustrates support structures of a livestock management system, in accordance with one or more embodiments of the present disclosure.
Figure 6:
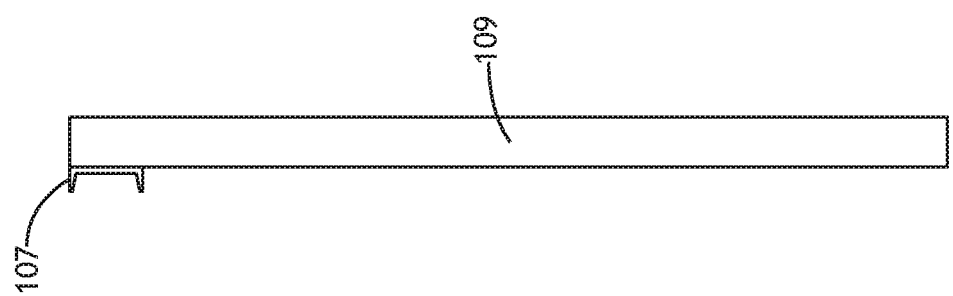

FIG. 6 illustrates support structures 109 of a livestock management system 100, in accordance with one or more embodiments of the present disclosure. In one embodiment, the support rails 107 may be coupled directly to the support structures 109. In another embodiment, a support structure 109 may include one or more brackets 111 configured to receive and couple to one or more support rails 107. In another embodiment, a support structure 109 may include one or more hose track supports 113. The hose track supports 113 may be configured to support, contain, and/or hold hoses, cables, and tubes which are coupled to the gantry assembly 102. Accordingly, multiple hose track supports 113 in a row may be said to create a hose tray 115 within which hoses, cables, tubes, and the like may be routed. In this regard, the one or more hose track supports 113 may include any bracket or other structure configured to support hoses, cables, tubes, and the like.

It is noted herein that maintaining hoses and cables associated with the gantry assemblies 102 within the hose tray 115 may keep the various hoses/cables/tubes off the ground and out of the way of animals and humans, where they may be damaged or pose a health hazard. In another embodiment, the plurality of support structures 109 may be configured to extend and/or contract (e.g., telescope) in order to adjust the height of the one or more support rails 107, and thereby adjust the height of the one or more gantry assemblies 102. For example, the plurality of support structures 109 may include one or more hydraulic assemblies configured to selectively adjust a height of each respective support structure 109.

In some embodiments, the support rails 107 and/or support structures 109 may be mobile. For example, the support structures 109 may be coupled to one or more propulsion units which are configured to move the support structures 109 and support rails 107. This may be further understood with reference to the "Full Farming System (FFS)" described by Steve R. Tippery, Brant Burkey, Kyle Gerber, Heath Roehr, and Tim Adkins in U.S. Pat. No. 10,149,422, issued on Dec. 11, 2018, entitled "AUTONOMOUS INTEGRATED FARMING SYSTEM," which is incorporated herein by reference in the entirety.

Figure 7:
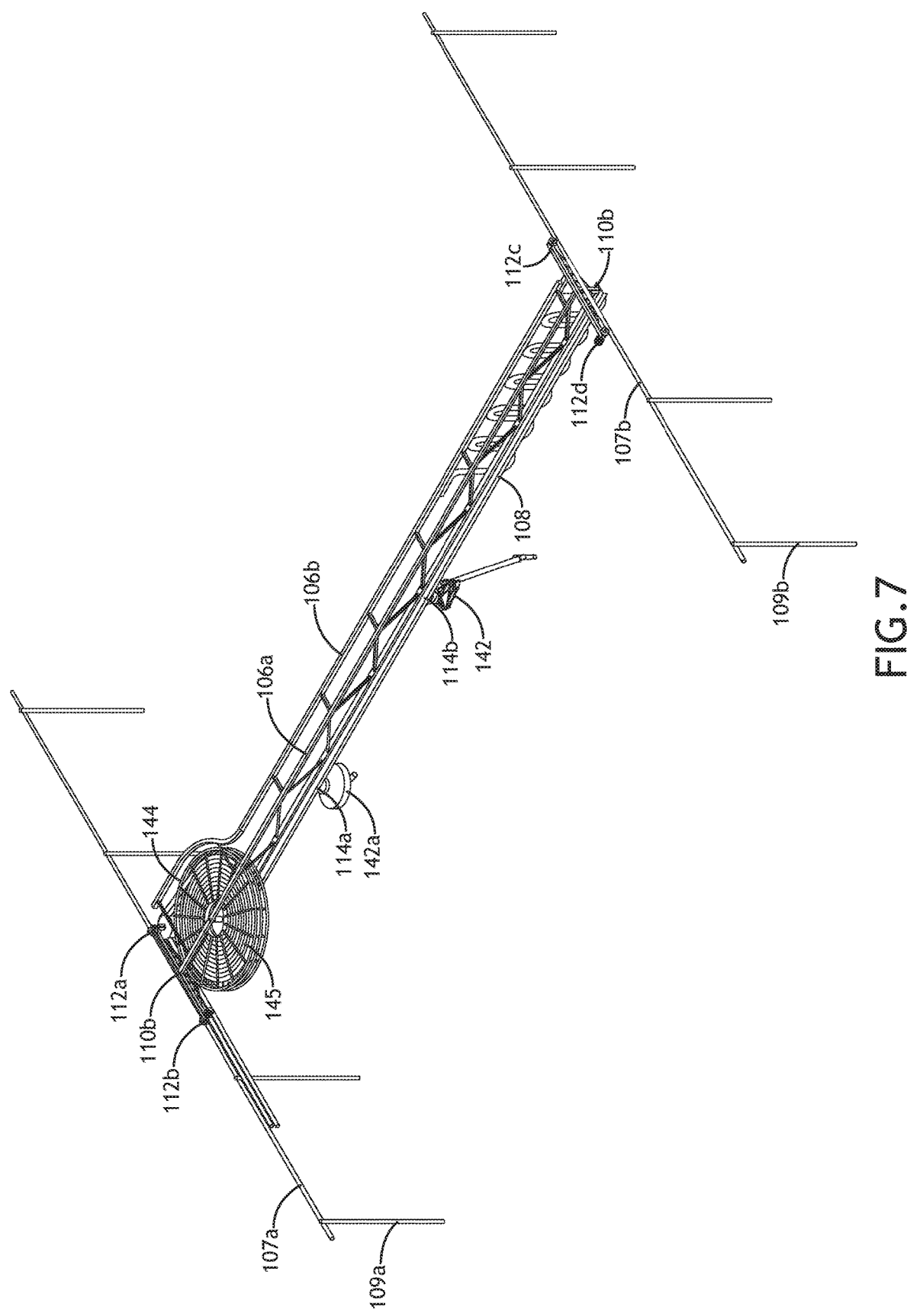
FIG. 7 illustrates a gantry assembly, in accordance with one or more embodiments of the present disclosure.

FIG. 7 illustrates a gantry assembly 102, in accordance with one or more embodiments of the present disclosure. As noted previously herein, the gantry assembly 102 may include, but is not limited to, a support assembly 104 including one or more support frames 106a, 106b, one or more work tool rails 108, one or more support structures 110, and one or more propulsion units 114.

In one embodiment, the one or more support frames 106 and the one or more work tool rails 108 are coupled to one or more support structures 110a, 110b. For example, the gantry assembly 102 may include a first support structure 110a at a first end and a second support structure 110b at a second end. In another embodiment, each support structure 110 may include one or more propulsion units 112. The one or more propulsion units 112 may be configured to engage and/or be disposed upon the one or more support rails 107 such that the propulsion units 112 may be configured to selectively actuate the gantry assembly 102 along the support rails 107. In this regard, the one or more propulsion units 112 may include any propulsion units known in the art including, but not limited to, a friction drive unit (e.g., wheel/tire unit, rollers), direct drive unit (e.g., rack and pinion unit), magnetic drive unit, air powered unit, hydraulic powered unit, and the like.

In another embodiment, the controller 124 is configured to control a direction of travel of the support assembly 104 via geo-spatial position in a given livestock facility 101 to control the one or more propulsion units 112. In this embodiment, a control system is configured to utilize the GPS coordinate of the support structures 110 to accurately determine the position the propulsion units 112 under the support structures 110. Accurate positioning information obtained from each GPS receiver per support structure 110 allows the system to be positioned accurately according to a "prescription" or preprogrammed geo-spatial work order. In this regard, coordinated movement may be implemented where one or more gantry assemblies 102 are used simultaneously. In this regard, the controller 124 is configured to selectively actuate components of the gantry assembly 102 according to where the gantry assembly 102 should be in a defined geo-space with respect to various objects within the livestock facility 101 (e.g., livestock, objects, other gantry assemblies 102, structures, and the like).

In one embodiment, the controller 124 may be configured to generate one or more control signals configured to selectively actuate the gantry assembly 102 to a selected position along the one or more support rails 107 via the one or more propulsion units 112. In another embodiment, the gantry assemblies 102 include one or more position sensors. The position sensors on the gantry assembly 102 map the current location of the assembly 114 on the support rails 107. In embodiments, position sensors may transmit position information to the controller 124. The controller 124 may analyze the position information of the gantry assembly 102 and determine whether the gantry assembly 102 needs to be re-positioned. Once the controller 124 determines the gantry assembly 102 is in the correct position along the support rails 107, the controller 124 may cause the propulsion units 112 to switch to an inactive state. If the controller 124 determines the gantry assembly 102 must be re-positioned, the controller 124 then transmits the action of "re-position to X set of coordinates" on the support rails 107.

In embodiments, the controller 124 may be configured to store time-stamped position data of the gantry assembly 102 in memory 128. Furthermore, the controller 124 may be configured to transmit time-stamped position data to another controller 124 and/or the server 136, which may additionally and/or alternatively be configured to store received position data in memory 128, 140.

One or more components of the support assembly 104 may be formed from any lightweight material known in the art. For example, one or more components of the support assembly 104 may be constructed from, but are not limited to, carbon steel, alloy steel, carbon fiber, a carbon fiber-reinforced plastic, or graphene. By way of another, one or more components of the support assembly 104 may be constructed from, but are not limited to, one or more plastic and/or composite materials. By way of another example, one or more components of the support assembly 104 may be constructed from, but are not limited to, one or more lightweight metals (e.g., aluminum) or a 3D printed material. It is noted that the construction of the support assembly 104 is not limited to one or more lightweight materials. For example, one or more components of the support assembly 104 may be formed from one or more non-lightweight materials, such as, but not limited to, steel, iron, and the like.

Furthermore, the support assembly 104 may be fabricated using any shape or technique known in the art. For example, the support assembly 104 may be fabricated by welding the one or more support frames 106 into a truss-type structure. For instance, the truss may have, but is not limited to, a triangular prism shape (i.e., the truss has a triangle cross-section when viewed from the end of the support frame 106. By way of another example, the truss may have, but is not limited to, a rectangular prism shape (e.g., the truss has a square or rectangular cross-section when viewed from the end of the support frame 106). It is noted the truss may have up to an N-sided cross-section (e.g., the truss has an N-side cross-section when viewed from the end of the support frame 106). By way of another example, the support frame 106 may be constructed from one or more curved structures. For instance, at least a portion of the one or more curved structures (i.e., parabolic structures or bow structures) may be arranged in a substantially vertical direction (i.e., 90 degrees from ground). Additionally, at least a portion of the one or more parabolic structures may be arranged in a substantially horizontal direction (e.g. 0 degrees from ground). Additionally, at least a portion of the one or more parabolic structures may be arranged at a selected angle from the ground (e.g., angle ranging from 0.1-90 degrees from ground). It is noted that constructing the support frame 106 with one or more parabolic structures in this fashion will provide additional support for one or more work tool rails 108, which are described in additional detail further herein.

By way of another example, the support assembly 104 may include single and/or individual tube members, or one or more individual structures coupled together. By way of another example, the support assembly 104 may include components fabricated from one or more extruded materials.

In another embodiment, the support assembly 104 includes the one or more work tool rails 108. For example, the support assembly 104 may include a work tool rail 108a and a work tool rail 108b. In another embodiment, the support assembly 104 includes one or more transfer rails 108c coupling the one or more work tool rail 108a or 108b together. Furthermore, the support assembly 104 may include one or more transfer rails configured to couple a first work tool rail 108a of a first gantry assembly 102a and a second work tool rail 108b of a second gantry assembly 102b, such that a work tool assembly 114 may be actuated between the first gantry assembly 102a and the second gantry assembly 102b. It is noted herein the support assembly 104 may include any number of work tool rails 108. It is further noted herein the support assembly 104 may include any number of transfer rails.

In another embodiment, as shown in FIG. 7, the gantry assembly 102 may include a hose reel 144. The hose reel 144 may be configured to store one or more supply lines 145 including, but not limited to, a liquid hose, a compressed air hose, an electric power line, and the like. As noted previously herein, the one or more supply lines 145 may be stored within a hose tray 115 of the plurality of support structures 109. In this regard, the one or more supply lines 145 may be routed from respective supply sources (e.g., water tanks, feed tanks, compressed air units, electricity sources, generators, and the like) to the support assembly 104 via the hose tray 115, and may then be stored within the hose reel 144 of the support assembly 104. In this regard, the one or more supply lines 115 may be configured to provide water, liquid, compressed air, electricity, and the like to the support assembly 104 (e.g., work tool assemblies 114, work tool attachments 142, and the like).

In another embodiment, the controller 124 may be configured to selectively rotate the hose reel 144 as the gantry assembly 102 actuates along the support rails 107 in order to prevent pulling and/or bunching the supply lines 145. For example, as the gantry assembly 102 moves along the support rails 107 away from the supply sources of the supply lines 145, the controller 124 may cause the hose reel 144 to rotate in an "unwinding" direction and thereby lay the supply lines 145 within the hose tray 115 so as not to pull the supply lines 145. Conversely, as the gantry assembly 102 moves along the support rails 107 towards the supply sources of the supply lines 145, the controller 124 may cause the hose reel 144 to rotate in a "winding" direction and thereby retrieve the supply lines 145 from the hose tray 115 so as not to bunch the supply lines 145 or cause the supply lines to sag. The hose reel 144 and supply lines 145 will be discussed in further detail herein with respect to FIGS. 11A-12C.

Figure 8A:
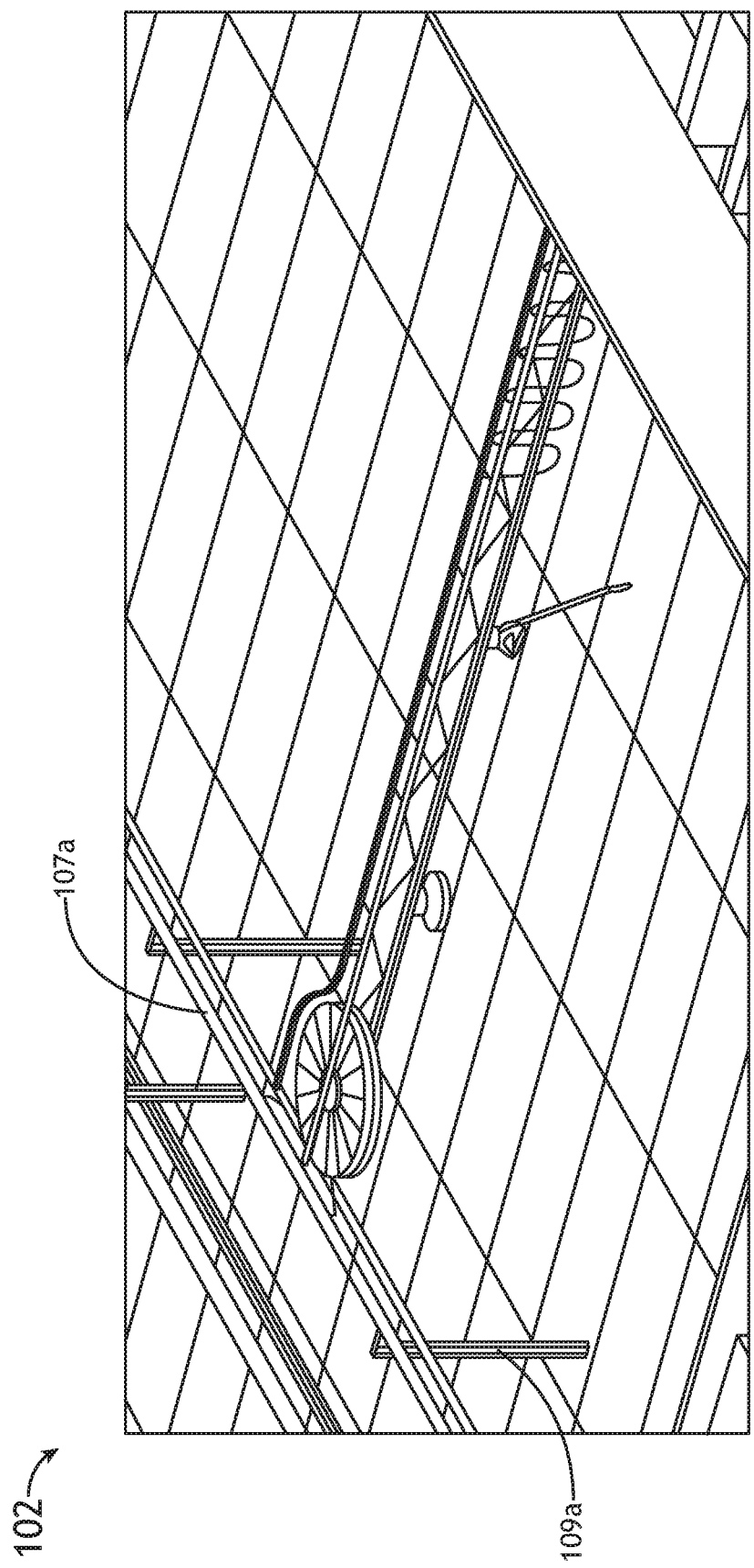
FIG. 8A illustrates a perspective view of a gantry assembly, in accordance with one or more embodiments of the present disclosure.
Figure 8B:
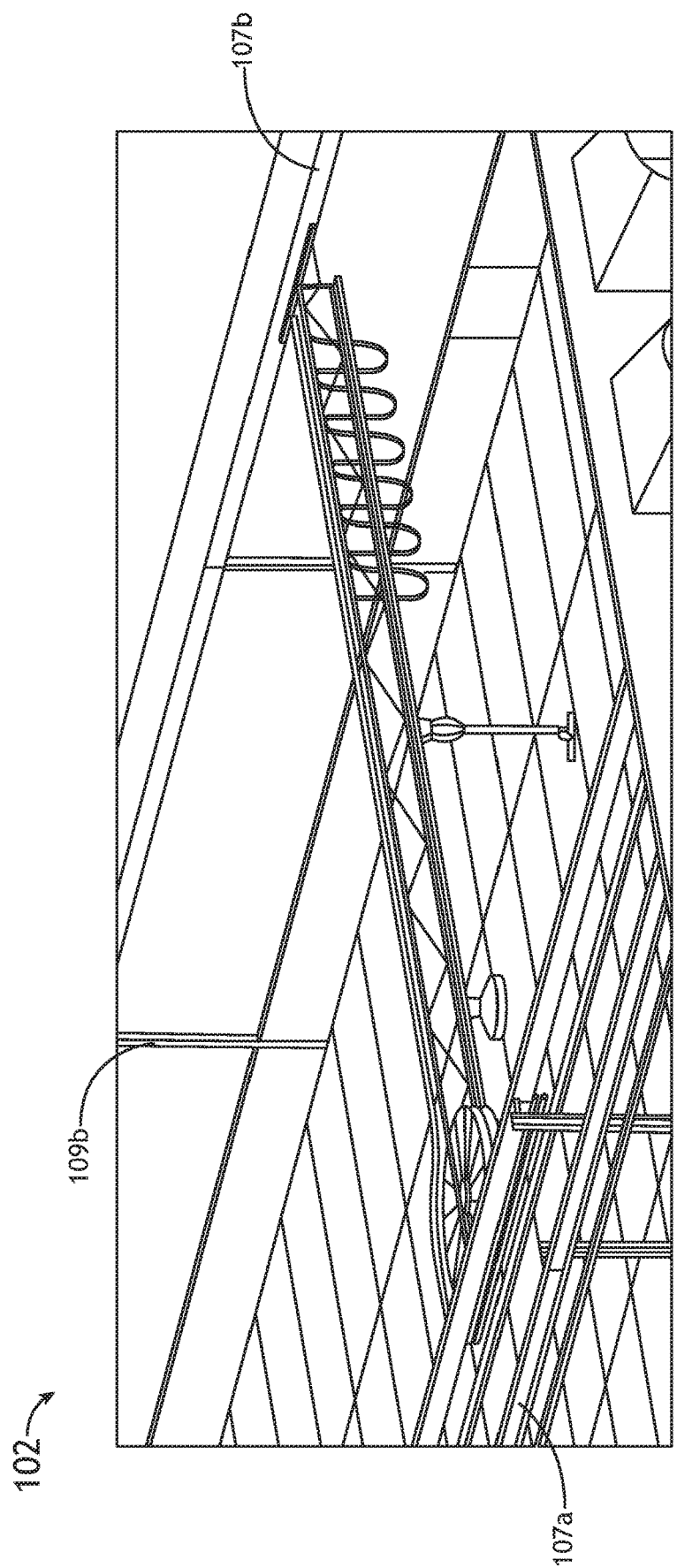
FIG. 8B illustrates a perspective view of a gantry assembly, in accordance with one or more embodiments of the present disclosure.

FIGS. 8A-8B illustrate perspective views of a gantry assembly 102, in accordance with one or more embodiments of the present disclosure.

In another embodiment, as illustrated in FIGS. 8A-8B, the one or more work tool assemblies 114 are coupled to the work tool rail 108. The controller 124 may be configured to operate the one or more work tool assemblies simultaneously and/or in a synchronized manner. In another embodiment, the work tool assembly 114 includes a work tool attachment 142. It is contemplated herein that any number, type, or brand of work tool attachments 142 may be used.

The work tool attachments 142 may include any attachment configured to carry out a particular livestock application such as, but not limited to, power washing, feeding, watering, corralling, imaging, and the like. For example, as shown in FIG. 8A, a first work tool assembly 114a may include a camera work tool attachment 142a including one or more imaging devices, and a second work tool assembly 114b may include a power washer work tool attachment 142b.

Work tool attachments 142 may include, but are not limited to: power washer attachment, a grapple attachment for picking up materials/objects (e.g., dead animals, equipment, materials), camera attachments (e.g., thermal camera, photographic camera, infrared camera, activity tracking camera), audio recording attachments, thermal imaging attachments, 3D scanning/imaging device attachments, laser scanning device attachments, NDVI scanning device attachments, gas sensor attachments (e.g., methane, ammonia, hydrogen dioxide, hydrogen monoxide, hydrogen sulfide sensors), wind speed sensor attachments, sorting tool attachments, physical weighing tool attachments, vaccination tool attachments, temperature probe attachments, feeding attachments, scraping/digging attachments, artificial insemination tool attachments, semen extraction attachments, birthing assistance tool attachments, animal health-related attachments, attachments deigned to exercise/entertain animals, specialty animal handling attachments (e.g., massaging attachments), shearing attachments, branding tool attachments, tooth clipping attachments, tagging attachments, tattooing attachments, horse shoe installation attachments, fish netting attachments, scrapers, grapplers, scoopers, vacuum devices, and the like. Work tool assemblies 114 may include identical work tool attachments 142 or different work tool attachments 142.

It is noted that having one or more work tool assemblies 114 that includes a work tool attachment 142 for separate functions coupled to the gantry assembly 102 may remove the need to have a separate devices/equipment within a livestock facility 101 to perform the separate functions. Furthermore, the work tool attachments 142 may be detachably coupled to the work tool assemblies 114 such that various work tool attachments 142 may be coupled to the work tool assemblies 114 to perform different tasks. In another embodiment, the system 100 may include a docking platform/work tool caddy, where the work tool caddy is configured to store work tool attachments 142 such that the includes one or more components to load and/or unload the work tool assemblies 114. For instance, the work tool caddy may be at a fixed location (e.g. along a wall of a livestock facility 101). In this regard, the work tool attachments 143 may be easily removed when not in use and stored in a designated location. In embodiments, the work tool caddy may be stored within a room or other area within the livestock facility 101 where the stored work tool attachments 143 will be protected from corrosive environments.

Similarly, in embodiments, a livestock facility 101 may include a designated area within which gantry assemblies 102 may be stored. For example, gantry assemblies 102 may be actuated along the support rails 107 to a gantry stowage area within the livestock facility. It is contemplated herein that providing for designated gantry stowage areas (e.g., separate rooms, spaces, and the like) may allow for stowage of the gantry assemblies 102 in a clean and non-corrosive environment. Additionally, gantry stowage areas may include scaffolding or other equipment configured to facilitate maintenance and/or repair of the gantry assemblies 102.

In one embodiment, the controller 124 may be configured to generate one or more control signals configured to selectively actuate the one or more work tool assemblies 114 (and the one or more work tool attachments 142) to a selected position(s) along the one or more work tool rails 108. In another embodiment, the one or more work tool assemblies 114 include one or more position sensors. The position sensors on the work tool assemblies 114 map the current location of the work tool assembly 114 on the one or more work tool rails 108. In embodiments, position sensors may transmit position information to the controller 124. The controller 124 may analyze the position information of the respective work tool assembly 114 and determine whether the work tool assembly 114 needs to be re-positioned. Once the controller 124 determines the work tool assembly 114 is in the correct position along the work tool rails 108, the controller 124 may stop the movement of the work tool assemblies 114. If the controller 124 determines the work tool assembly 114 must be re-positioned, the controller 124 then transmits the action of "re-position to X set of coordinates" on the work tool rail 108.

While the positioning of the gantry assembly 102 along the support rails 107 and the positioning of the work tool assemblies 114 along the work tool rails 108 are described as being carried out by position sensors, this is not a limitation of the present disclosure, unless noted otherwise herein. In this regard, the positioning of the gantry assembly 102 and/or work tool assemblies 114 may be carried out using any techniques known in the art including, but not limited to, GPS receivers, wireless signal triangulation, cable reel position sensors, linear encoders, lasers, radar, ultrasound, and the like.

In embodiments, the support assembly 104 may additionally include one or more material storage containers (not shown). The material storage containers may be filled with various fluids or materials including, but not limited to, water, feed, insect repellent, insect fogging chemicals, and the like. Similarly, the support assembly 104 may additionally include one or more material storage trays configured to hold/contain various types of solid or partially solid materials including, but not limited to, hay, straw, bedding, floor dry, dry food/pellets, salt, and the like. It is contemplated herein that the one or more work tool assemblies 114 (work tool attachments 142) may be configured to carry out one or more operations with the materials stored in on-board material storage containers and/or material storage trays. In this regard, the support assembly 104 may include one or more pipes, tubes, chutes, or the like, configured to direct material stored within/on an on-board material storage containers and/or material storage trays to the one or more work tool attachments 142. Furthermore, the support assembly 104 may include one or more work tool attachments 142 and/or on-board work tools configured to facilitate handling of on-board solid materials (e.g., straw, hay, bedding material) including, but not limited to, an on-board shredder, and the like.

In another embodiment, system 100 may utilize one or more machine learning techniques to carry out one or more functions of the present disclosure. It is contemplated herein that system 100 may be configured to carry out any type of deep learning technique and/or machine learning algorithm/classifier known in the art including, but not limited to, a convolutional neural network, an ensemble learning classifier, a random forest classifier, an artificial neural network, and the like. In this regard, the one or more processors 12, 138, 146 may be configured to train one or more machine learning classifiers configured to carry out the one or more functions of the present disclosure.

For example, system 100 may be configured to utilize one or more machine learning techniques in order to monitor the health of livestock within a livestock facility 101. Deep learning/machine learning techniques may be implemented in order to identify sick animals, prevent the spread of disease, and recognize early warning signs in order to promote livestock health. By way of another example, machine learning techniques may be implemented by system 100 in order to identify dead animals via camera images, thermal images, and the like. Upon identifying one or more dead animals, a work tool attachment 142 may be manually and/or automatically actuated such that the work tool attachment 142 may pick up, move, and dispose of the dead animal. The use of machine learning techniques for automated livestock monitoring is described in further detail by Mateusz Mittek, Eric T. Psota, Lance C. Perez, Ty Schmidt, and Benny Mote in HEALTH MONITORING OF GROUP-HOUSED PIGS USING DEPTH-ENABLED MULTI-OBJECT TRACKING, and Eric T. Psota, Mateusz Mittek, Lance C. Perez, Ty Schmidt, and Benny Mote in MULTI-PIG PART DETECTION AND ASSOCIATION WITH A FULLY-CONVOLUTIONAL NETWORK, which are incorporated herein by reference in the entirety.

Figure 9C:
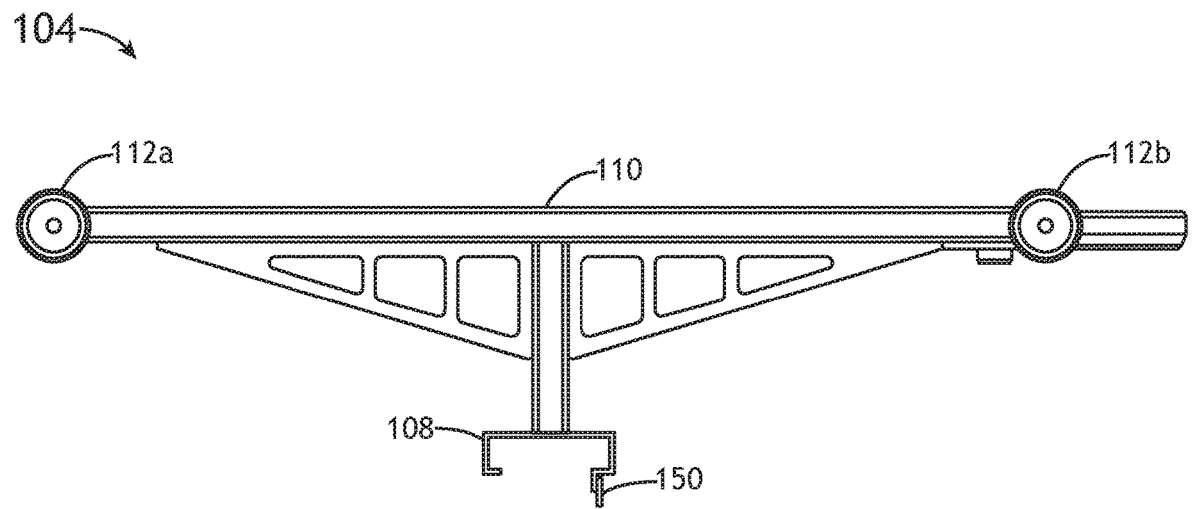
FIG. 9C illustrates a side view of a support assembly of a gantry assembly, in accordance with one or more embodiments of the present disclosure.
Figure 9D:
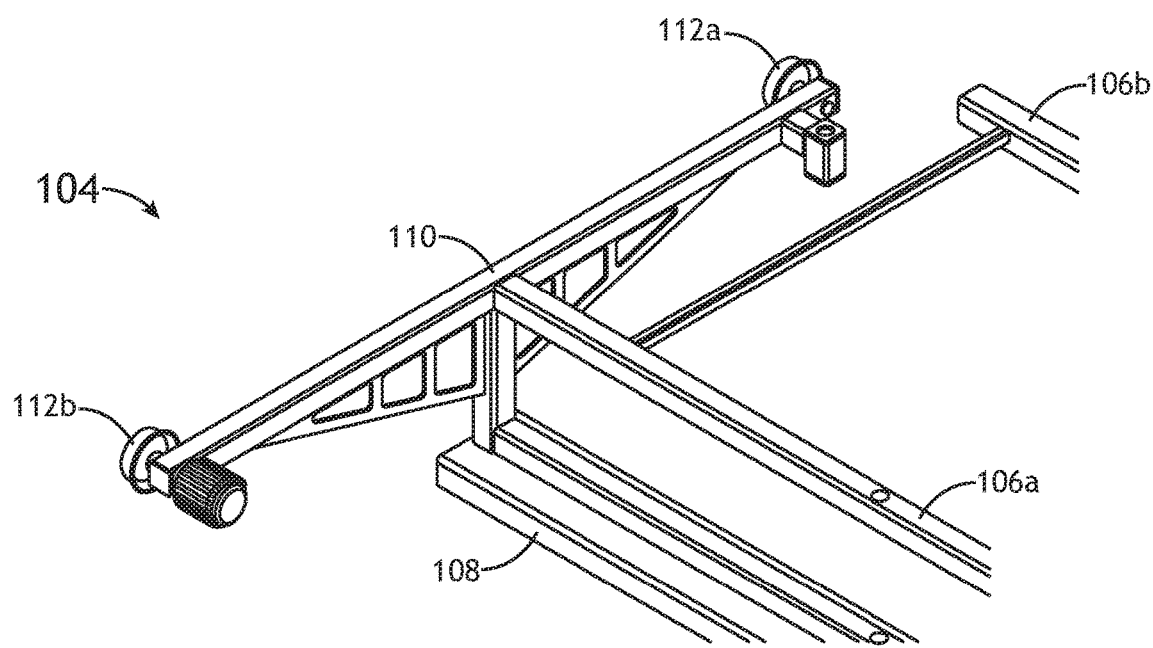
FIG. 9D illustrates a perspective view of a support assembly of a gantry assembly, in accordance with one or more embodiments of the present disclosure.
Figure 9E:
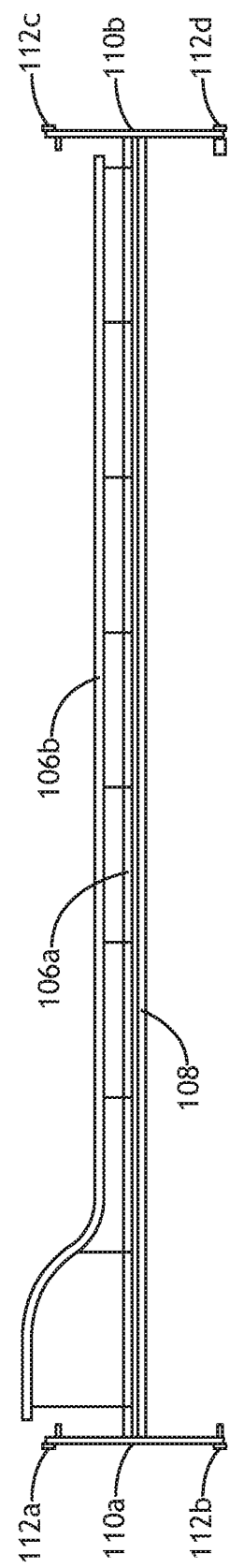
FIG. 9E illustrates a top view of a support assembly of a gantry assembly, in accordance with one or more embodiments of the present disclosure.

FIG. 9A illustrates a perspective view of a support assembly 104 of a gantry assembly 102, in accordance with one or more embodiments of the present disclosure. FIG. 9B illustrates a side view of a support assembly 104 of a gantry assembly 102, in accordance with one or more embodiments of the present disclosure. FIG. 9C illustrates a side view of a support assembly 104 of a gantry assembly 102, in accordance with one or more embodiments of the present disclosure. FIG. 9D illustrates a perspective view of a support assembly 104 of a gantry assembly 102, in accordance with one or more embodiments of the present disclosure. FIG. 9E illustrates a top view of a support assembly 104 of a gantry assembly 102, in accordance with one or more embodiments of the present disclosure.

It is noted herein that although one or more embodiments are directed to equal-sized work tool rails in the work tool rail 108, that the work tool rails may instead be of different sizes. For example, the support assembly 104 may include multiple work tool rails 108 of different sizes which are configured for different uses. For instance, the work tool rails 108 may include a first work tool rail 108 configured for "heavy-duty" use, and a second work tool rail 108 configured for "light-duty" use. In the case of the one or more work tool rails 108 including "light-duty" work tool rails 108, the "light-duty" work tool rails 108 may be configured to temporarily accept the one or more work tool assemblies 114 coupled to large work tool attachments for purposes of rearranging those work tool assemblies, even though the one or more "light-duty" work tool rails 108 may not be otherwise configured to accommodate the one or more work tool assemblies 114 coupled to large work tool attachments when those one or more work tool assemblies 114 are in use.

Figure 10A:
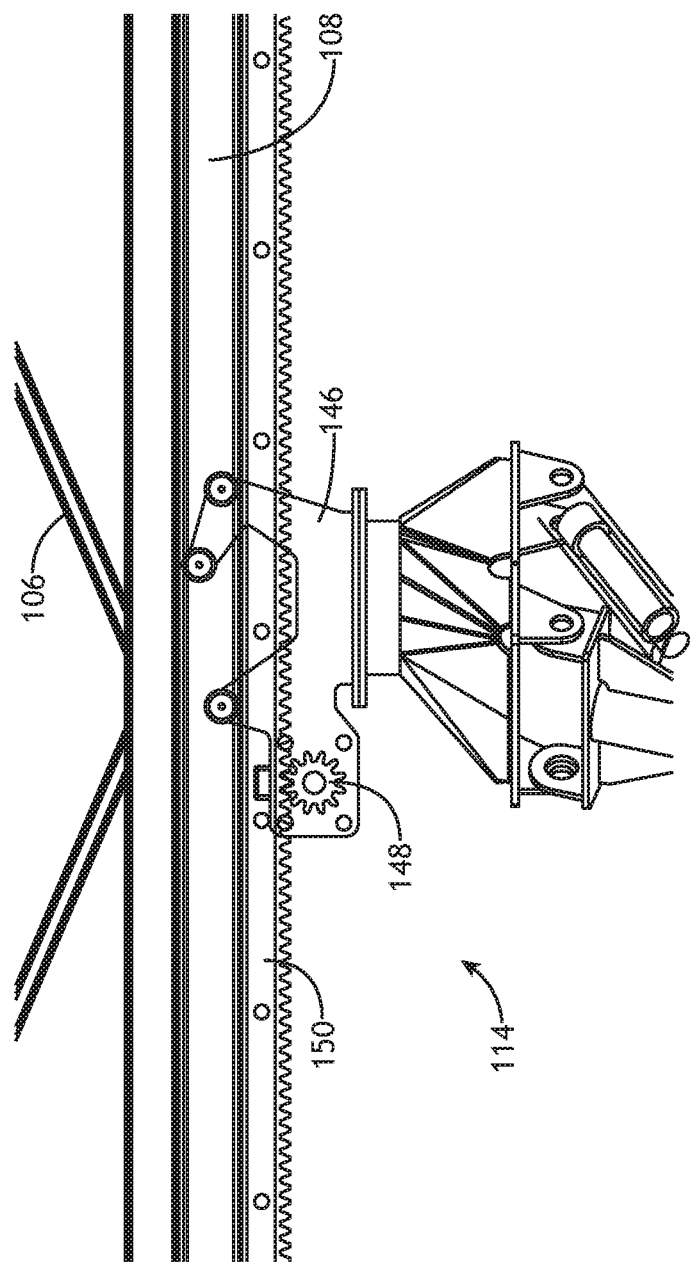
FIG. 10A illustrates a carriage assembly of a gantry assembly, in accordance with one or more embodiments of the present disclosure.

FIG. 10A illustrates a carriage assembly 146 of a gantry assembly 102, in accordance with one or more embodiments of the present disclosure.

In one embodiment, work tool assemblies 114 are coupled to the work tool rails 108 via one or more carriage assemblies 146. In another embodiment, the one or more carriage assemblies 146 may be configured to actuate the one or more work tool assemblies 114 along the work tool rails 108. The one or more carriage assemblies 146 may include any carriage device known in the art configured to couple the work tool assemblies 114 to the work tool rails 108 and facilitate movement of the work tool assemblies 114 along the work tool rails 108. In this regard, the one or more carriage assemblies 146 may be configured to provide movement along the work tool rail 108 using any means known in the art including, but not limited to, direct drive (e.g., rack and pinion), friction (e.g., wheels, tires, and the like), magnetic drive, air power, hydraulic power, and the like. For example, as shown in FIG. 10A, a carriage assembly 146 may include a pinion 146 configured to engage a gear rack 150 disposed on the work tool rail 108 in order to provide positive drive propulsion along the work tool rail 108. The pinion 146 may be powered via a carriage motor, which will be discussed in further detail herein.

Figure 10B:
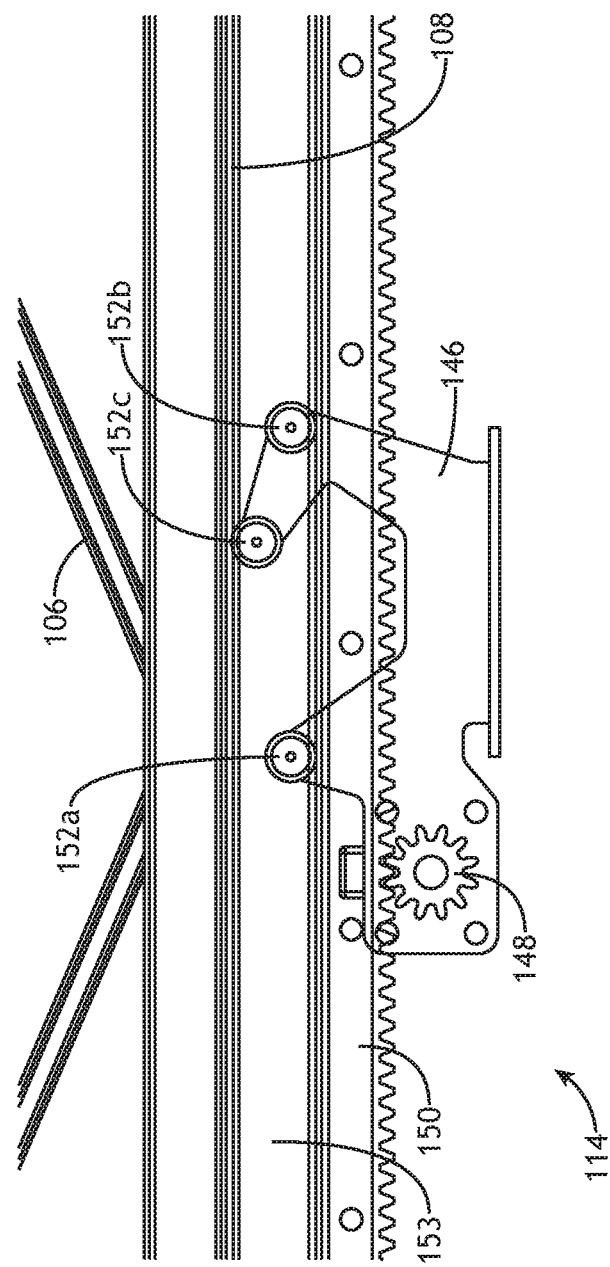
FIG. 10B illustrates a carriage assembly of a gantry assembly, in accordance with one or more embodiments of the present disclosure.

FIG. 10B illustrates a carriage assembly 146 of a gantry assembly 102, in accordance with one or more embodiments of the present disclosure.

In one embodiment, the carriage assembly 146 includes one or more rollers 152. The one or more rollers 152 may be configured to engage one or more tracks 153 of the work tool rail 108 in order to stabilize the carriage assembly 146 and/or work tool assembly 114. For example, as shown in FIG. 10B, the rollers 152a, 152b, 152c may be configured to engage the track 153 of the work tool rail 108 such that a first roller 152a and a second roller 152b are configured to engage a first surface (e.g., bottom surface) of the track 153, and a third roller 152c is configured to engage a second surface (e.g., top surface) of the track 152 in order to prevent vertical movement of the carriage assembly 146 on the work tool rail 108.

Figure 10C:
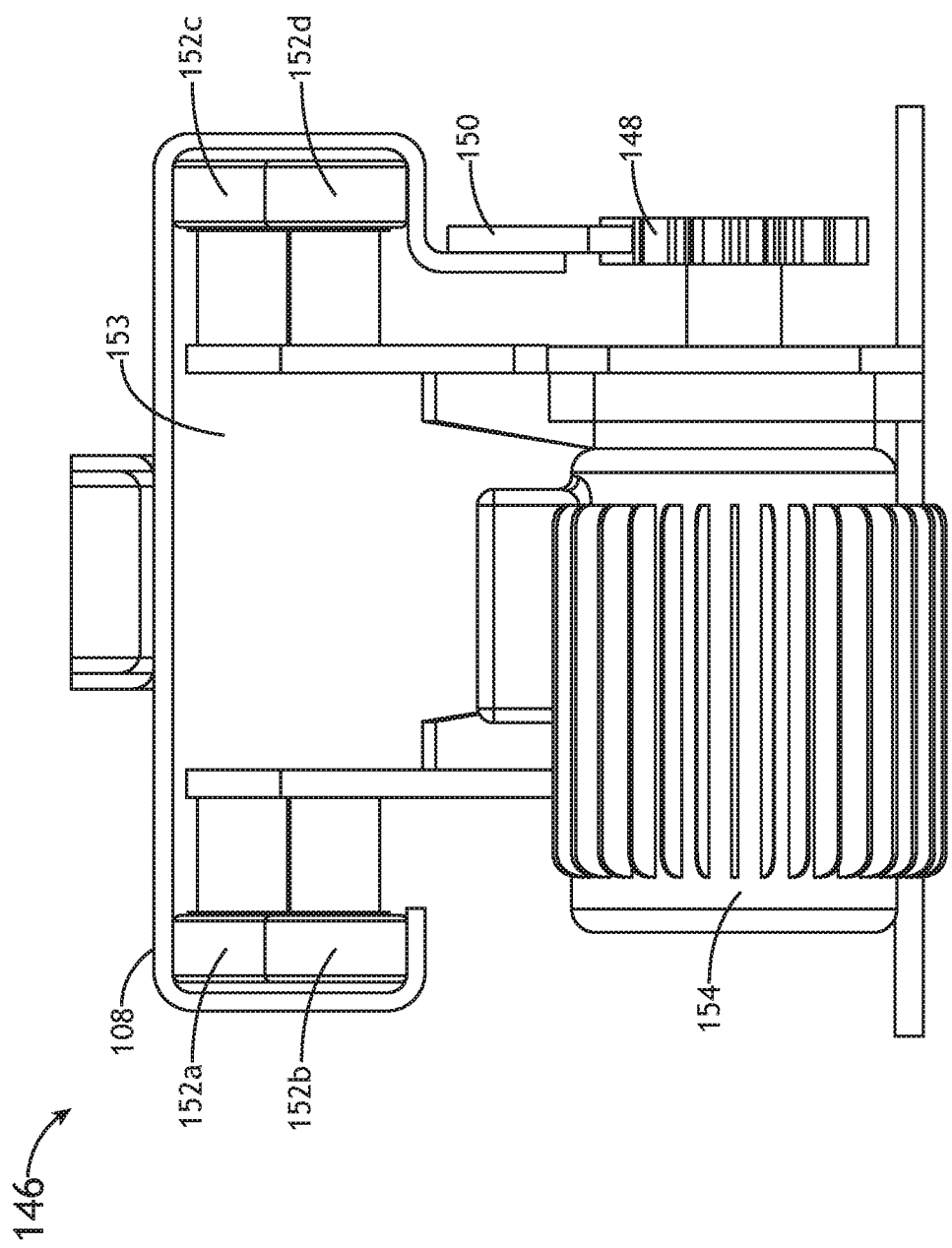
FIG. 10C illustrates a carriage assembly of a gantry assembly, in accordance with one or more embodiments of the present disclosure.
Figure 10D:
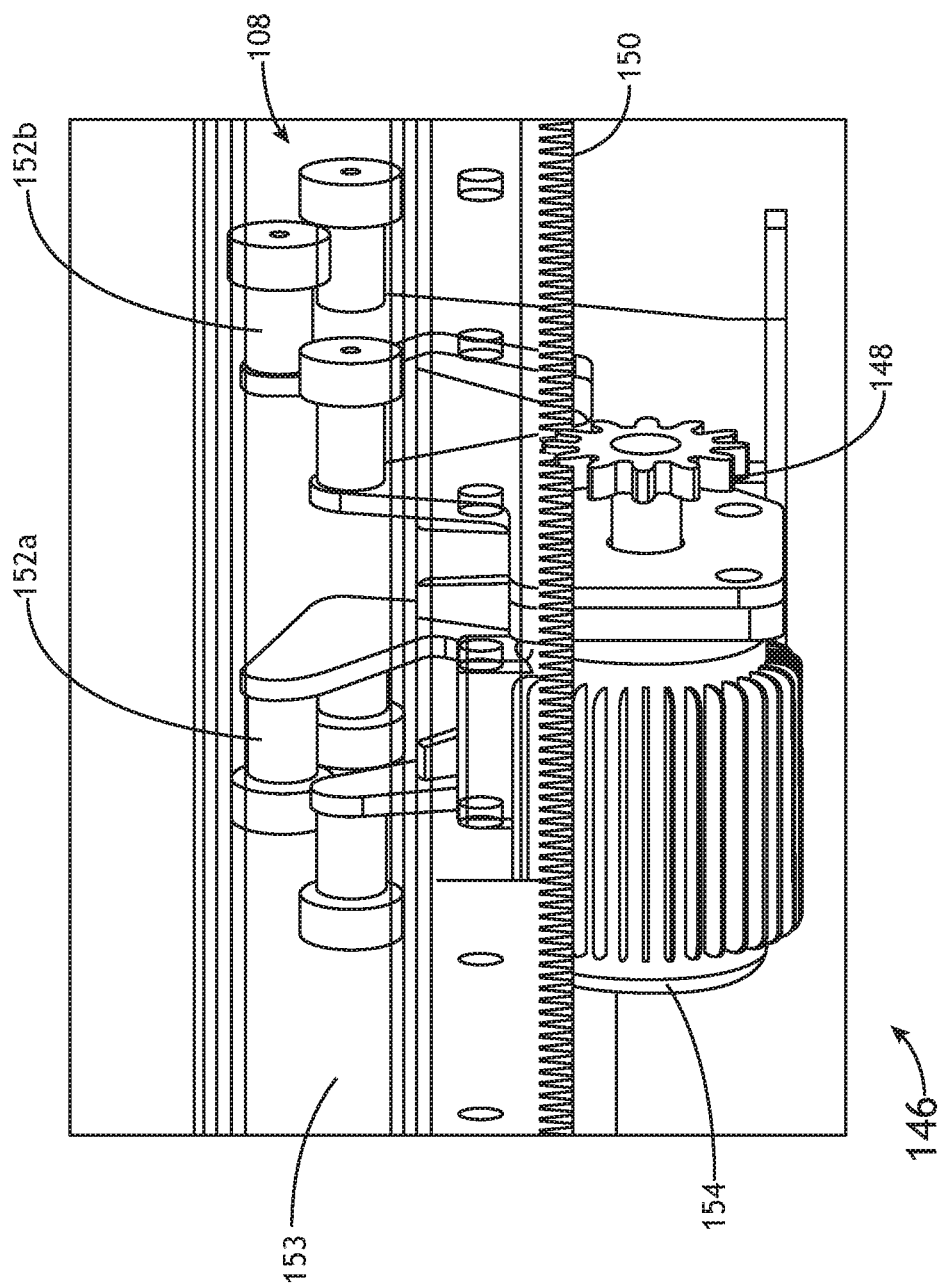
FIG. 10D illustrates a carriage assembly of a gantry assembly, in accordance with one or more embodiments of the present disclosure.

FIG. 10C illustrates a carriage assembly 146 of a gantry assembly 102, in accordance with one or more embodiments of the present disclosure. FIG. 10D illustrates a carriage assembly 146 of a gantry assembly 102, in accordance with one or more embodiments of the present disclosure.

In one embodiment, the one or more carriage assemblies 146 include one or more carriage motors 154. For example, as shown in FIGS. 10C-10D, a carriage motor 154 may be configured to drive the pinion 148 such that the pinion 148 may engage the gear rack 150 and actuate the carriage assembly 146 along the work tool rail 108. The carriage motor 154 may include any motor known in the art including, but not limited to, an electric motor, a gas motor, a diesel motor, and the like.

Figure 10E:
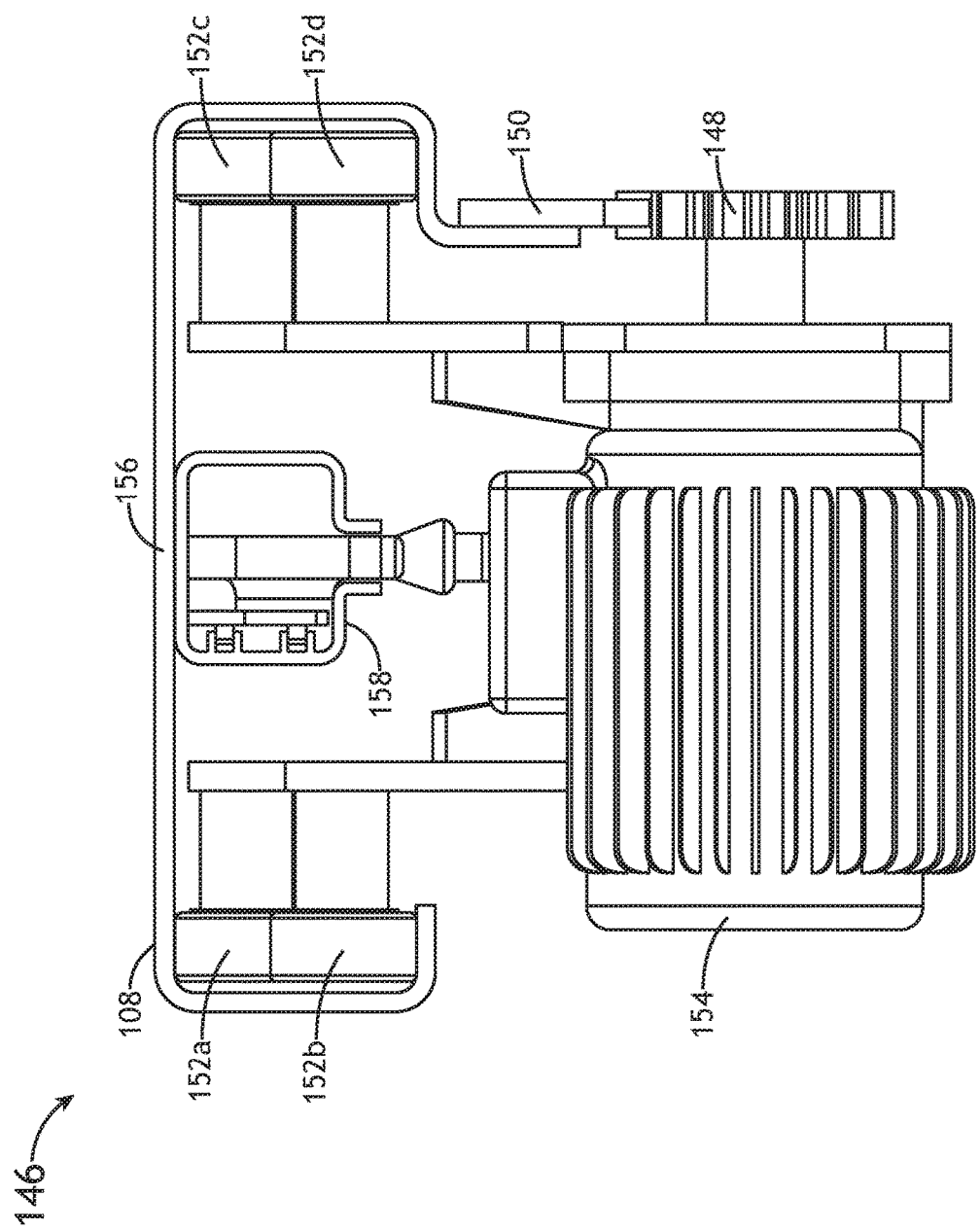
FIG. 10E illustrates a carriage assembly of a gantry assembly, in accordance with one or more embodiments of the present disclosure.

FIG. 10E illustrates a carriage assembly 146 of a gantry assembly 102, in accordance with one or more embodiments of the present disclosure.

In one embodiment, the work tool rail 108 may include one or more electrically powered tracks 156 configured to provide electrical power to the one or more carriage motors 154 via a power unit 158. For example, as shown in FIG. 10E, the work tool rail 108 may include an electrically powered track 156. A power unit 158 of the carriage assembly 146 may be configured to electrically couple to the electrically powered track 156 such that it receives electricity from the electrically powered track 156 and provides electricity to the carriage motor 154. Embodiments with an electrically powered track 156 may provide a direct connection from an electrical energy source to the carriage motors 154 along at least a portion of the work tool rail 108 without the use of wires or cables.

It is noted herein that the one or more electrically powered tracks 156 may not be required. For example, the one or more work tool assemblies 114 may additionally and/or alternatively be powered via one or more batteries, rechargeable batteries, replaceable/interchangeable batteries, and the like.

In some embodiments, the carriage motor 154 and/or power unit 158 of the carriage assembly 146 may be disposed within a track 153 of the work tool rail 108. For example, as shown in FIG. 10E, the power unit 158 may be disposed within the track 153 of the work tool rail 108. It is contemplated herein that disposing the power unit 158 and/or carriage motor 154 within a track of the work tool rail 108 may shelter the power unit 158 and/or carriage motor 154 from debris and provide a non-corrosive environment to preserve high electrical conductivity. Additionally, shielding the power unit 158 and/or carriage motor 154 within a track 153 of the work tool rail 108 may protect against contamination, decrease risk of electrocution, and protect from falling dust/debris. Furthermore, it is contemplated herein that the design of the carriage assembly 146 depicted in FIGS. 10A-10E may reduce carriage assembly 146 assembly time and allow for the carriage assembly 146 to be retrofitted into existing systems if additional work tool rail 108 lengths are required.

Figure 11A:
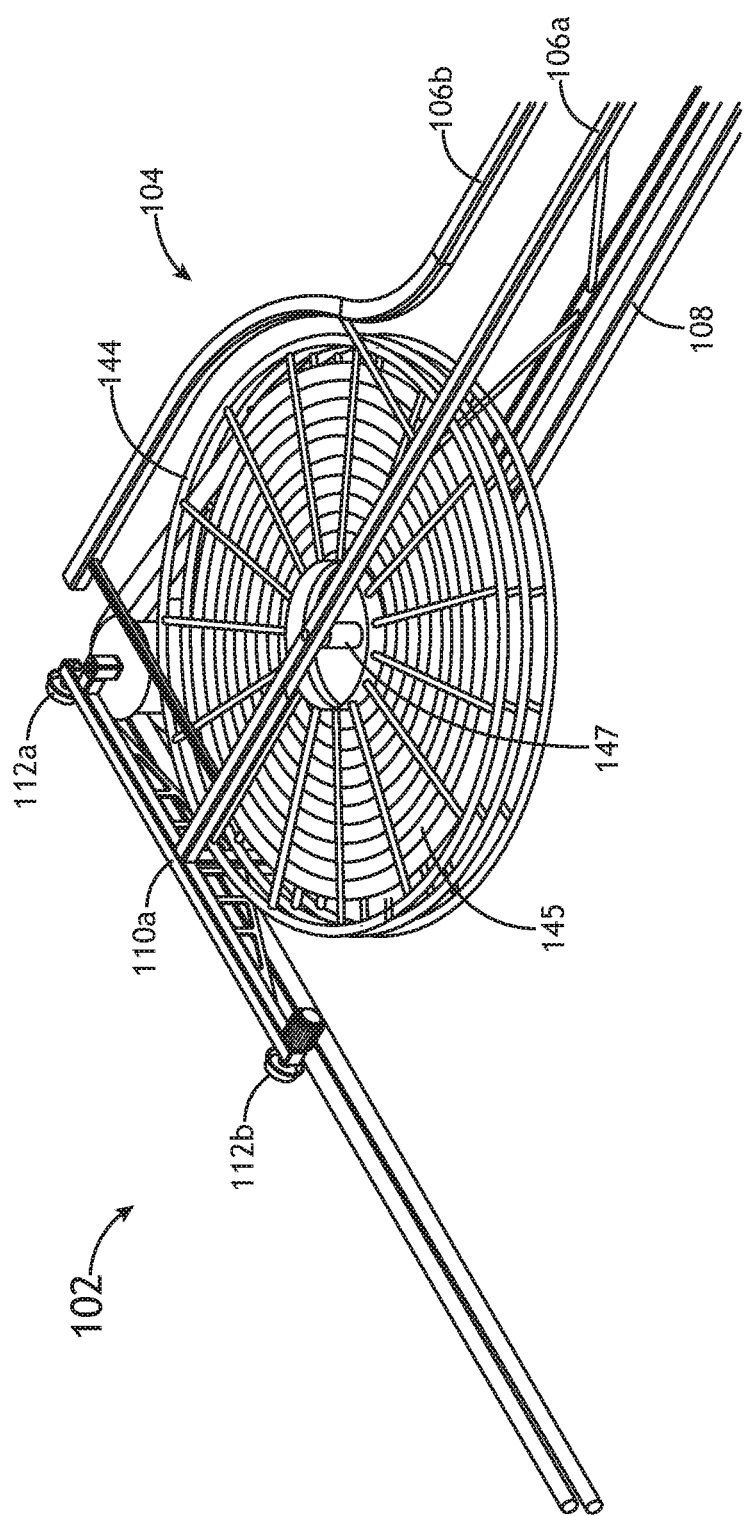
FIG. 11A illustrates a perspective view of a hose reel of a support assembly, in accordance with one or more embodiments of the present disclosure.
Figure 11B:
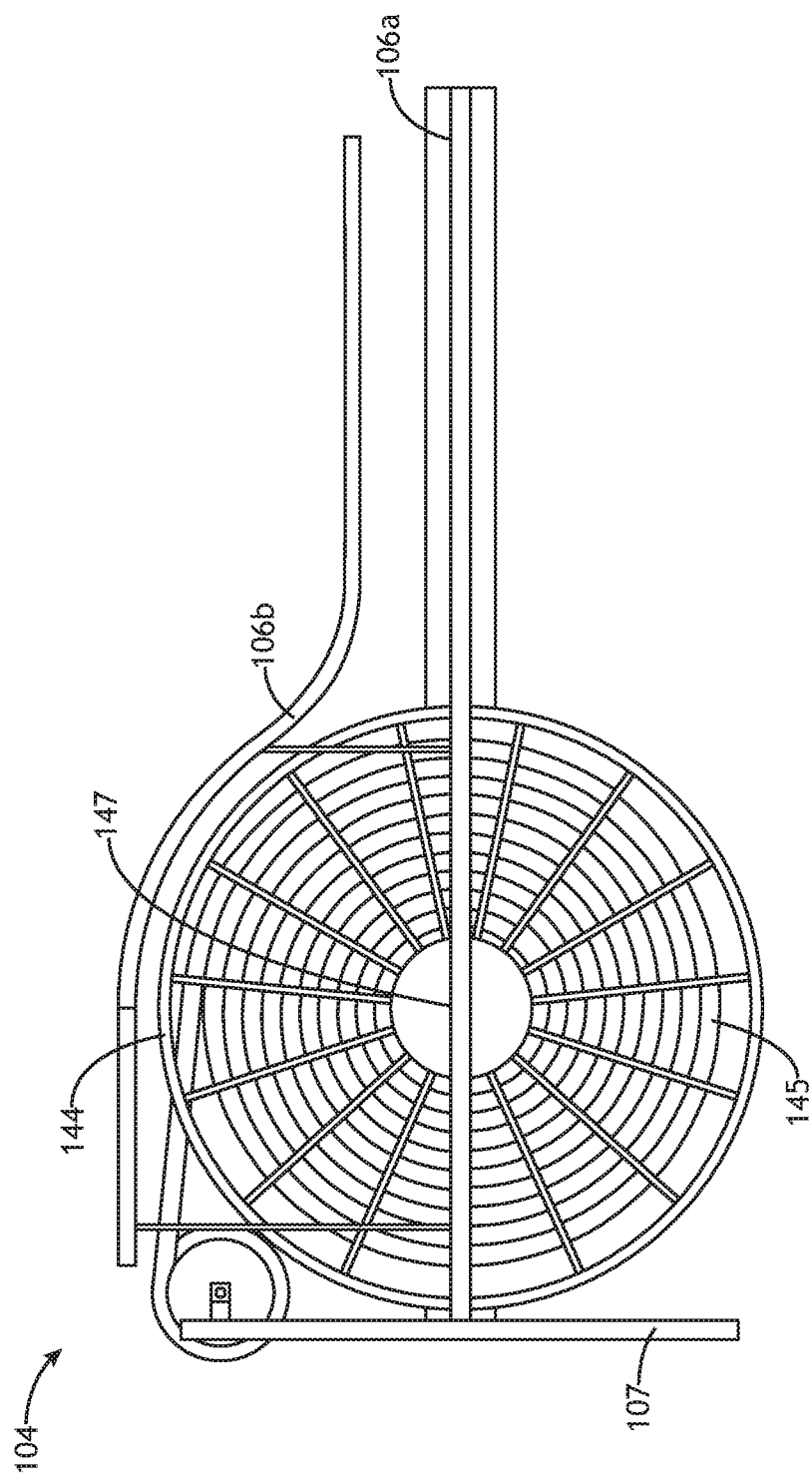
FIG. 11B illustrates a top view of a hose reel of a support assembly, in accordance with one or more embodiments of the present disclosure.

FIG. 11A illustrates a perspective view of a hose reel 144 of a support assembly 104, in accordance with one or more embodiments of the present disclosure. FIG. 11B illustrates a top view of a hose reel 144 of a support assembly 104, in accordance with one or more embodiments of the present disclosure.

In one embodiment, the support assembly 104 includes a hose reel 144. The hose reel 144 may be coupled to the one or more support frames 106 and/or the one or more work tool rails 108 at an axis 147. In one embodiment, the hose reel 144 is configured to rotate about the axis 147 in order to "wind" and "unwind" one or more supply lines 145. In another embodiment, the hose reel 144 is configured to store the one or more supply lines 145. Supply lines 145 may include supply lines configured to provide power, materials, and the like, to the one support assembly 104, work tool assemblies 114, work tool attachments 142, and the like. For example, the one or more supply lines 145 may include, but are not limited to, a liquid hose (e.g., water hose, chemical hose, and the like), a compressed air hose, hydraulic lines/hoses, electrical wires/cables, and the like.

In one embodiment, controller 124 is configured to selectively actuate (e.g., rotate) the hose reel 144 (via a motor, and the like) as the support assembly 104 is actuated across the support rails 107 in order to spool the supply lines 145 on and off the hose reel 144. The controller 124 may be configured to selectively rotate the hose reel 144 as the gantry assembly 102 actuates along the support rails 107 in order to prevent pulling and/or bunching the supply lines 145. For example, as the gantry assembly 102 moves along the support rails 107 away from the supply sources of the supply lines 145, the controller 124 may cause the hose reel 144 to rotate in an "unwinding" direction and thereby lay the supply lines 145 within the hose tray 115 so as not to pull the supply lines 145. Conversely, as the gantry assembly 102 moves along the support rails 107 towards the supply sources of the supply lines 145, the controller 124 may cause the hose reel 144 to rotate in a "winding" direction and thereby retrieve the supply lines 145 from the hose tray 115 so as not to bunch the supply lines 145 or cause the supply lines to sag. The controller 124 may therefore be configured to actuate/rotate the hose reel 144 in conjunction with movement of the support assembly 104 along the support rails 107, such that actuation of the support assembly 104 a distance X away from supply sources of the supply lines 145 causes the hose reel 144 to "unwind" a length X of supply lines 145, and actuation of the support assembly 104 a distance Y towards the supply sources of the supply lines 145 causes the hose reel 144 to "wind" a length Y of supply lines 145.

Figure 11C:
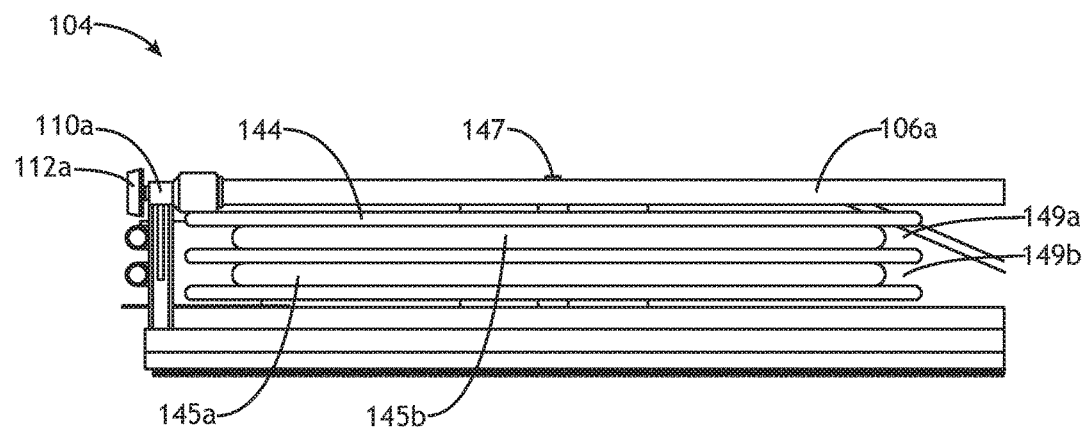
FIG. 11C illustrates a side view of a hose reel of a support assembly, in accordance with one or more embodiments of the present disclosure.
Figure 11D:
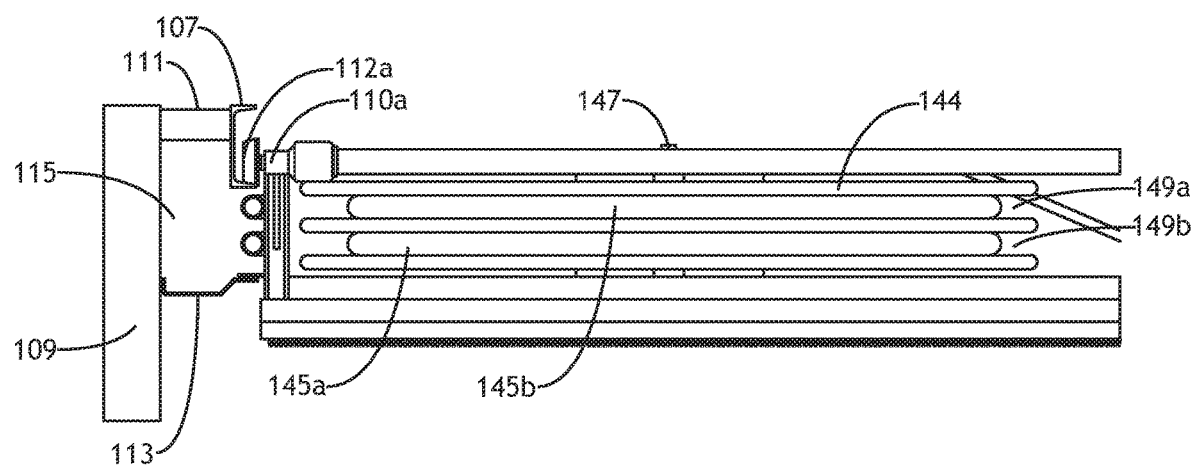
FIG. 11D illustrates a side view of a hose reel of a support assembly, in accordance with one or more embodiments of the present disclosure.

FIG. 11C illustrates a side view of a hose reel 144 of a support assembly 104, in accordance with one or more embodiments of the present disclosure. FIG. 11D illustrates a side view of a hose reel 144 of a support assembly 104, in accordance with one or more embodiments of the present disclosure.

As shown in FIGS. 11C and 11D, the hose reel 144 may be configured to contain one or more supply lines 145 in such a manner as to optimize space and prevent uneven loading, bunching, or pulling of the supply lines 145. For example, as shown in FIG. 11C, the hose reel 144 may be configured to contain a first supply line 145a within a first channel 149a and a second supply line 145b within a second channel 149b. As shown in FIG. 11D, the one or more supply lines 145 may be routed to the gantry assembly 102/support assembly 104 through the hose tray 115 formed by the one or more track supports 113 of the vertical support structures 109. In this regard, as the support assembly 104 moves along the support rails 107 away from the supply sources of the supply lines 145, the hose reel 144 may be actuated such that it "lays down" the support lines 145 within the hose tray 115. Conversely, as the support assembly 104 moves along the support rails 107 towards the supply sources of the supply lines 145, the hose reel 144 may be actuated such that it "picks up" the support lines 145 within the hose tray 115.

Figure 12A:
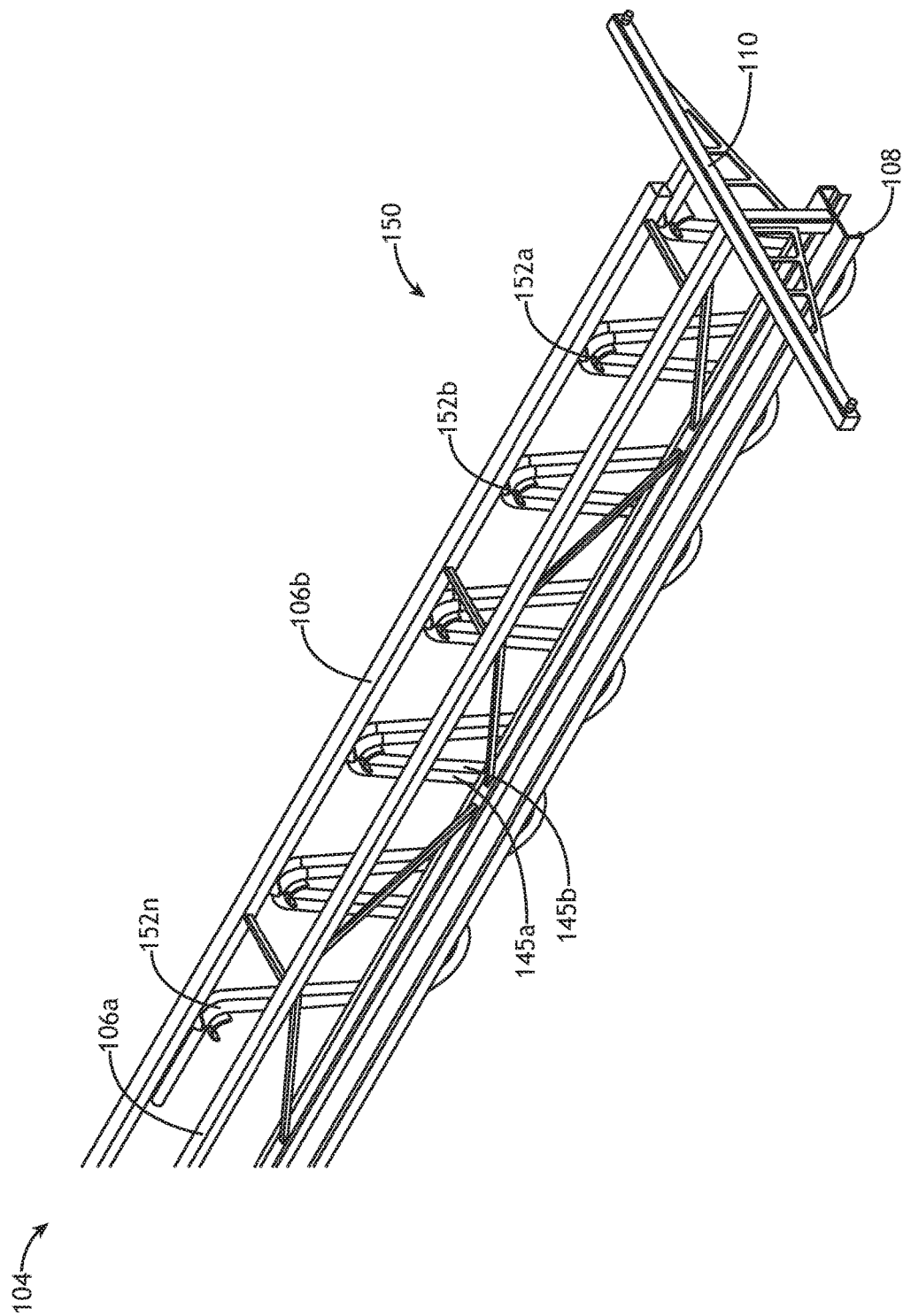
FIG. 12A illustrates a perspective view of a festoon system of a support assembly, in accordance with one or more embodiments of the present disclosure.

FIG. 12A illustrates a perspective view of a festoon system 150 of a support assembly 104, in accordance with one or more embodiments of the present disclosure. FIG. 12B illustrates a side view of a festoon system 150 of a support assembly 104, in accordance with one or more embodiments of the present disclosure. FIG. 12C illustrates a side view of a festoon system 150 of a support assembly 104, in accordance with one or more embodiments of the present disclosure.

In one embodiment, the support assembly 104 includes a festoon system 150 configured to route the supply lines 145 to the work tool assemblies 114/work tool attachments 142 of the gantry assembly 102. Electricity, water, liquids, compressed air, and the like, may be provided to the one or more work tool attachments 142 via the festoon system 150. In one embodiment, the festoon system 150 works in conjunction with the hose reel 144 of the support assembly 104 in order to provide power and materials to the work tool attachments 142. For example, the hose reel 144 may be configured to efficiently contain the supply lines 145 as the support assembly 104 actuates along the support rails 107, whereas the festoon system 150 may be configured to efficiently contain the supply lines 145 as the work tool assemblies 145 actuate along the work tool rails 108. In this regard, the one or more supply lines 145 may be routed from one or more supply sources (e.g., liquid tanks, compressed air tanks, electrical outlets, electrical generators, and the like) through the hose tray 115, to the hose reel 144, to the festoon system 150, then to the work tool assemblies 114.

In one embodiment, the festoon system 150 includes one or more festoon trolleys 152 configured to hold/contain the one or more supply lines 145. In another embodiment, the one or more festoon trolleys 152 are configured to actuate along the support assembly 104 (e.g., a support frame 106a) as a work tool assembly 114 is actuated along the support assembly 104. In this regard, the festoon trolleys 152 are configured to actuate along the support assembly 104 in order to "extend" and "contract" the total effective length of the supply lines 145 as the work tool assembly 114 actuates along the work tool rail 108.

For example, as shown in FIG. 12C, as a work tool assembly 114 actuates along the work tool rail 108 away from the support structure 109 (e.g., to the right), the one or more festoon trolleys 152a, 152n may be configured to actuate to the right along the support frame 106a in order to extend the total effective length of the supply lines 145 and prevent "pulling" on the supply lines 145. As the one or more festoon trolleys 145 actuate to the right, they may separate from one another, thereby extending the total effective length of the supply lines 145. Conversely, as a work tool assembly 114 actuates along the work tool rail 108 away toward the support structure 109 (e.g., to the left), the one or more festoon trolleys 152a, 152n may be configured to actuate to the left along the support frame 106a in order to contract the total effective length of the supply lines 145 and prevent excessive "bunching" on the supply lines 145, which may interfere with the operation of the work tool attachment 142. As the one or more festoon trolleys 145 actuate to the left, they may become closer to one another, thereby contracting the total effective length of the supply lines 145.

It is contemplated herein that the one or more festoon trolleys 152a, 152n of the festoon system 150 may be actuated mechanically in response to movements of the work tool assemblies 114. In an additional and/or alternative embodiment, the one or more festoon trolleys 152a, 152n may be actuated in response to one or more control commands from the controller 124. In this regard, each festoon trolley 152a, 152n may include a motor or other means configured to actuate the festoon trolleys 152a, 152n across the support assembly 104. In another embodiment, the controller 124 may be configured to synchronously actuate the support assembly 104, hose reel 144, festoon system 150, and work tool assemblies 150 in conjunction in order to prevent pulling, bunching, tangling, or otherwise interfering with the supply lines 145.

Figure 13A:
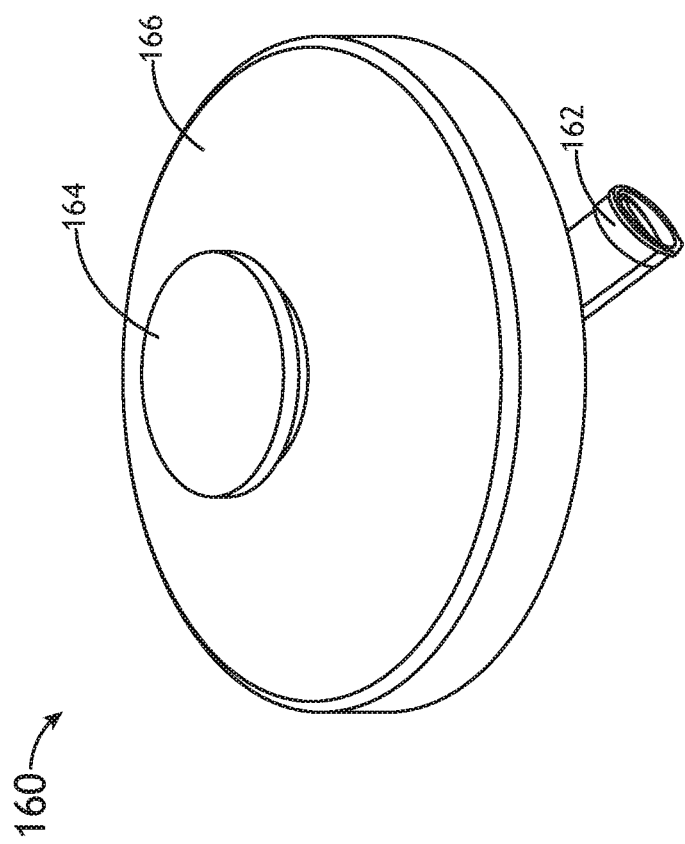
FIG. 13A illustrates a perspective view of a work tool attachment including an imaging tool, in accordance with one or more embodiments of the present disclosure.

FIG. 13A illustrates a perspective view of a work tool attachment 142 including an imaging tool 160, in accordance with one or more embodiments of the present disclosure.

In one embodiment, an imaging tool 160 (e.g., work tool attachment 142) may include a plurality of imaging devices 162 including, but not limited to, cameras (e.g., thermal camera, photographic camera, infrared camera, activity tracking camera), imaging attachments, 3D scanning/imaging device attachments, laser scanning device attachments, NDVI scanning device attachments, and the like. The one or more imaging devices 162 may be communicatively coupled to a controller 124, a server 136 and/or a work tool controller 144. In another embodiment, at the time of capture, each image captured by the imaging devices 162 is tagged with a GPS (Global Positioning System) position and/or time stamp. In this manner, as each picture is uploaded to a given server or controller (e.g., via a network), each image maintains global reference to where the image was taken. This feature is conceived to allow for traceability of the image in comparison to other images taken within one or more livestock facilities 101 for mapping purposes (e.g., Google Maps).

In another embodiment, the imaging tool 160 includes a mounting structure 164 and a housing 166, wherein the mounting structure 164 is configured to couple the imaging tool 160/housing 166 to a carriage assembly 146. In one embodiment, the imaging tool 160 may be configured to rotate in order to facilitate effective imaging of multiple areas of a livestock facility 101. For example, the imaging tool 160 may be configured to be selectively rotated about an axis (e.g., about the mounting structure 164) via the controller 124.

Figure 13B:
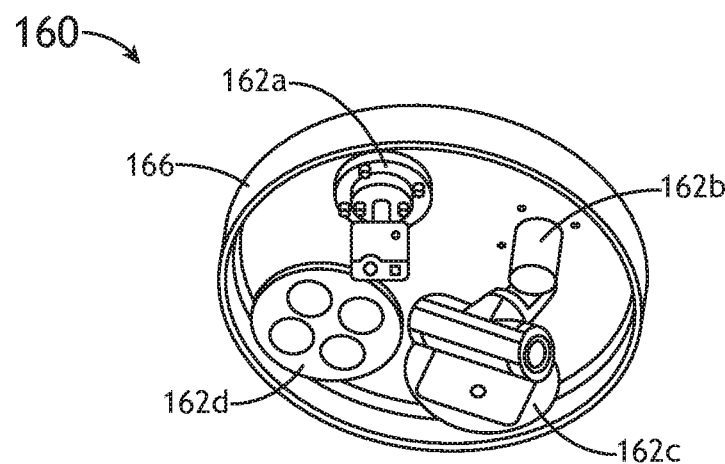
FIG. 13B illustrates a perspective view of an imaging system of a gantry assembly, in accordance with one or more embodiments of the present disclosure.

FIG. 13B illustrates a perspective view of a work tool attachment 142 including an imaging tool 160, in accordance with one or more embodiments of the present disclosure.

In one embodiment, the housing 166 is configured to protect and shield the one or more imaging devices 162a, 162b, 162c, 162d of the imaging tool 160 from debris and other contaminants. In another embodiment, the housing 166 may include one or more holes/ports configured to provide the one or more imaging devices 162a-162d with optical access in order to image/view the livestock facility 101. In an additional and/or alternative embodiment, the housing 166 may include one or more transparent surfaces (e.g., windows, lenses, and the like) configured to provide the one or more imaging devices 162a-162d with optical access.

Figure 13C:
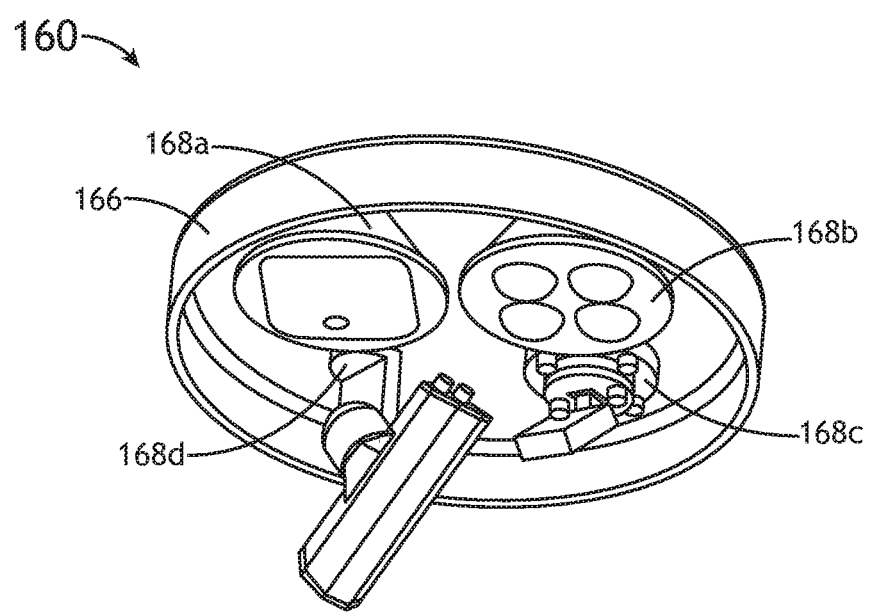
FIG. 13C illustrates a perspective view of an imaging system of a gantry assembly, in accordance with one or more embodiments of the present disclosure.

FIG. 13C illustrates a perspective view of a work tool attachment 142 including an imaging tool 160, in accordance with one or more embodiments of the present disclosure.

In one embodiment, the one or more imaging devices 162a-162d may be coupled to the housing 166 via one or more mounting brackets 168a-168d. In another embodiment, the one or more mounting brackets 168a-168d are configured to be selectively actuated (e.g., rotated) in response to one or more control signals received from the controller 124. In this regard, the entire imaging tool 160 may be selectively actuated/rotated via the mounting structure 164, and each imaging device 162 may be selectively actuated/rotated via the mounting brackets 168a-168d.

In another embodiment, the one or more mounting brackets 168a-168d are configured to detachably couple the one or more imaging devices 162 to the housing 166. It is contemplated herein that by detachably coupling the imaging devices 162 to the housing 166, imaging devices 162 may be easily and efficiently removed for cleaning, replaced, exchanged with alternative imaging devices 162, and the like.

It is noted herein that any of the motors attached to the one or more work tool assemblies 114 (e.g., motors for rotating the housing 166, motors for rotating the mounting brackets 168, and the like) may be driven with an alternative power than electricity. For example, any of the motors attached to the one or more work tool assemblies 114 may be driven hydraulically or pneumatically. By way of another example, the one or more work tool assemblies 114 may include any control systems components necessary to actuate hydraulically and/or pneumatically-driven motors. Therefore, the above description should not be interpreted as a limitation on the present invention but merely an illustration.

Figure 14A:
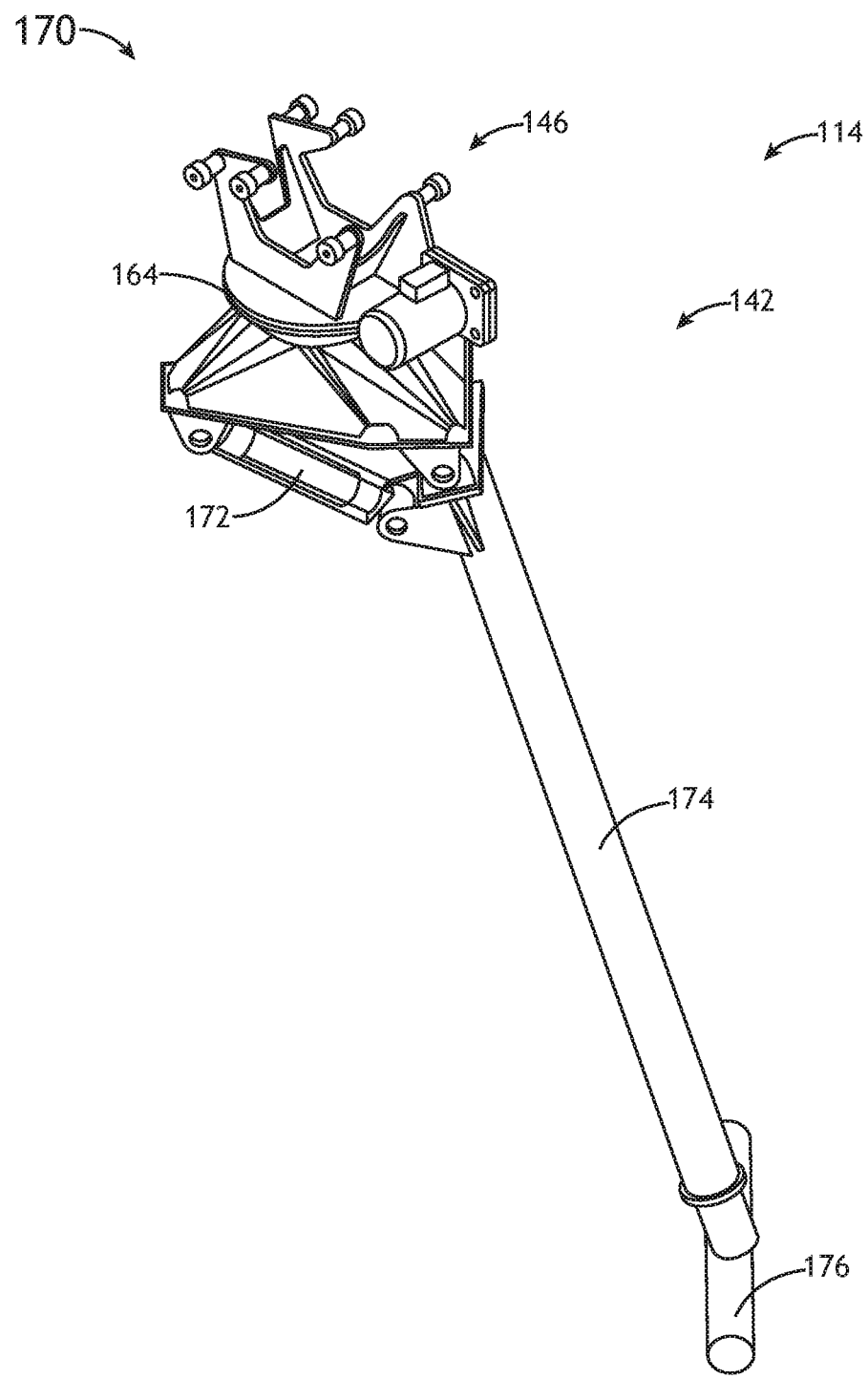
FIG. 14A illustrates a work tool assembly including a pressure washer work tool attachment, in accordance with one or more embodiments of the present disclosure.
Figure 14C:
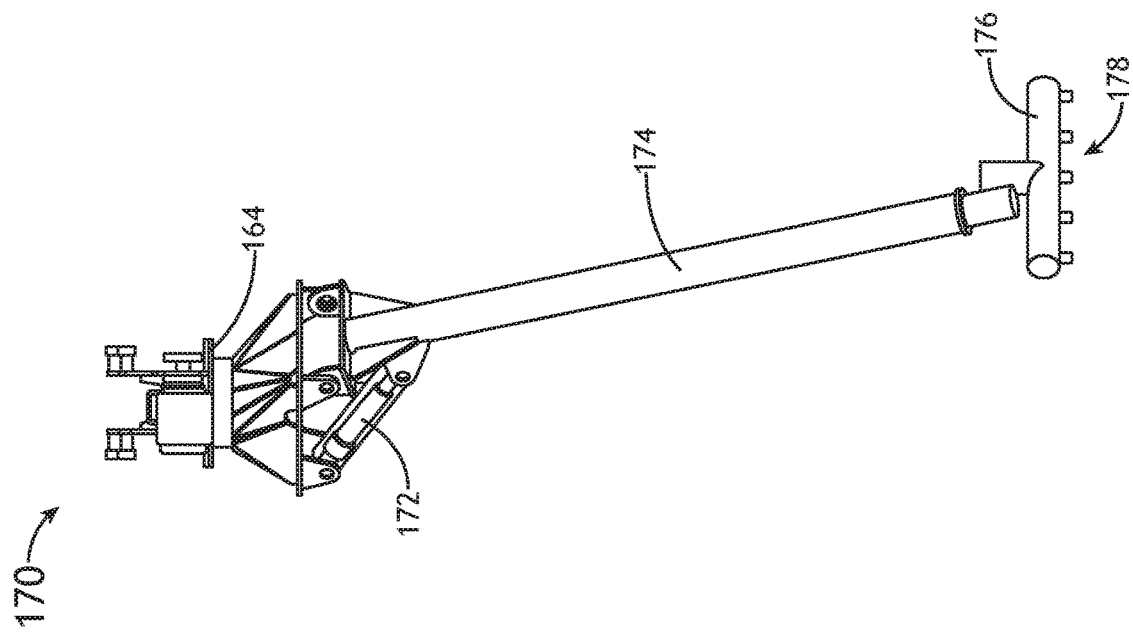
FIG. 14C illustrates a work tool assembly including a pressure washer work tool attachment, in accordance with one or more embodiments of the present disclosure.
Figure 14B:
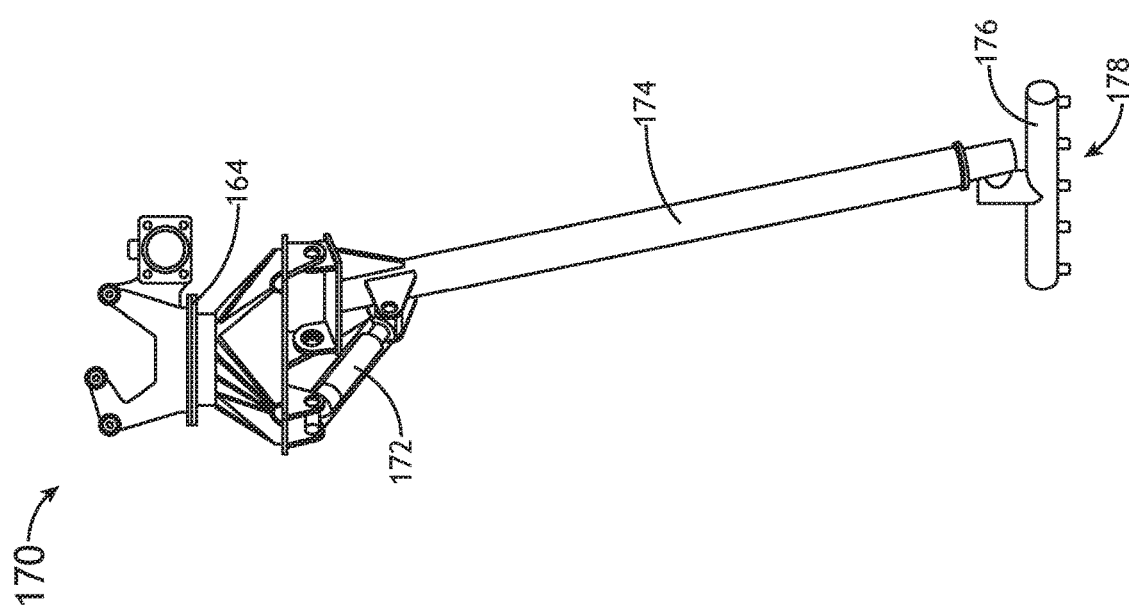
FIG. 14B illustrates a work tool assembly including a pressure washer work tool attachment, in accordance with one or more embodiments of the present disclosure.

FIGS. 14A-14C illustrate a work tool assembly 142 including a pressure washer work tool attachment 170, in accordance with one or more embodiments of the present disclosure.

In one embodiment, various components of the pressure washer work tool attachment 170 may be communicatively coupled to a controller 124, a server 136 and/or a work tool controller 144 In one embodiment, the pressure washer work tool attachment 170 is coupled to a carriage assembly 142 via a mounting structure 164. As noted previously herein, the mounting structure 164 may be configured to be selectively rotated about an axis in response to control signals from a controller 124 in order to improve access of the pressure washer work tool attachment 170 to one or more areas/regions (e.g., pens, rooms, and the like) of a livestock facility 101. In another embodiment, the pressure washer work tool attachment 170 may include, but is not limited to, one or more hydraulic cylinders 172, a wand 174, a head 176, and one or more nozzles 178. In another embodiment, the controller 124 may be configured to selectively rotate the pressure washer work tool attachment 170 about a central axis of the wand 174, selectively actuate/swivel/rotate the head 176, and the like. In this regard, the pressure washer work tool attachment 170 may be configured to be rotated about two or more axes. This may allow improved flexibility to ensure all regions/areas of a livestock facility 101 can be thoroughly cleaned.

In one embodiment, the one or more hydraulic cylinders 172 are configured to selectively actuate (e.g., raise, lower) the pressure washer work tool attachment 170 (e.g., wand 174, head 176) in response to control signals from the controller 124. For example, as the hydraulic cylinder 172 extends, the wand 174 may be moved upwards. This may be done in order to store the pressure washer work tool attachment 170, move the pressure washer work tool attachment 170 above one or more obstacles (e.g., gates, pens, equipment, and the like), of the livestock facility 101, and the like. Conversely, as the hydraulic cylinder 172 extends, the wand 174 may be moved downwards. This may be done to bring the head 176 and one or more nozzles 178 in closer proximity with the surfaces, regions, objects, or the like which are to be cleaned/sprayed.

In another embodiment, the support assembly 104 and/or pressure washer work tool attachment 170 may include one or more heating elements configured to heat water or other liquids to be used by the pressure washer work tool attachment 170. In this regard, one or more heating elements may be configured to facilitate efficient cleaning of livestock facilities 101 with heated water. The one or more heating elements may include any heating elements known in the art. Additionally, the one or more heating elements may be coupled to the one or more support lines 145 in any location including, but not limited to, on one or more support frames 106, on a carriage assembly 142, within the pressure washer work tool attachment 170, and the like. In an additional and/or alternative embodiment, a livestock facility 101 may include one or more heating elements configured to provide heated liquids to two or more gantry assemblies 102. In this regard, a single heating device may be shared by a plurality of gantry assemblies 102/pressure washer work tool attachments 170.

Figure 15A:
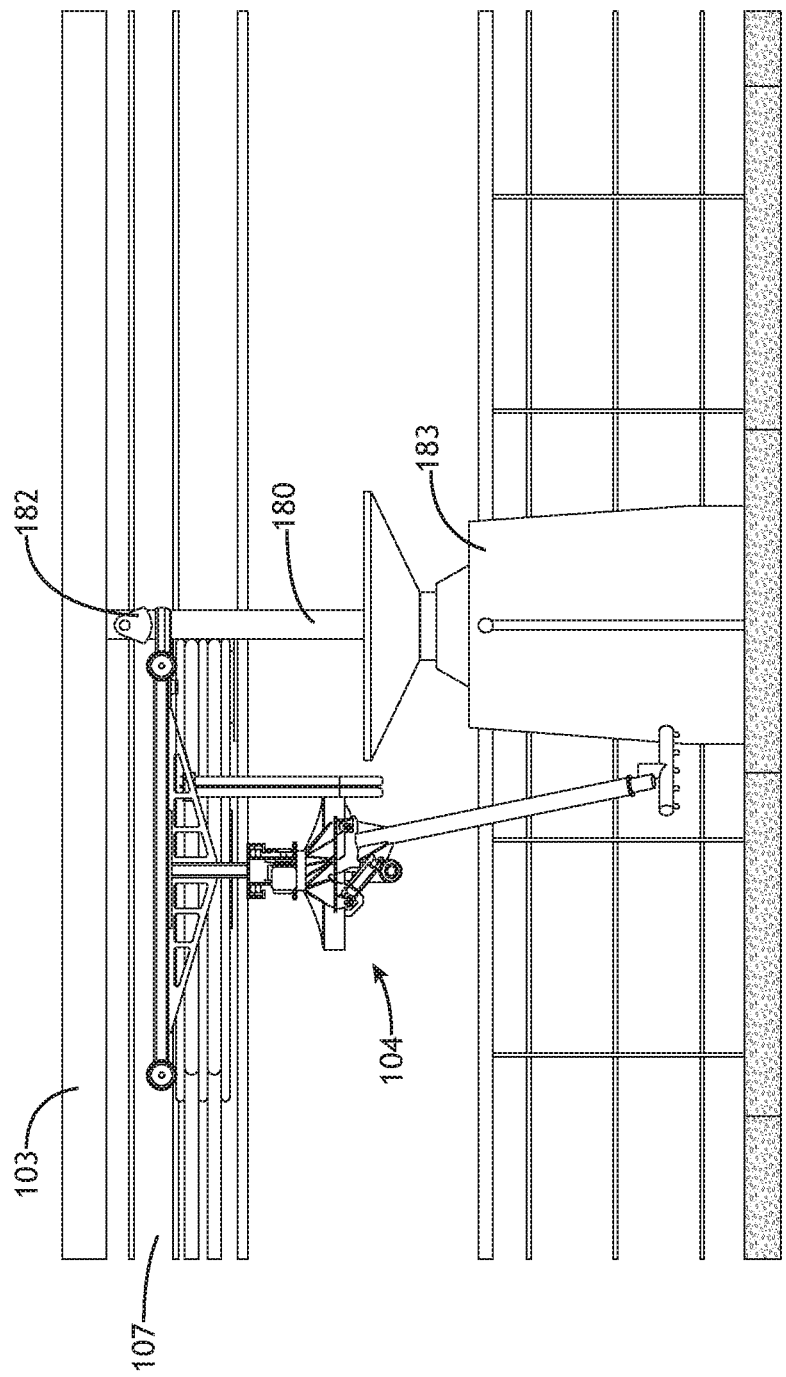
FIGS. 15A-15Q illustrate sequential images of a support assembly of a gantry assembly passing a hinged feed tube, in accordance with one or more embodiments of the present disclosure.
Figure 15B:
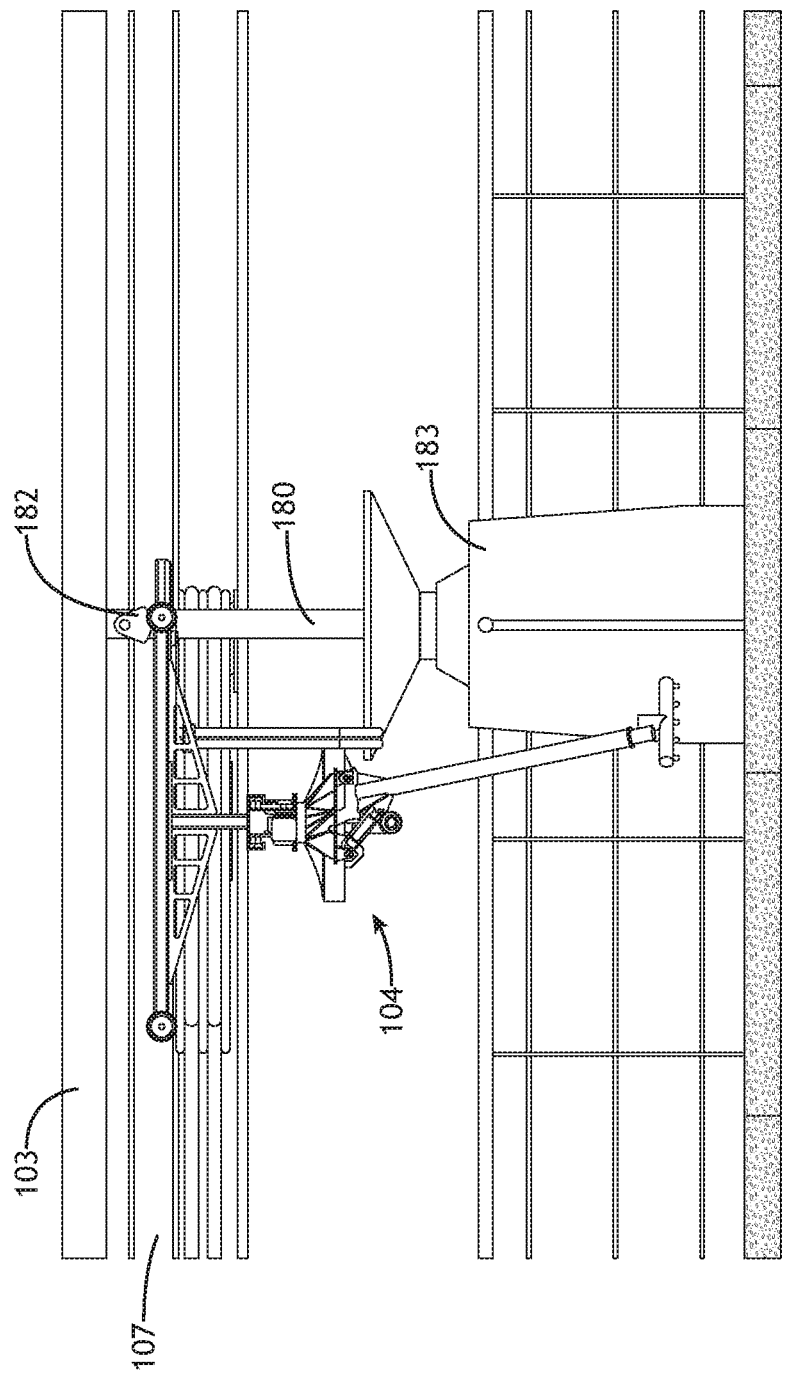
Figure 15C:
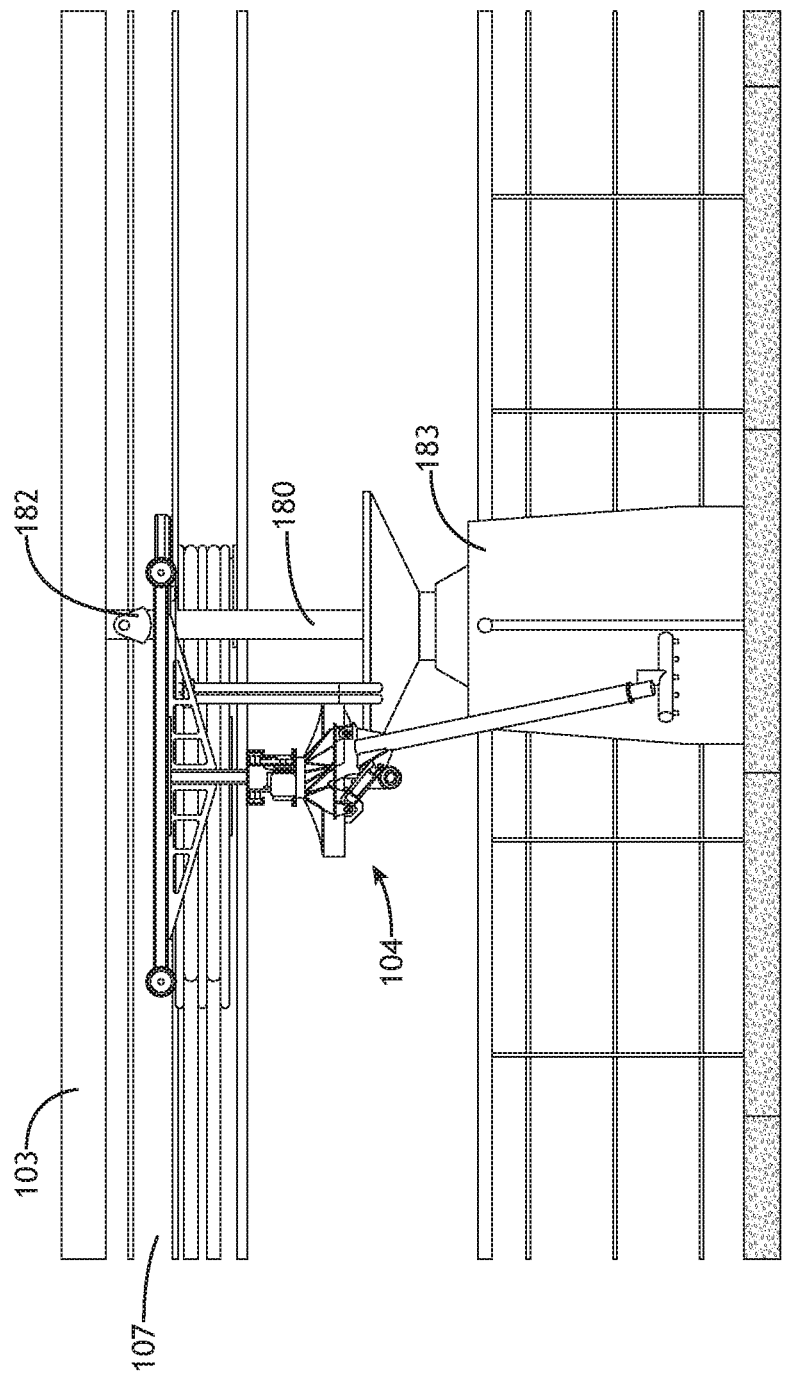
Figure 15D:
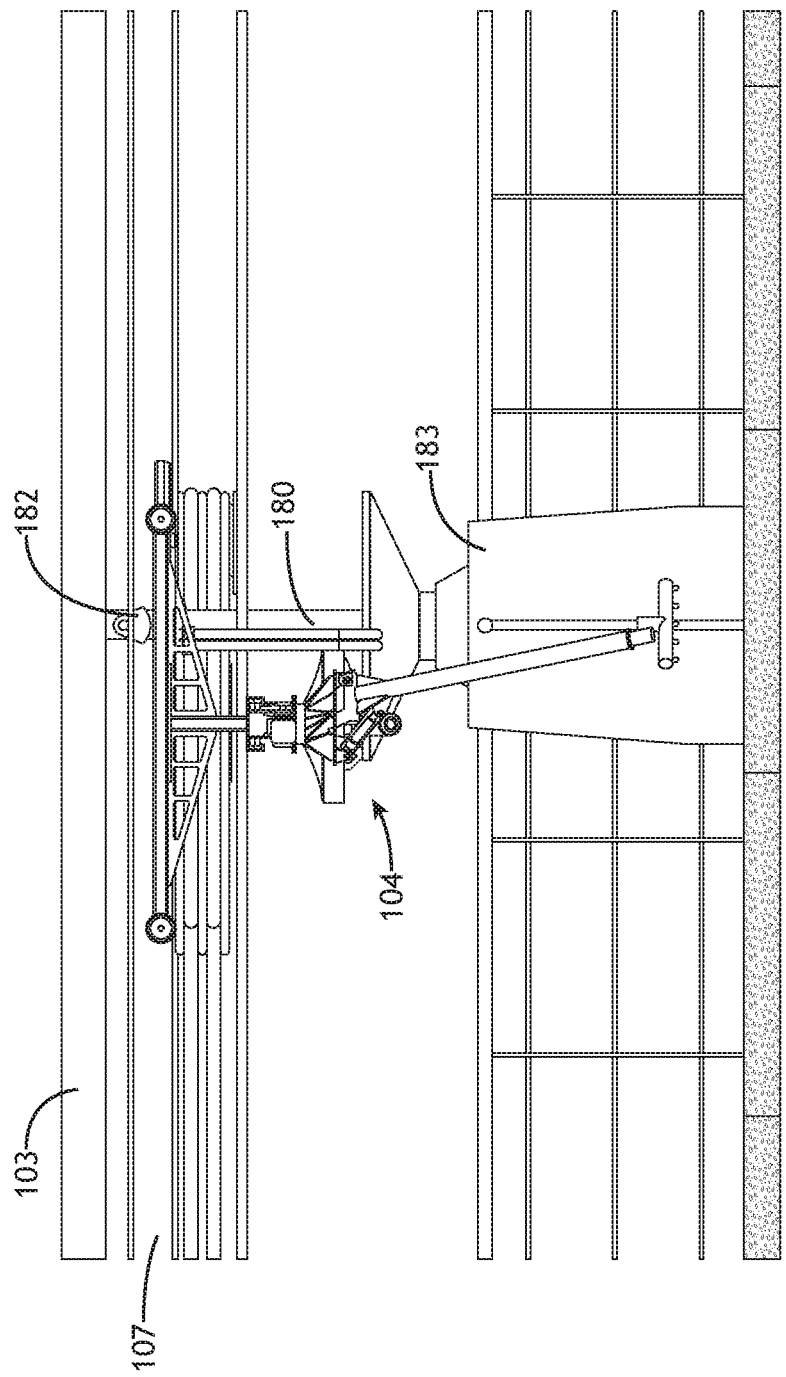
Figure 15E:
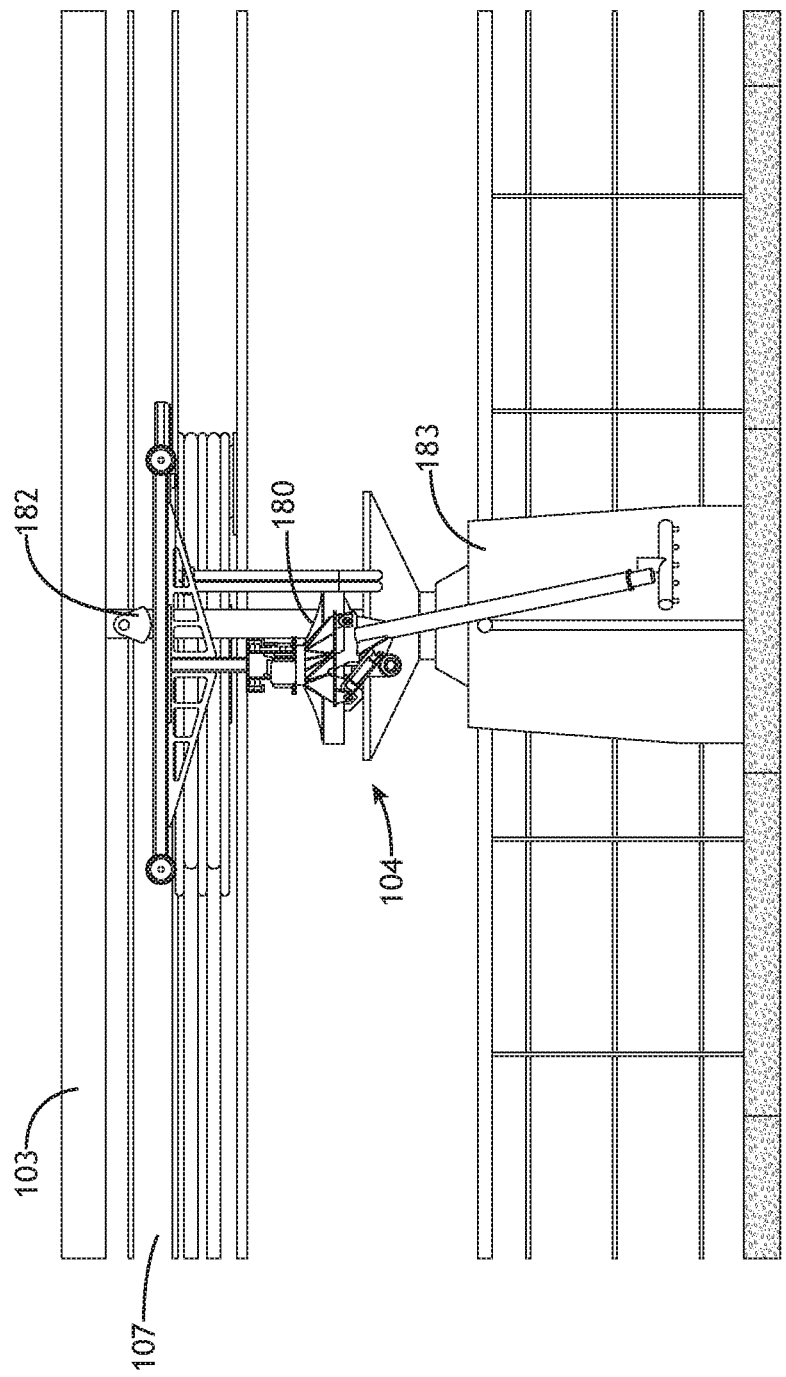
Figure 15F:
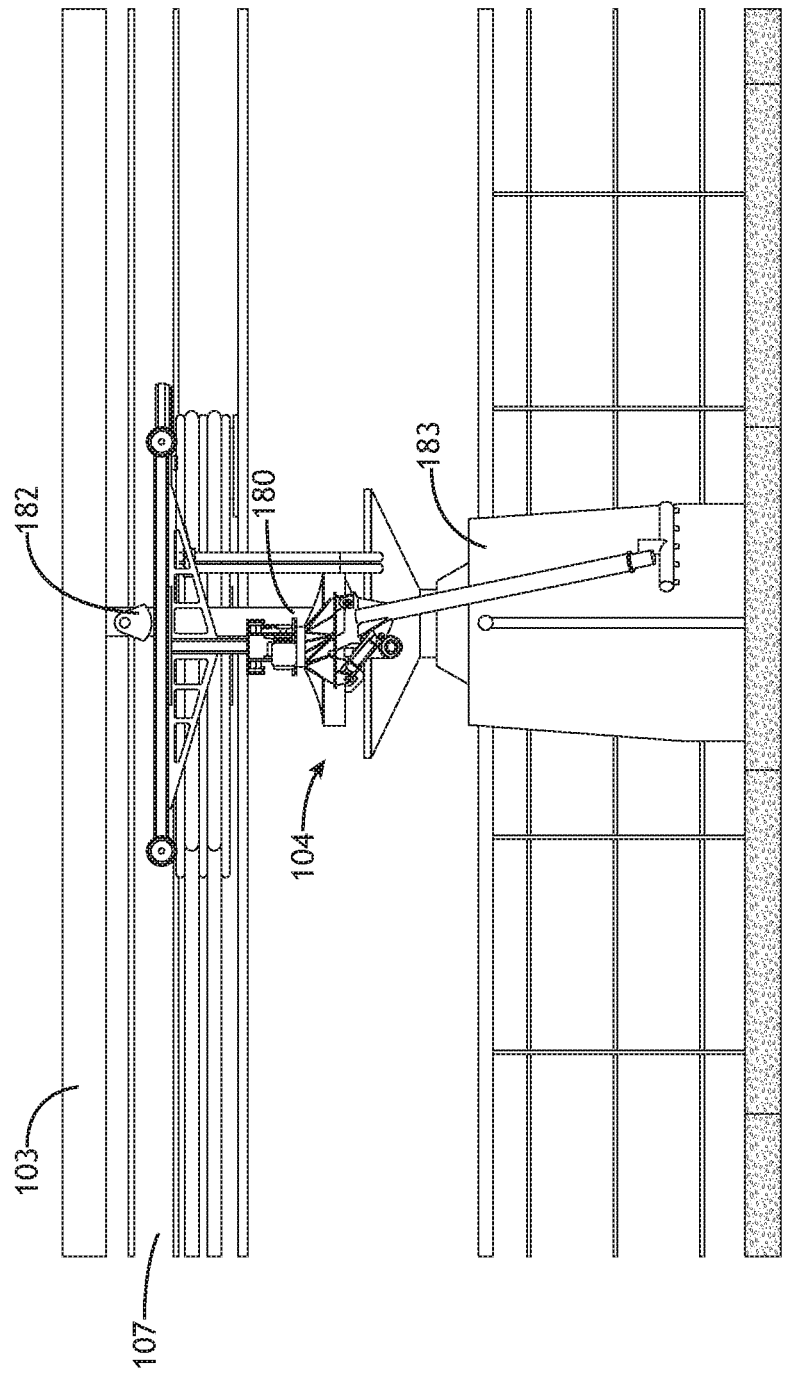
Figure 15G:
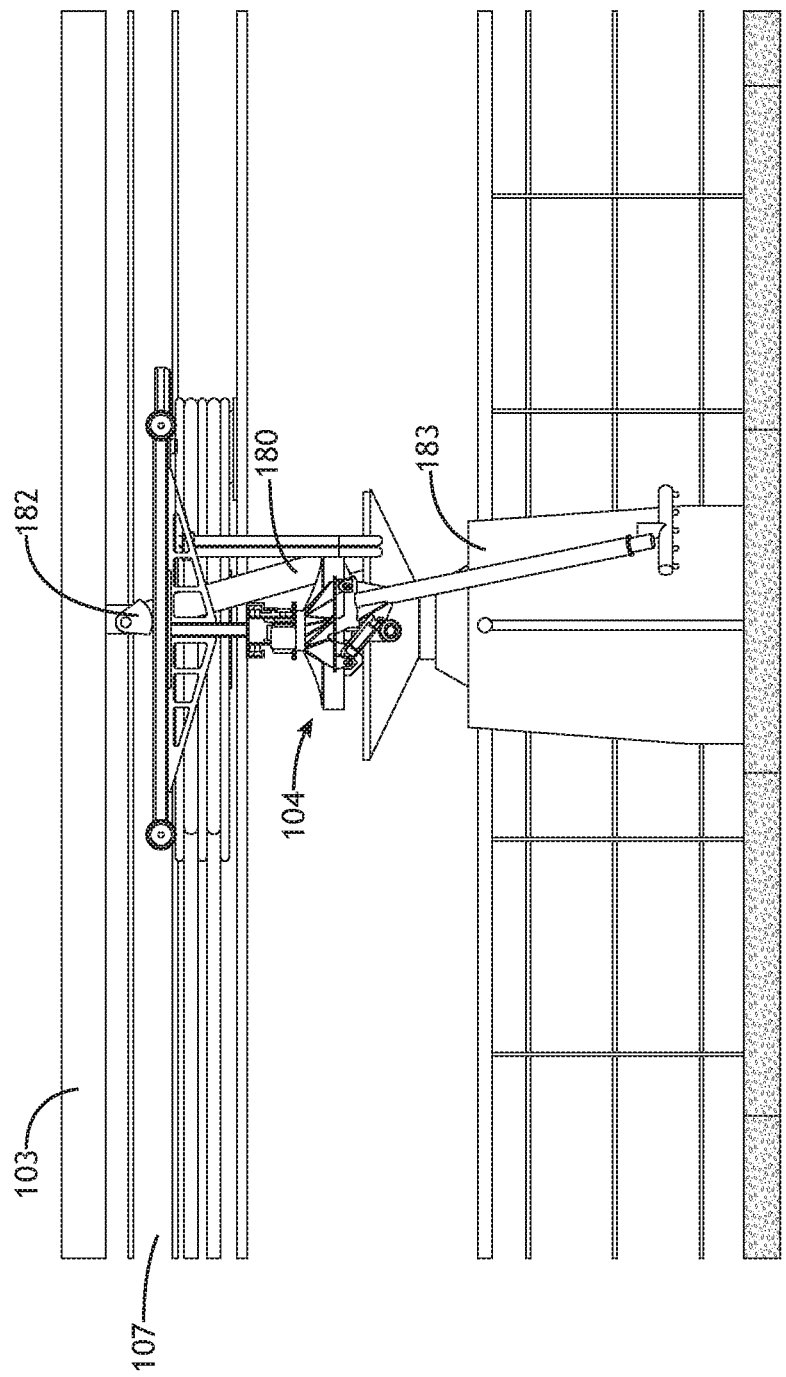
Figure 15H:
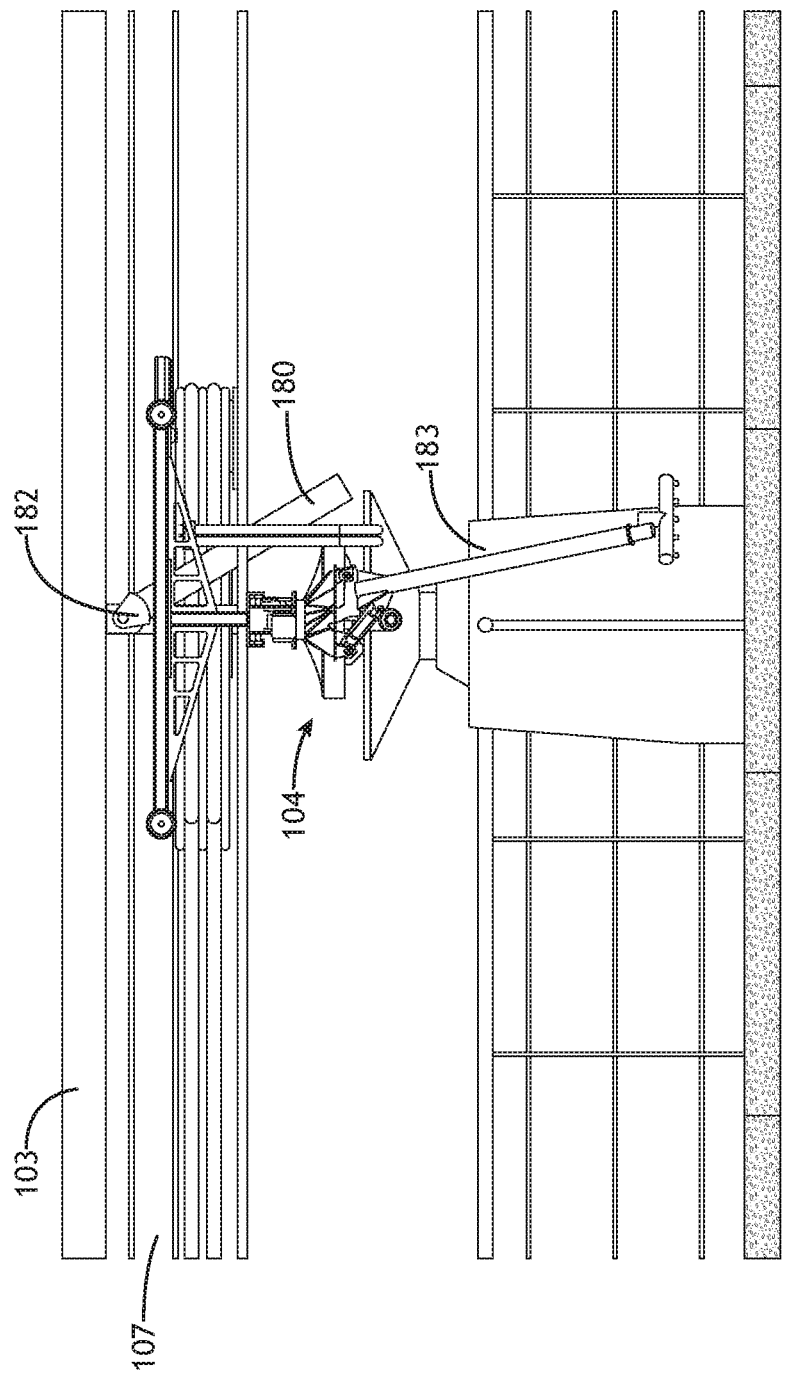
Figure 15I:
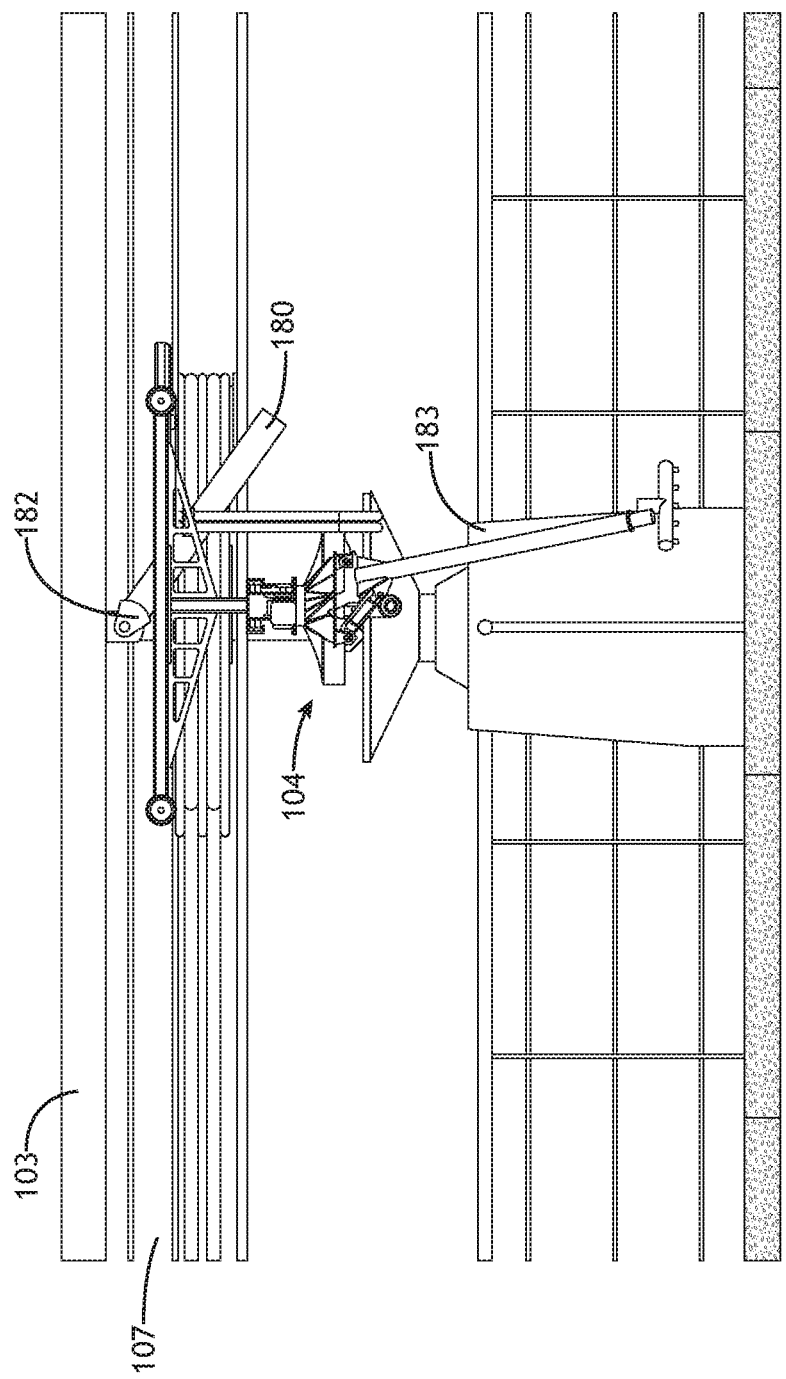
Figure 15J:
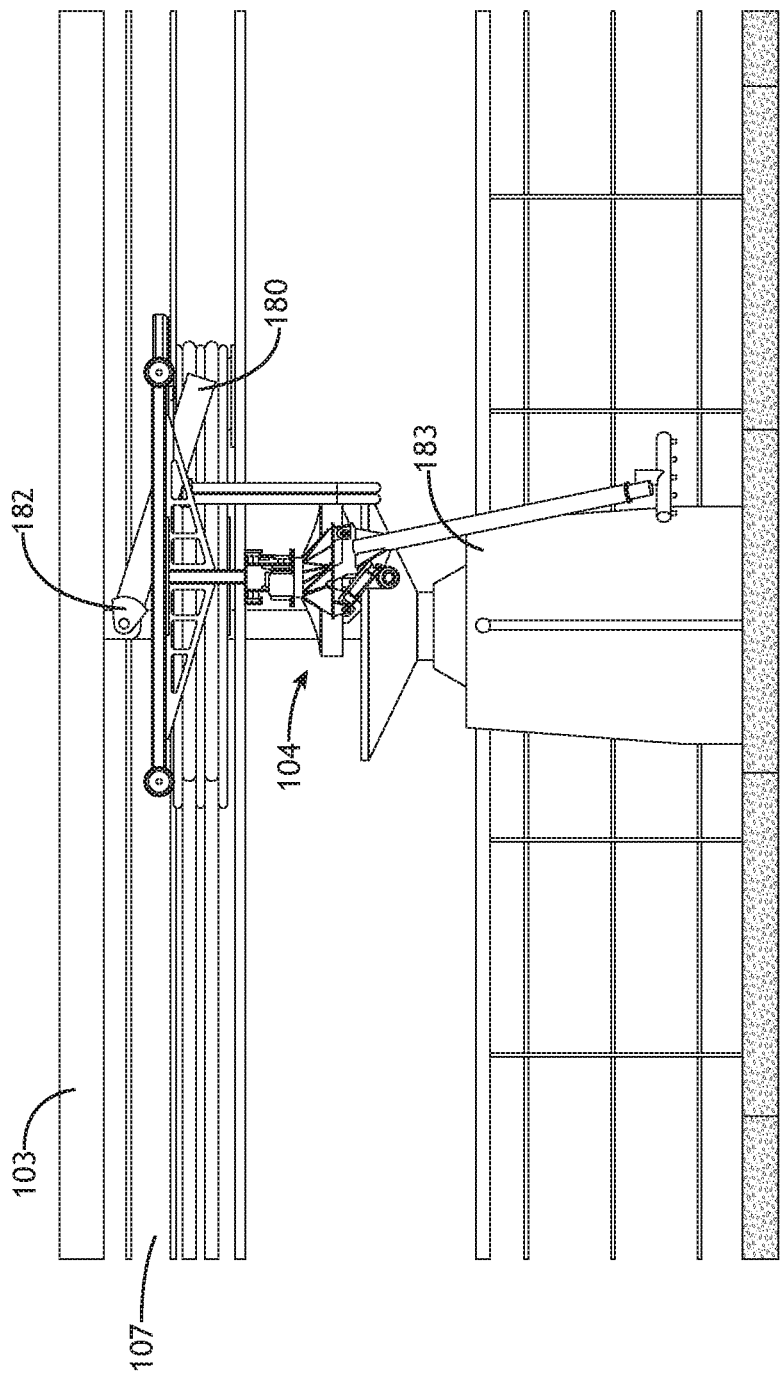
Figure 15K:
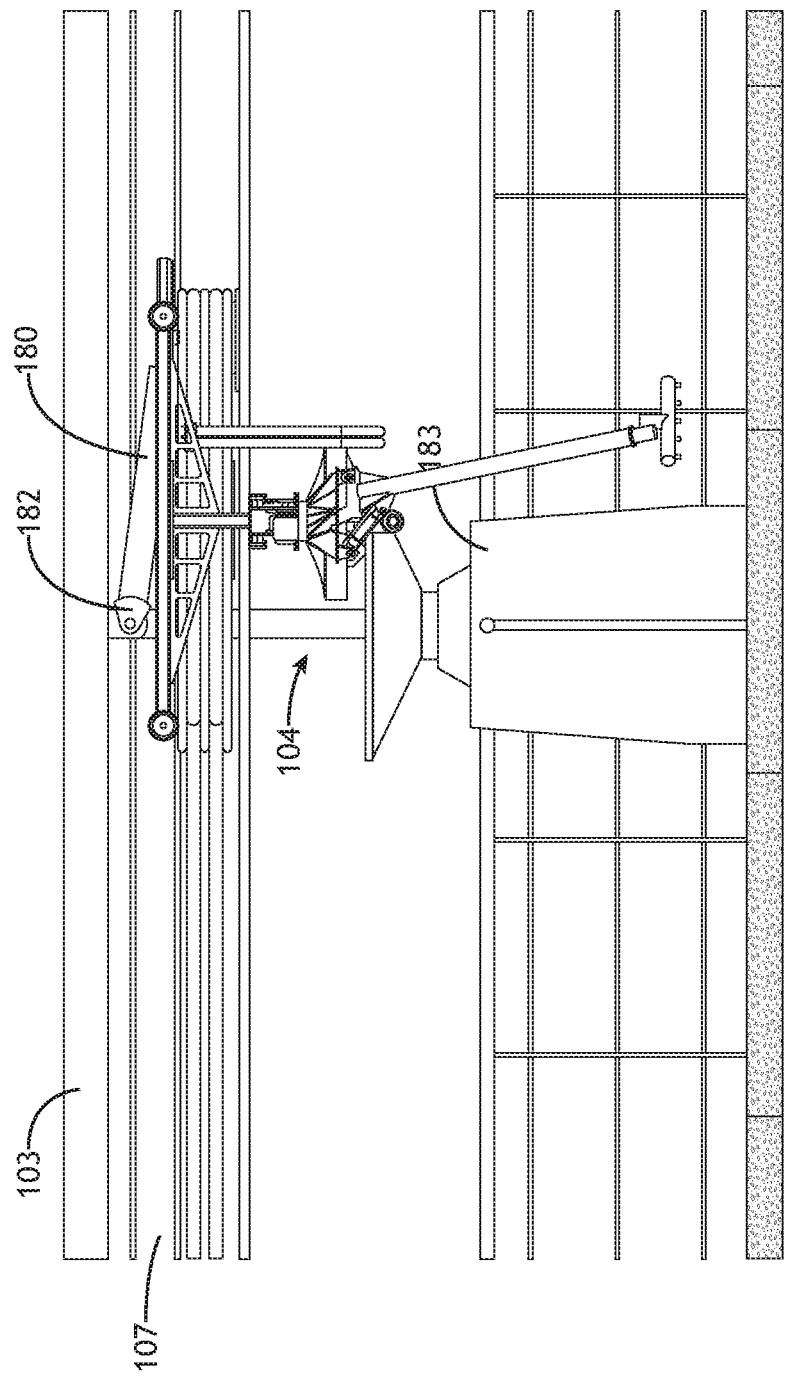
Figure 15M:
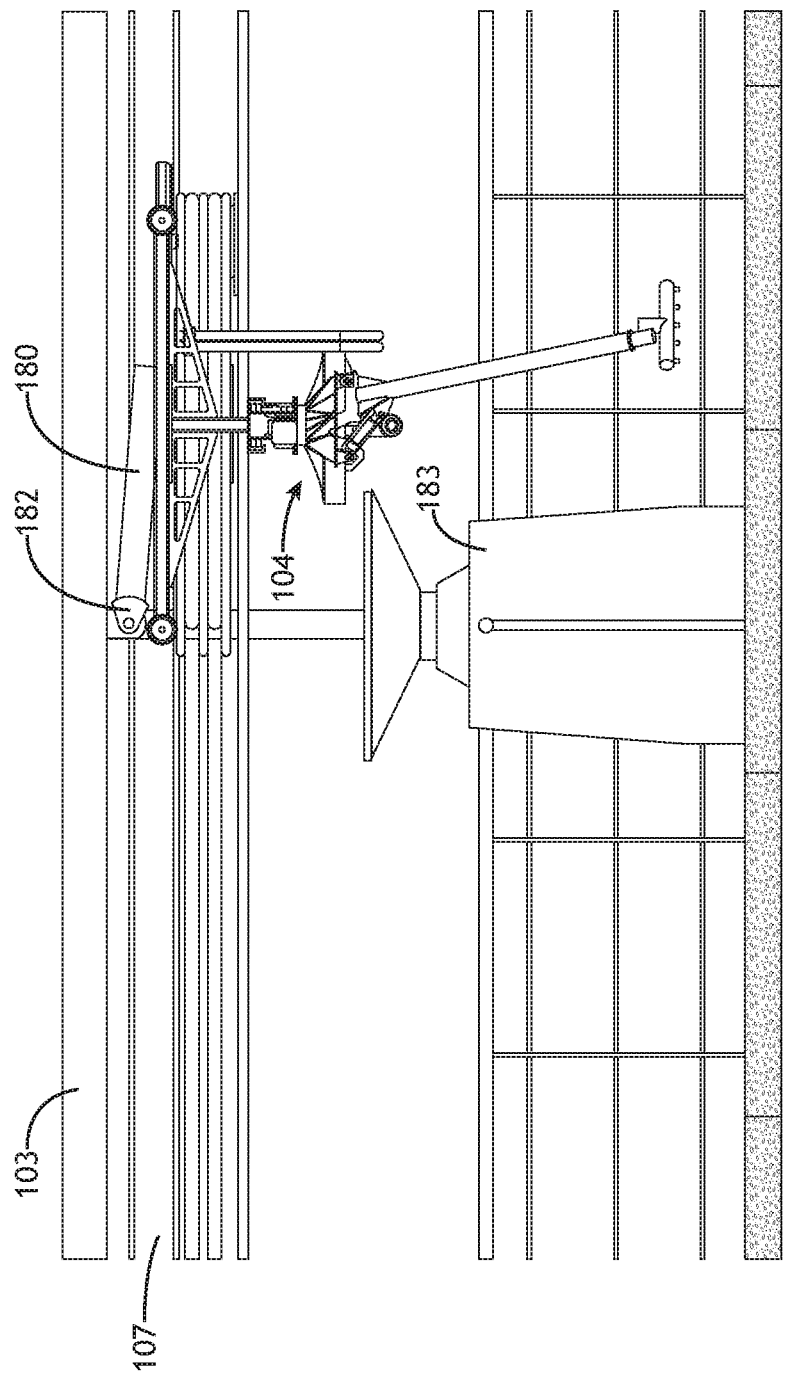
Figure 15N:
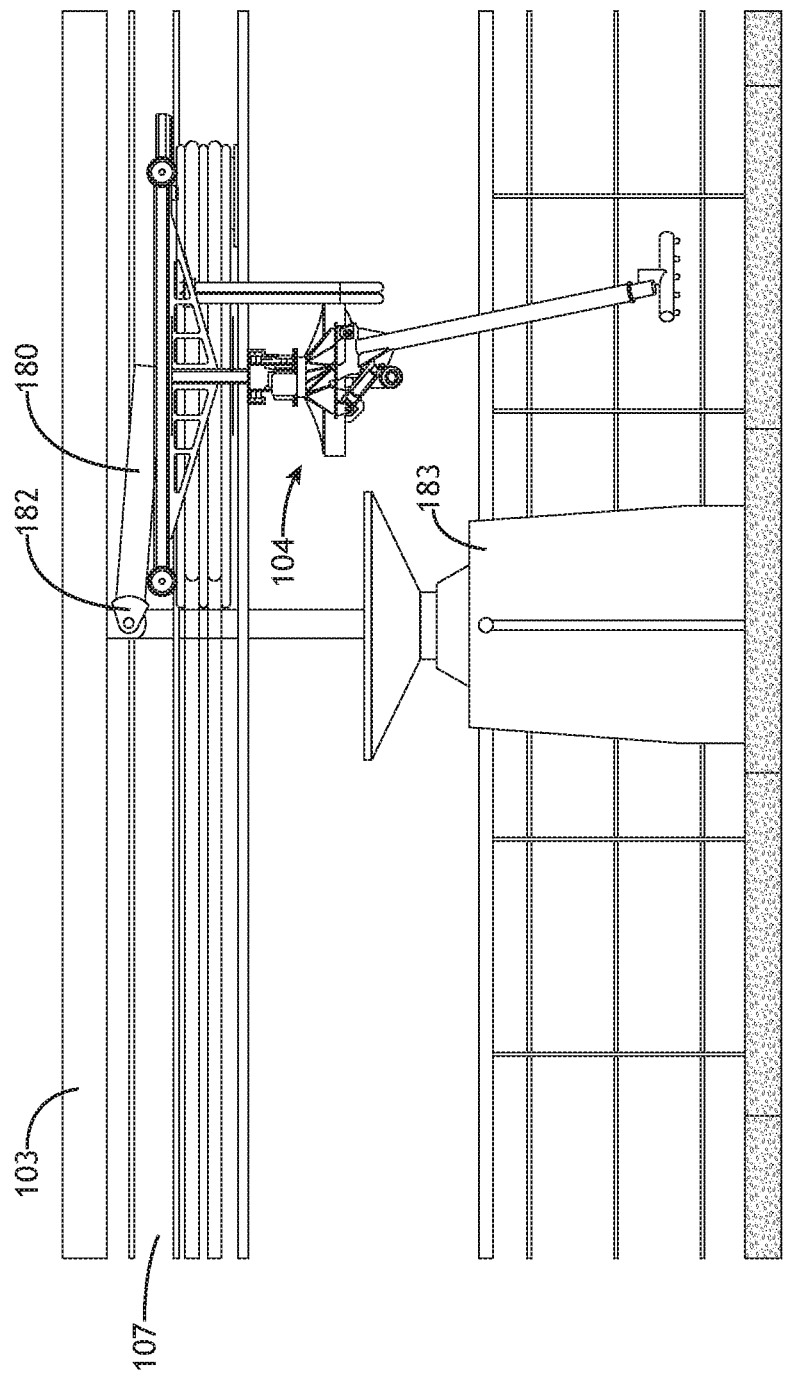
Figure 15P:
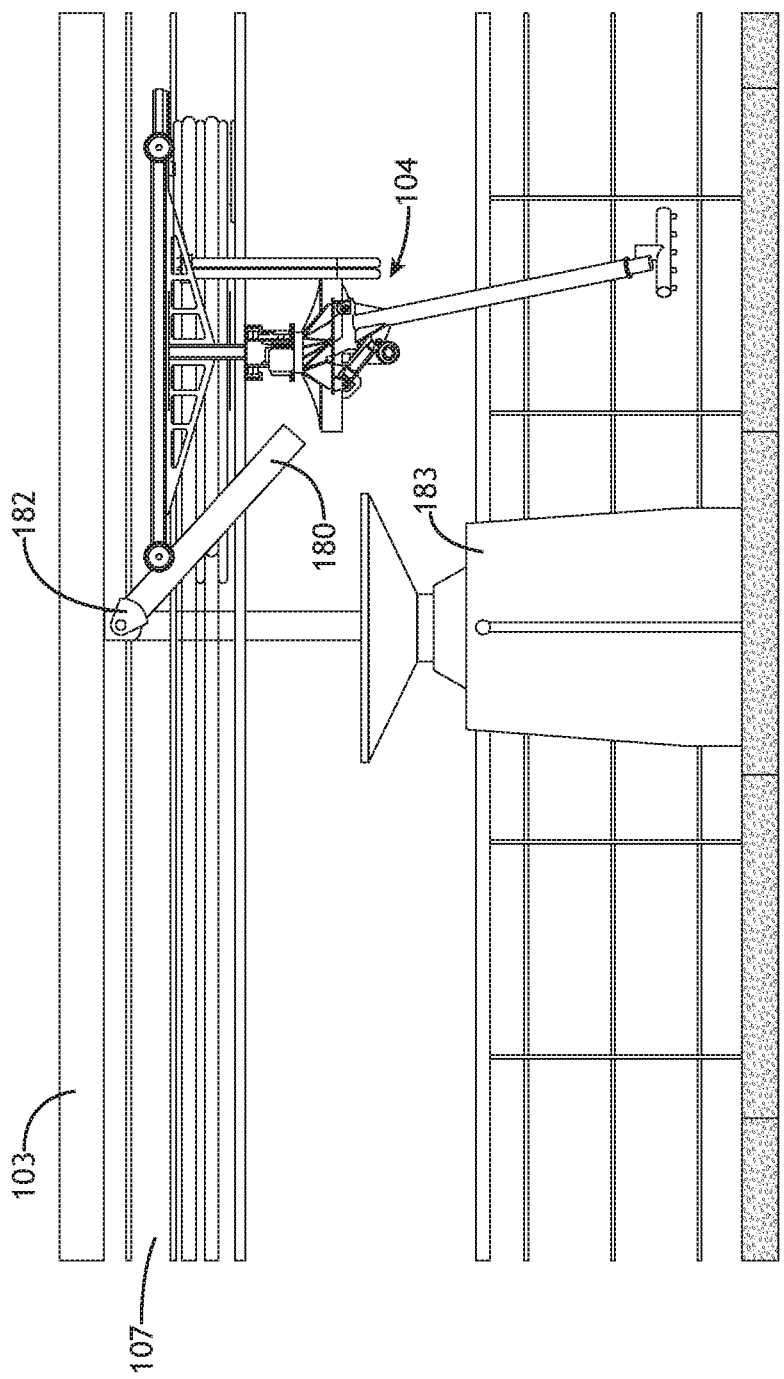
Figure 15Q:
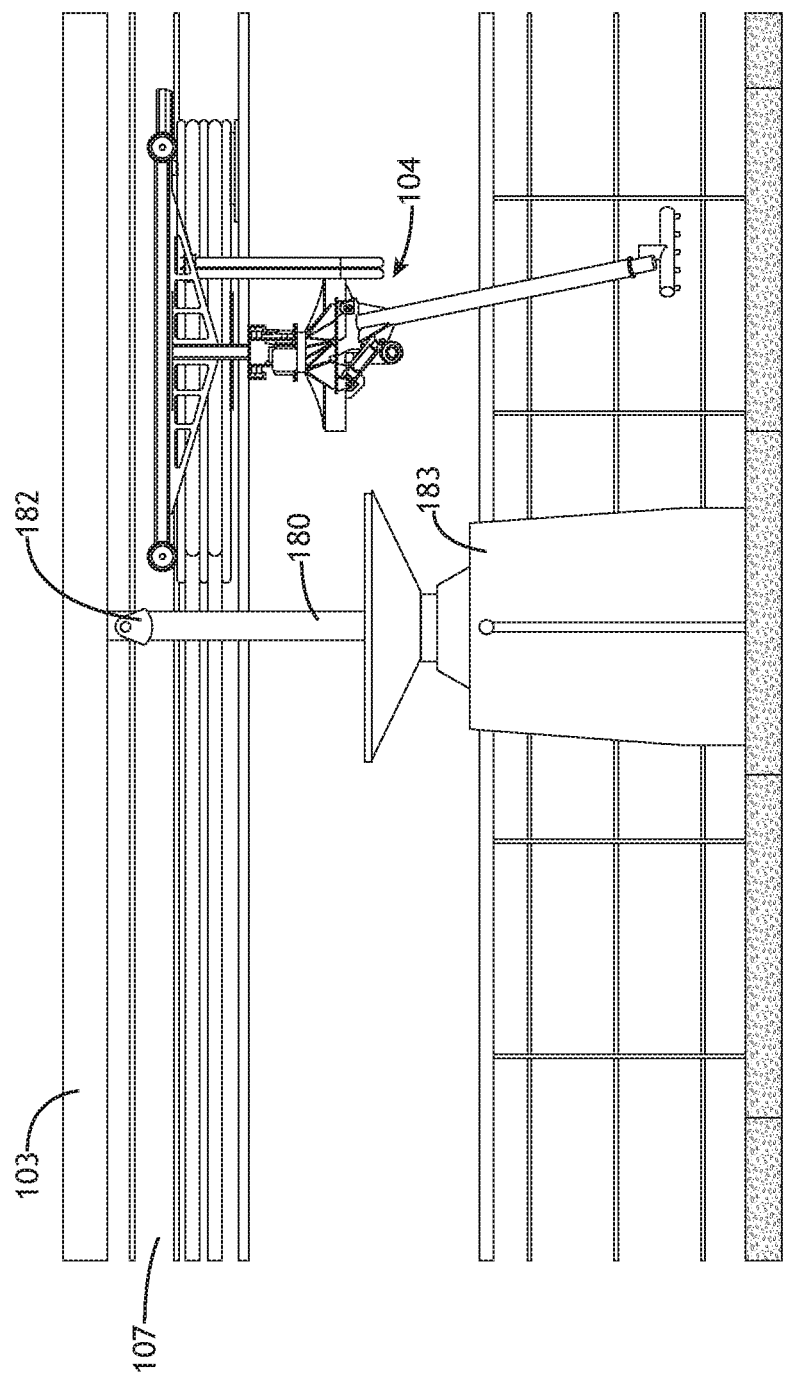

FIGS. 15A-15Q illustrate sequential images of a support assembly 104 of a gantry assembly 102 passing a hinged product drop tube 180, in accordance with one or more embodiments of the present disclosure.

One obstacle of current livestock facilities 101 is interference with equipment by overhead objects, such as feed tubes. For example, as shown in FIG. 3, a livestock facility 101 may include one or more feed tubes 105 configured to provide feed and/or other materials from one or more feed bins 103 to various regions/pens of the livestock facility 101. The horizontal feed tubes 105 depicted in FIG. 3 may further include secondary product drop tubes 180 (e.g., vertical or substantially vertical feed tubes) configured to direct/drop feed and materials from the feed tubes 105 to various containers or regions within the livestock facility, as shown in FIGS. 15A-15Q. These vertical (or substantially vertical) product drop tubes 180 may interfere with the efficient operation of equipment within the livestock facility 101, such as the actuation of the gantry assemblies 102/support assemblies 104 along the support rails 107.

In this regard, some embodiments of the present disclosure are directed to a system 100 including one or more hinged product drop tubes 180. It is contemplated herein that the one or more hinged product drop tubes 180 may be configured to deflect in order to allow the support assemblies 104 to move through/past the product drop tubes 180.

For example, referring to FIG. 15A, system 100 may include one or more product drop tubes 180 configured to direct agricultural products (e.g., feed, and the like) from one or more feed tubes 103 to one or more containers/regions (e.g., feed containers 183) within the livestock facility 101. Traditionally, product drop tubes 180 are rigid, and would therefore interfere with the movement of the support assemblies 104 throughout the livestock facility 101. Accordingly, in one embodiment, the product drop tubes 180 include one or more deflection portions 182 which are configured to allow deflection/displacement of the product drop tubes 180. The deflection portions 182 of the product drop tubes 180 may include any component or structure known in the art configured to allow for displacement/deflection of the product drop tube 180 including, but not limited to, flexible portions, hinges, and the like. For example, as shown in FIG. 15A, the product drop tube 180 may include one or more hinges 182.

As shown in FIGS. 15A-15F, the gantry assembly 102 (e.g., support assembly 104) may move from left to right along the one or more support rails 107 such that the gantry assembly 102 is configured to pass between the feed tube 103 and the feed container 183. In FIG. 15G, the support assembly 104 may come into contact with the product drop tube 180. For example, the one or more support frames 106 may come into contact with the product drop tube 180. As shown in FIG. 15G, the product drop tube 180 may be configured to bend, deflect, or otherwise become displaced from an original position at the one or deflection portions 182 (e.g., hinge 182).

Continuing with reference to FIGS. 15H-15O, the product drop tube 180 may be continue to be deflected/displaced from its original position as the support assembly 104 moves from left to right between the feed tube 103 and the feed container 183. As shown in FIGS. 15P-15Q, once the support assembly 104 has moved along the support rails 107 such that it is no longer in contact with the product drop tube 180, the product drop tube 180 may be configured to return to its original position (e.g., vertical position) by deflecting, bending, hinging, or the like, at the deflection portion 182 (e.g., hinge 182).

In another embodiment, system 100 may include one or more troughs or containers configured to capture animal products (e.g., feed, and the like) falling from the product drop tube 180 as the product drop tube 180 is deflected/displaced in response to a moving gantry assembly 102. In an additional/alternative embodiment, the product drop tube 180 may include one or more valves configured to prevent the dispense of animal product once the product drop tube 180 has been deflected, bent, or otherwise displaced from an original position.

The one or more processors 126, 138, 146 of the controller 124, the controller 124, and/or the work tool controller 144 may include any one or more processing elements known in the art. In general, the term "processor" may be broadly defined to encompass any device having one or more processing elements, which execute program instructions from a non-transitory memory medium. In one embodiment, the one or more processors 126, 138, 146 may include any microprocessor-type computational device configured to execute software algorithms and/or instructions. The one or more processors 126, 138, 146 may be embodied in, or consist of, a personal computer system, a mobile device (e.g., tablet, smart phone, laptop, etc.), mainframe computer system, workstation, image computer, parallel processor, a networked computer or any other computational device known in the art. In general, the term "computational device" may be broadly defined to encompass any device having data processing or logic capabilities. It should be recognized that the steps described throughout the present disclosure may be carried out by a single controller or, alternatively, multiple controllers.

The memory 128, 140, 148 may include any storage medium known in the art suitable for storing program instructions executable by the associated one or more processors 126, 138, 146 and/or for storing one or more sets of results, one or more sets of information, and/or one or more databases acquired from the various components and subsystems of system 100. For example, the memory 128, 140, 148 may include, but is not limited to, random access memory (RAM), read-only memory (ROM), or a persistent store, such as a mass storage device, hard drives, CDROM, DVDROM, tape, erasable programmable read-only memory (EPROM or flash memory), any magnetic, electromagnetic, solid state, infrared, optical, or electrical system, apparatus or device for storing information, or any other type of media suitable for storing electronic data. By way of another example, the one or more sets of information may include, but are not limited to, one or more operational conditions of a component (e.g. on, standby, completing assigned task, off, and the like), one or more operational parameters for the one or more operational conditions of the component (e.g. amount of power consumption, amount of power generation, rotational speed of a motor, rotational capability of a motor, volume of stored material, position coordinates of a component location on the gantry assembly 102, position coordinates of a component location relative to other components on the gantry assembly 102, position coordinates of a component location relative to surrounding environment locations, and the like), a distance measurement between two or more components, one or more images from a component, or one or more images from one or more environment sensors.

While much of the present disclosure is directed to work tool assemblies 114 actuatable along one or more work took rails 108 of a support assembly 104, which is further actuatable along one or more support rails 107 of a livestock facility 101, this is not to be regarded as a limitation on the scope of the present disclosure, unless noted otherwise herein. In this regard, it is contemplated herein that other configurations may be implemented without departing from the spirit and scope of the present disclosure. For example, in some embodiments, work tool assemblies 114 may be coupled directly to a support rail 109. This may be further understood with reference to FIGS. 16A-16B.

Figure 16A:
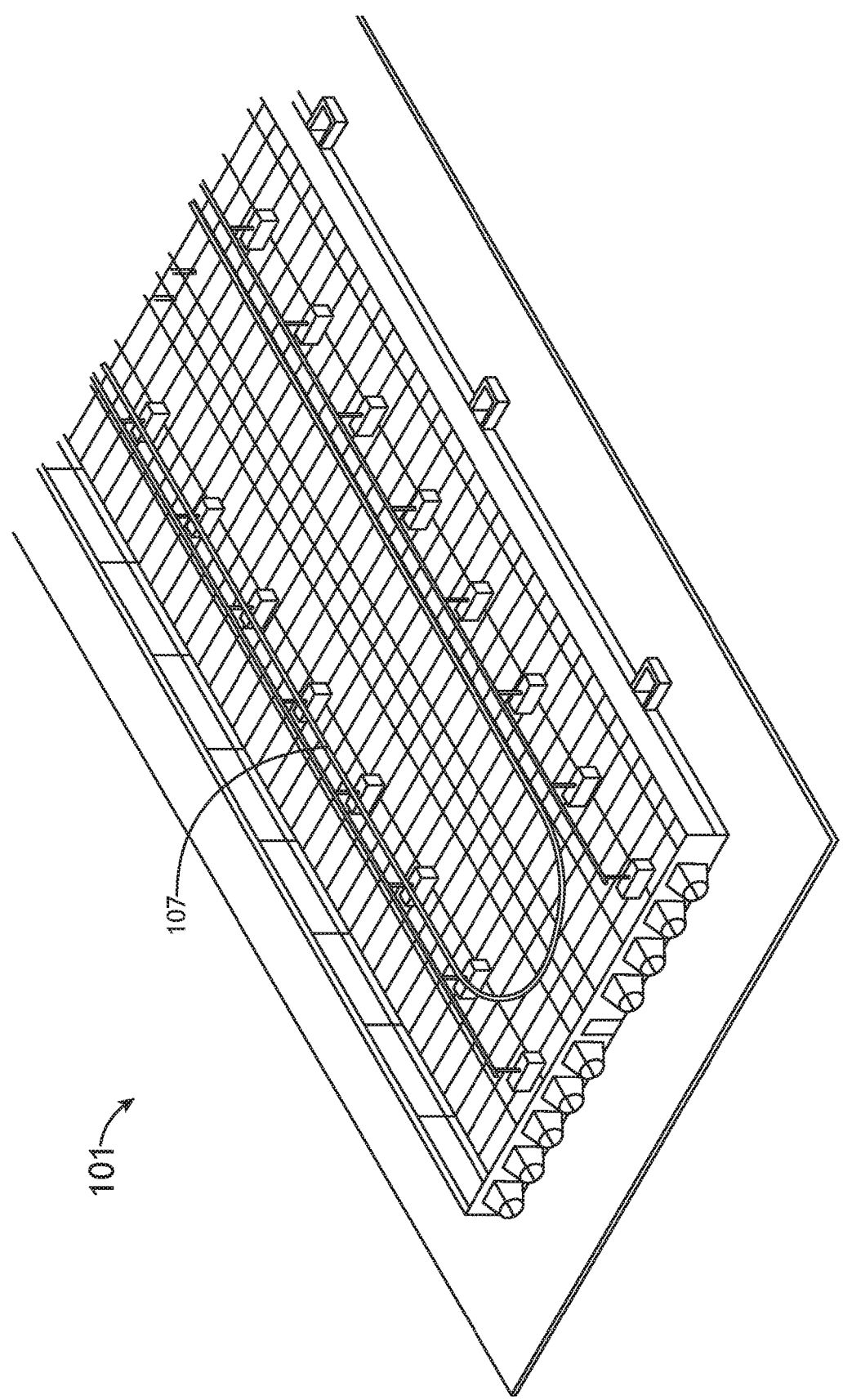
FIG. 16A illustrates a livestock facility equipped with a livestock management system, in accordance with one or more embodiments of the present disclosure.

FIG. 16A illustrates a livestock facility 101 equipped with a livestock management system 100, in accordance with one or more embodiments of the present disclosure. In particular, FIG. 16A illustrates a livestock facility with a single elliptical support rail 107 configured to receive one or more work tool assemblies 114. In this embodiment, work tool assemblies 114/work tool attachments 142 may be configured to be coupled directly to the support rail 107 such that they may be actuated along the support rail 109. It is contemplated herein that the support rail 107 configured to receive the work tool assemblies 114 need not be elliptical, and that it may take on any shape known in the art. For example, a livestock facility 107 may include multiple support rails 107 configured to receive work tool assemblies 114. By way of another example, the support rails 107 may be circular, oval, and the like. By way of another example, the support rail 107 may be irregularly shaped in order to conform to the specific specifications and/or structural limitations of the livestock facility at hand.

Figure 16B:
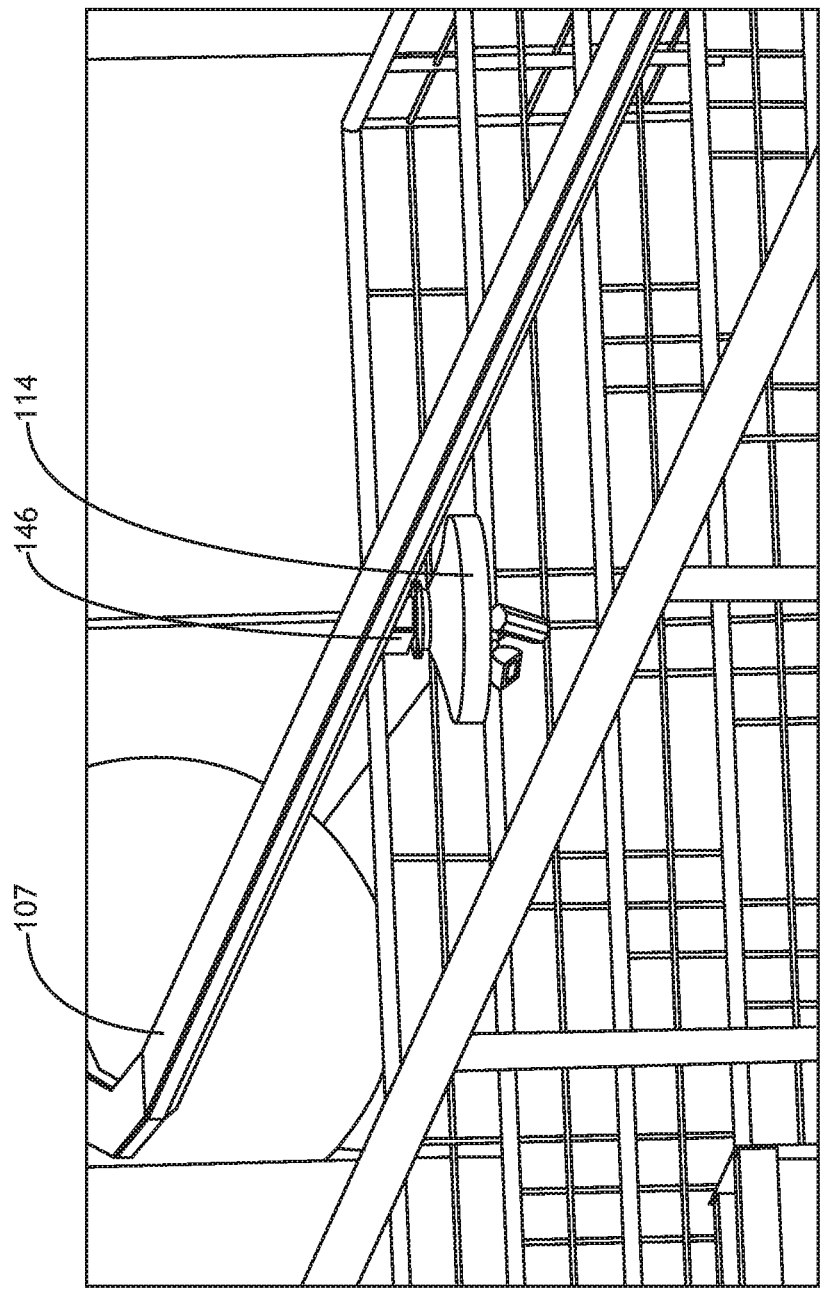
FIG. 16B illustrates a work tool assembly coupled to a support rail, in accordance with one or more embodiments of the present disclosure.

FIG. 16B illustrates a work tool assembly 114 coupled to a support rail 107, in accordance with one or more embodiments of the present disclosure. In embodiments where work tool assemblies 114 are coupled directly to a support rail 107, the support rail 107 may exhibit similar and/or identical characteristics as the work tool rail 108 described herein. For instance, in embodiments where the work tool assemblies 114 are actuatable along the support rail 107, the support rail 107 may be configured to receive one or more carriage assemblies 146. By way of another example, in embodiments where the work tool assemblies 114 are actuatable along the support rail 107, the support rail 107 may include one or more powered tracks 156.

Figure 17:
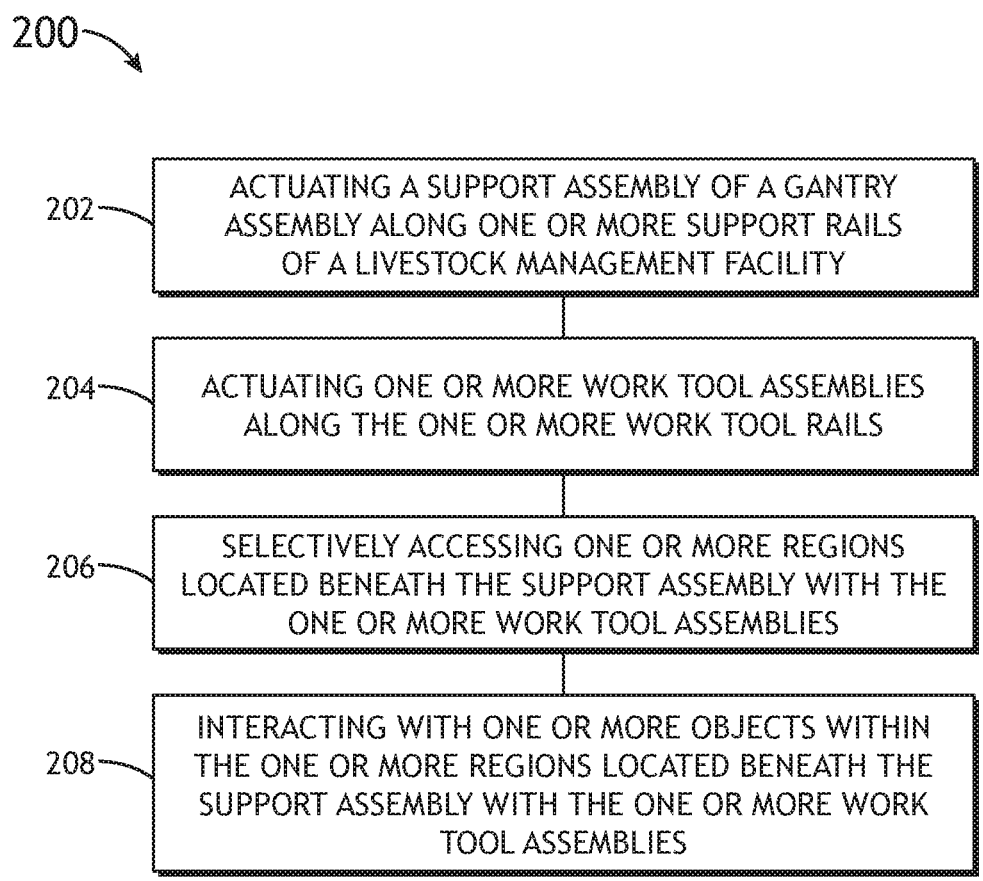
FIG. 17 illustrates a flowchart of a method for operating a livestock management system, in accordance with one or more embodiments of the present disclosure.

FIG. 17 illustrates a flowchart of a method 200 for operating a livestock management system 100, in accordance with one or more embodiments of the present disclosure. It is noted herein that the steps of method 200 may be implemented all or in part by system 100. It is further recognized, however, that the method 200 is not limited to the system 100 in that additional or alternative system-level embodiments may carry out all or part of the steps of method 200.

In a step 202, a support assembly of a gantry assembly is actuated along one or more support rails of a livestock facility. For example, as shown in FIG. 4B, a controller 124 may be configured to generate one or more control signals configured to cause the support assembly 104 of the gantry assembly 102 to selectively actuate across one or more support rails 107 of a livestock facility 101. The controller 124 may be configured to automatically generate the one or more control signals, or may be configured to generate the one or more control signals in response to one or more input commands received via a user input device 134 of a user interrace 130, a controller 124, a server 136, and the like. In another embodiment, the support assembly 104 includes one or more work tool rails 108.

In a step 204, one or more work tool assemblies is actuated along the one or more work tool rails. The one or more work tool assemblies 114 may be actuated along the one or more work tool rails 108 in response to one or more control signals received from the controller 124, work tool controller 144, user interface 130, server 136, and the like.

In a step 206, one or more regions located beneath the support assembly are selectively accessed with the one or more work tool assemblies. The one or more work tool assemblies 114 may include one or more work tool attachments 142 controlled via the controller 124, work tool controller 144, user interface 130, server 130, and the like. In one embodiment, the work tool assembly 114/work tool attachment 142 may be configured to selectively access multiple regions/areas within a livestock facility 101. The regions/areas "beneath" the support assembly may be regarded as any areas/regions/objects located at a height below a height of the support assembly 104. However, it is further noted herein that the ability to selectively control/actuate heights of the work tool attachments 142 may allow system 100 to interact and engage with objects/regions "above" the work tool assembly 142. As it is used herein, the term "selectively accessing" may be regarded as positioning a work tool assembly 114 and/or work tool attachment 142 in a position which gives the work tool assembly 114 and/or work tool attachment 142 access to interact with a particular object/region within the livestock facility 101.

In a step 208, one or more objects within the one or more regions located beneath the support assembly are interacted with via the one or more work tool assemblies. Objects which may be interacted with may include, but are not limited to, livestock, surfaces, equipment, pens, materials, and the like. As it is used herein, the term "interacted" with may include, but is not limited to, physical interaction, optical interaction, audio interaction, and the like. For example, the work tool assembly 114 may include an imaging tool 160 with one or more imaging devices 162 configured to "interact" with one or more objects within the one or more regions by imaging the one or more objects. By way of another example, the work tool assembly 114 may include a pressure washer work tool attachment 170 configured to interact with one or more surfaces/objects within the one or more regions by spraying liquids upon the one or more surfaces/objects.

While embodiments of the present disclosure have been shown and described in the context of livestock facilities, this is not to be regarded as a limitation on the scope of the present disclosure, unless noted otherwise herein. In this regard, some embodiments of the present disclosure may be implemented in contexts other than those related to livestock. For example, some embodiments of the present disclosure may be implemented in agricultural and farming contexts. For instance, some embodiments of the present disclosure may be implemented in the context of a full farming system. This may be further understood with reference to FIGS. 18A-22B.

Figure 18A:
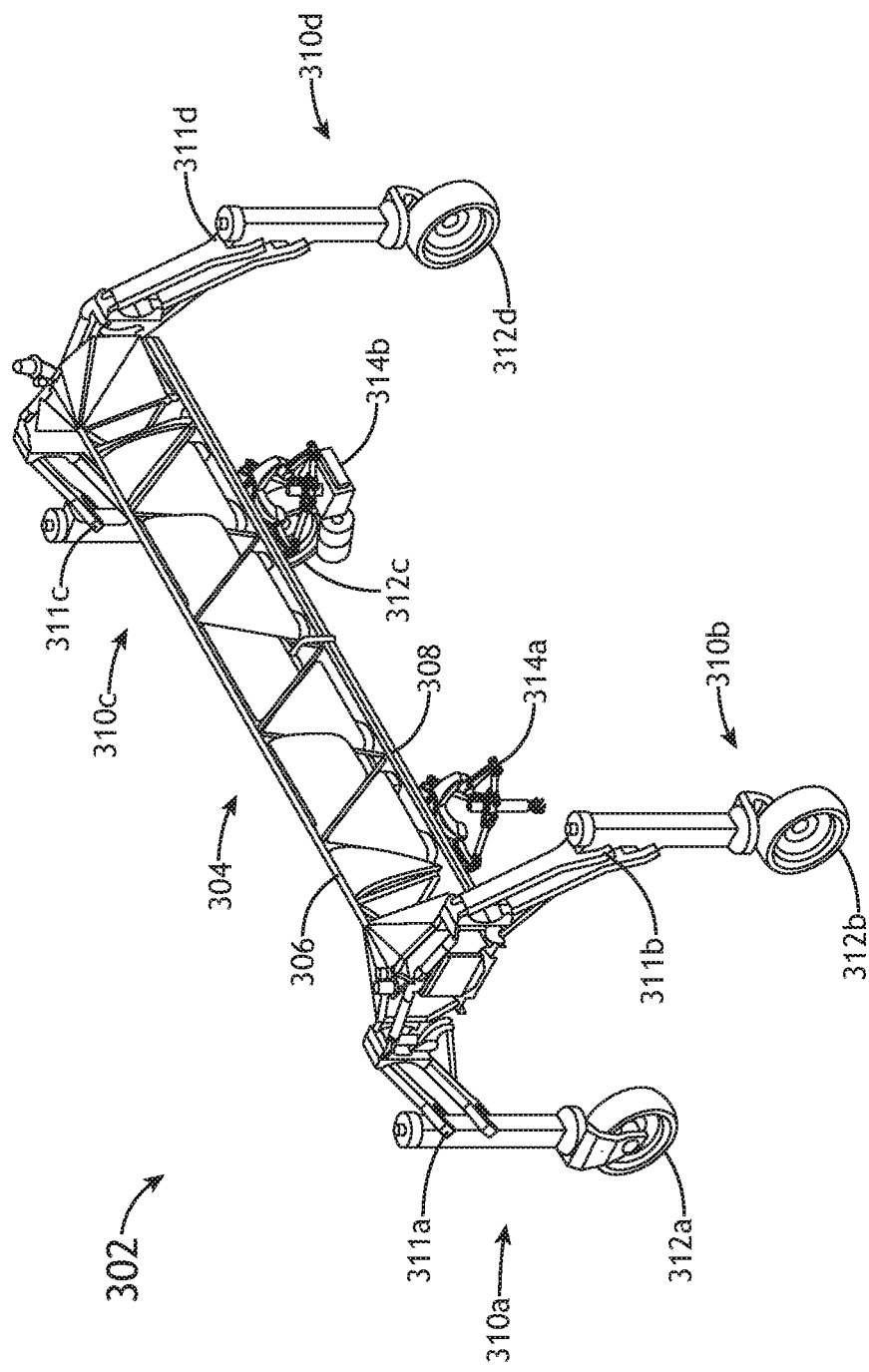
FIG. 18A illustrates a perspective view of a field engagement unit of a full farming system, in accordance with one or more embodiments of the present disclosure.
Figure 18B:
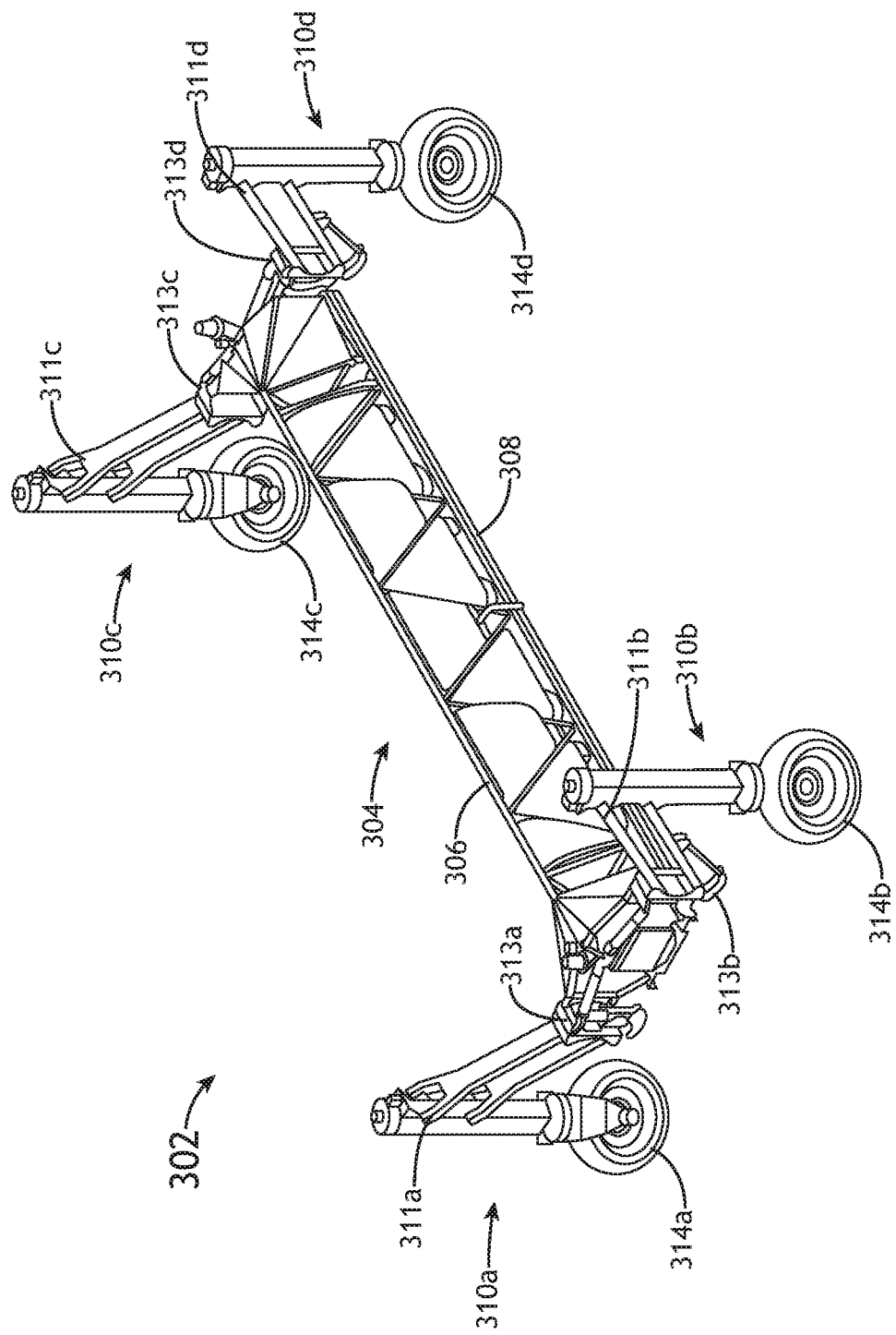
FIG. 18B illustrates a perspective view of a field engagement unit of a full farming system, in accordance with one or more embodiments of the present disclosure.
Figure 18C:
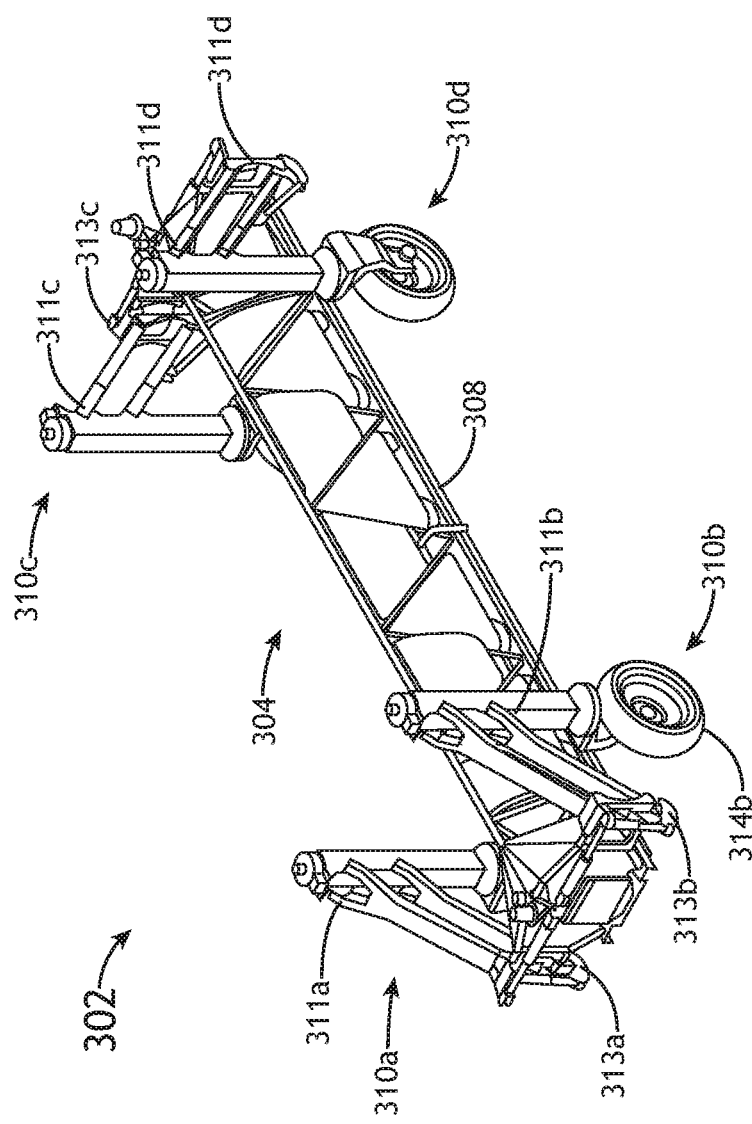
FIG. 18C illustrates a perspective view of a field engagement unit of a full farming system, in accordance with one or more embodiments of the present disclosure.
Figure 18D:
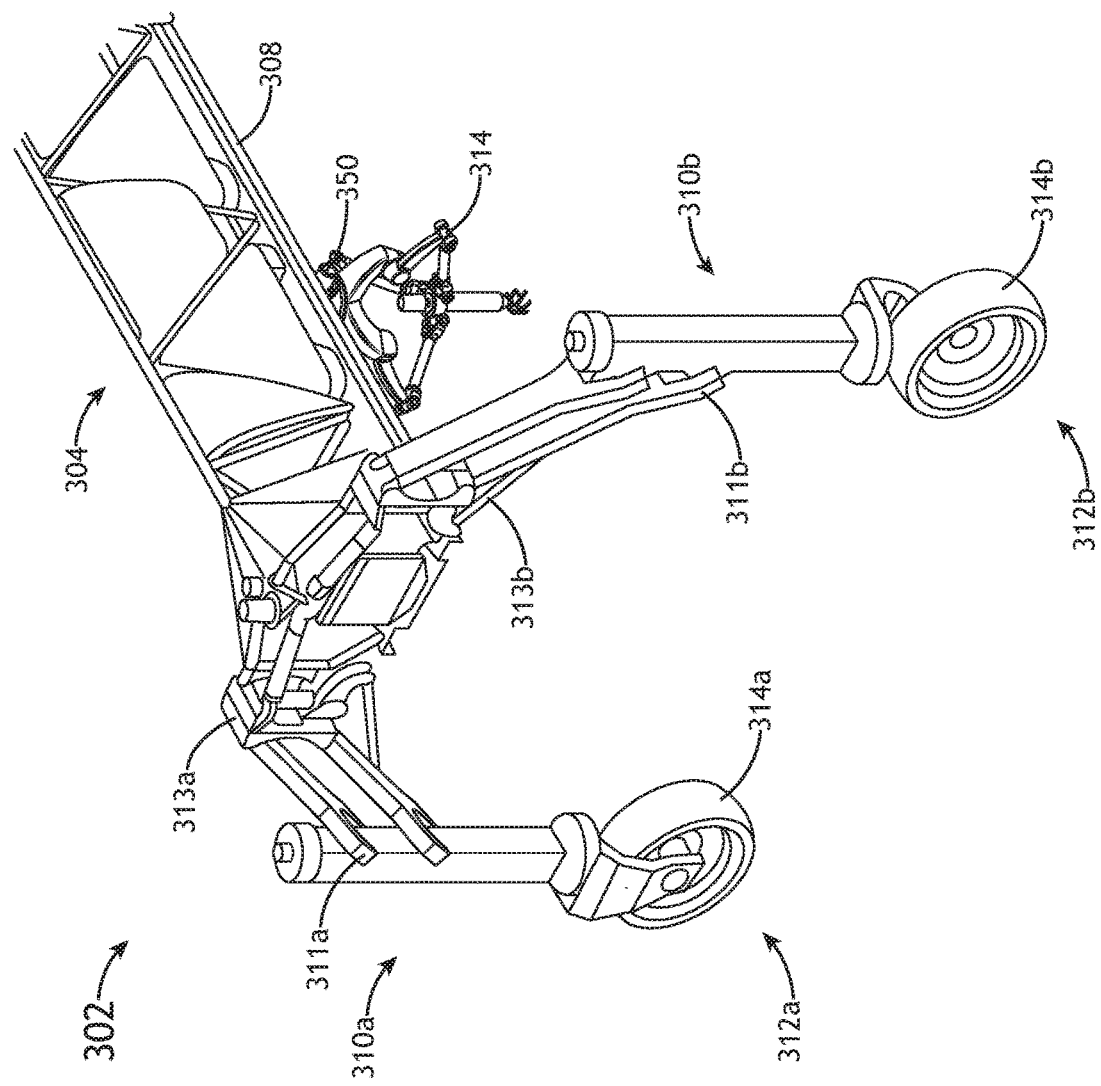
FIG. 18D illustrates a perspective view of a field engagement unit of a full farming system, in accordance with one or more embodiments of the present disclosure.
Figure 18E:
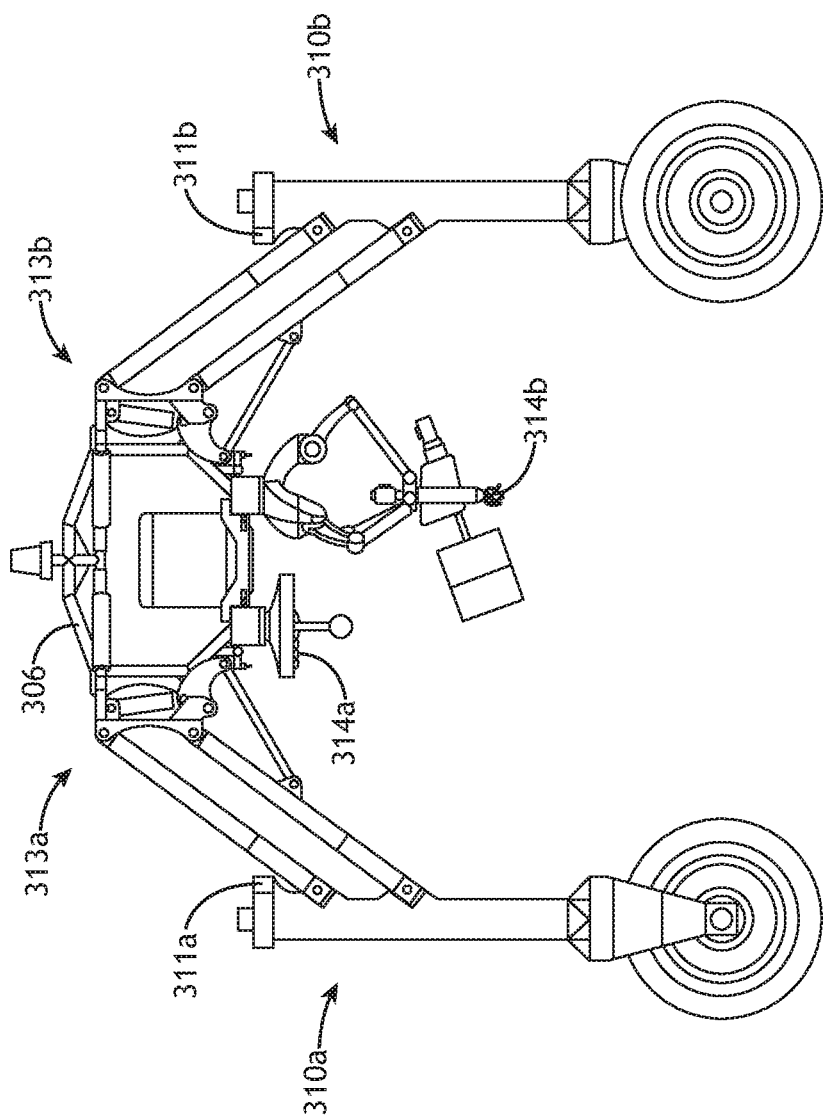
FIG. 18E illustrates a perspective view of a field engagement unit of a full farming system, in accordance with one or more embodiments of the present disclosure.
Figure 18F:
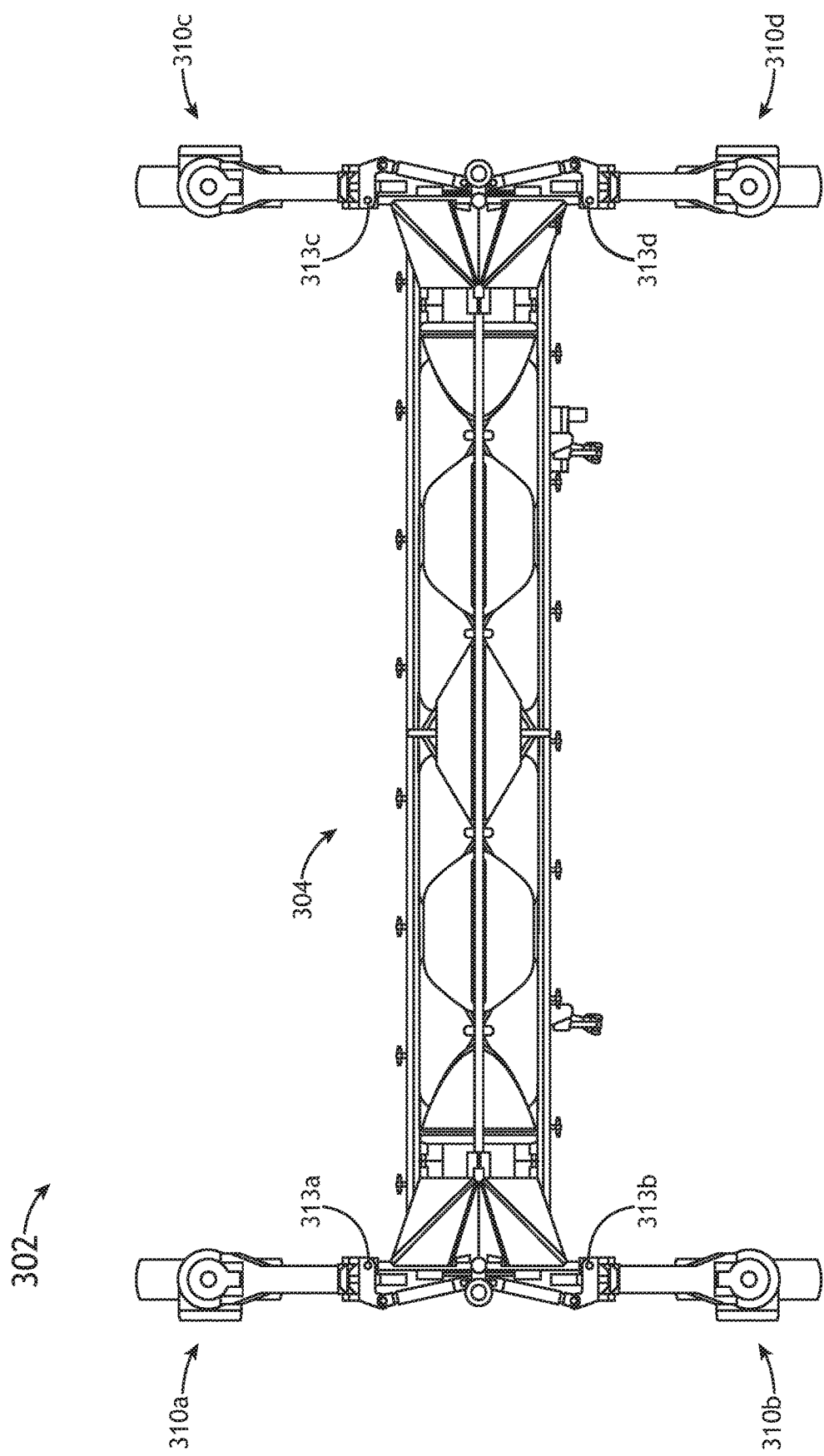
FIG. 18F illustrates a top view of a field engagement unit of a full farming system, in accordance with one or more embodiments of the present disclosure.

FIGS. 18A-D illustrate perspective views of a field engagement unit 302 of a full farming system, in accordance with one or more embodiments of the present disclosure. FIG. 18E illustrates a side view of a field engagement unit 302 of a full farming system, in accordance with one or more embodiments of the present disclosure. FIG. 18E illustrates a side view of a field engagement unit 302 of a full farming system, in accordance with one or more embodiments of the present disclosure. FIG. 18F illustrates a top view of a field engagement unit 302 of a full farming system, in accordance with one or more embodiments of the present disclosure.

It is noted herein that any description associated with the livestock management system 100, to the extent applicable, may be regarded as applying to the field engagement unit 302 of a farming system, unless noted otherwise herein. For example, any description associated with the work tool rails 108 of the system 100 may be regarded as applying to the work tool The field engagement unit 302 may include, but is not limited to, a support assembly 304 including a support frame 306, one or more work tool rails 308, one or more support structures 310, and one or more propulsion units 312. As noted previously herein, one or more work tool assemblies 314 may be actuatable along the one or more work tool rails 308 via one or more carriage assemblies 350.

In one embodiment, each support structure 310a-310d includes a set of one or more hinges 311a-311d, wherein the sets of one or more hinges are configured to hinge in order to adjust the height of the field engagement unit 302. For example, as shown in FIG. 18A, the one or more support structures 310 may be configured to extend at the sets of one or more hinges 311 in order to raise the support assembly 104 of the field engagement unit 302. It is contemplated herein that the height of the support assembly 104 may be raised in order to clear designated structures and/or crops. Continuing with the same example, the one or more support structures 310 may be configured to hinge at the sets of one or more hinges 311 in order to lower the support assembly 104 of the field engagement unit 302. This may be done in order to balance weight distribution, lower the center of gravity, storage of the field engagement unit 302, and the like.

The one or more support structures 310 and/or one or more sets of one or more hinges 311 may be communicatively coupled to one or more motors/power supplies such that a local controller of the field engagement unit 302 is configured to cause the one or more support structures 310 to hinge at the one or more sets of hinges 311 in order to adjust the height of the filed engagement unit 302.

In another embodiment, the field engagement unit 302 may be configured for directional control within a field. For example, the one or more propulsion units may be configured to provide omnidirectional movement within a field via crab steering. In this regard, one or more wheels, tracks, rollers, or the like (e.g., wheels 314a-314d) may be coupled to the one or more support structures 310 such that the one or more wheels 314 may rotate relative to the one or more support structures 310, as shown in FIG. 18B.

Similarly, in another embodiment, the one or more support structures 310 are rotatably and/or pivotally coupled to the support assembly 104 via one or more joints 313a-313d. For example, as shown in FIG. 18F, the one or more support structures 310 may be coupled to the support frame 306 at the one or more joints 313 such that the one or more support structures 310 are orthogonal with respect to the support frame 306 and/or work tool rails 308. Continuing with the same example, and as illustrated in FIG. 18C, the one or more support structures 310 may be configured to pivot/rotate with respect to the support frame 306 at the one or more joints 313 such that the one or more support structures 310 are positioned substantially parallel to the support frame 306 and/or work tool rails 308. It is contemplated herein that the one or more joints 313 and/or the configuration of the field engagement unit 302 illustrated in FIG. 18C may facilitate easy transportation within a shipping container, trailer, and the like. It is further contemplated herein that the field engagement unit 302 may be pulled by a vehicle including, but not limited to, a tractor, a truck, a pickup truck, an all-terrain vehicle (ATV), and the like.

Figure 19:
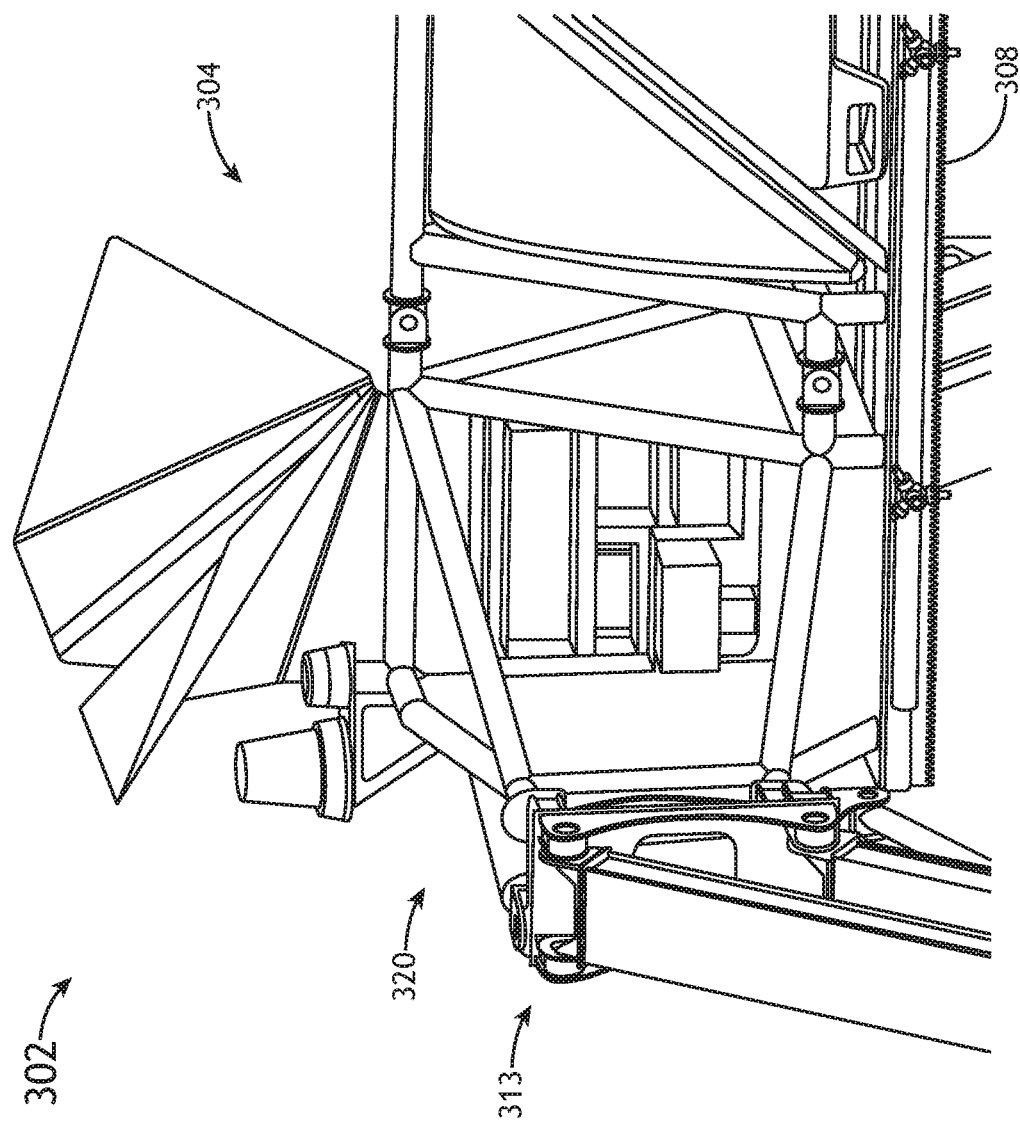
FIG. 19 illustrates an electrical distribution panel of a field engagement unit of a full farming system, in accordance with one or more embodiments of the present disclosure.

FIG. 19 illustrates an electrical distribution panel 320 of a field engagement unit 302 of a full farming system, in accordance with one or more embodiments of the present disclosure.

In one embodiment, the electrical distribution panel 320 may be disposed at a distal end of the support assembly 304. In another embodiment, the electrical distribution panel 320 includes a controller including one or more processors and memory, wherein the one or more processors are configured to carry out program instructions stored in memory, the program instructions configured to cause the one or more processors to carry out various functions of the field engagement unit 302. For example, a memory of the electrical distribution panel 320 may be configured to store pre-programmed paths which the field engagement unit 302 is configured to follow. By way of another example, the program instructions stored in memory may be configured to cause the one or more processors configured to carry out light detection and ranging (LIDAR) for obstacle avoidance as the field engagement unit 302 is moved about a field.

Figure 20:
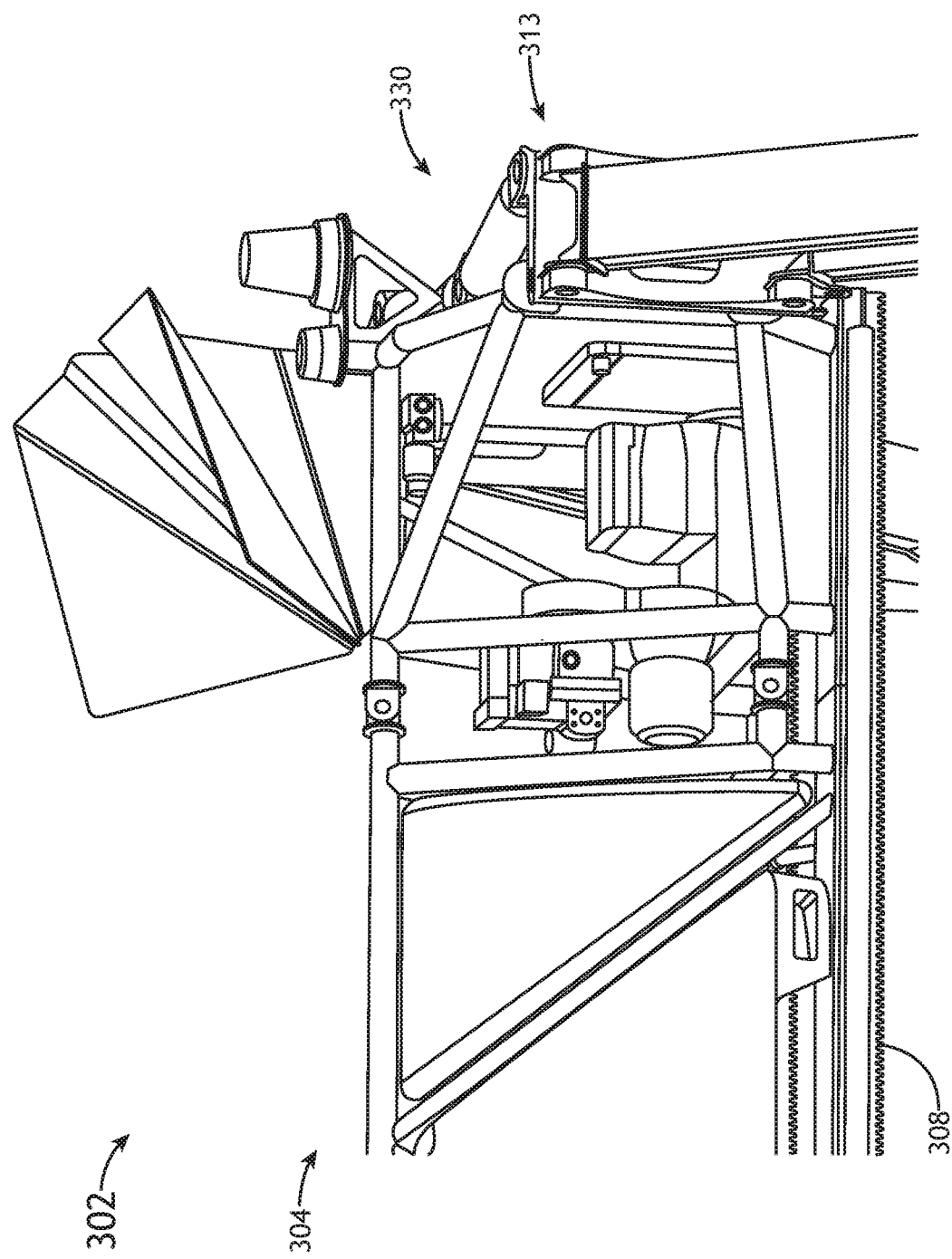
FIG. 20 illustrates a power source of a field engagement unit of a full farming system, in accordance with one or more embodiments of the present disclosure.

FIG. 20 illustrates a power source 330 of a field engagement unit 302 of a full farming system, in accordance with one or more embodiments of the present disclosure. The power source 330 may include any power source known in the art including, but not limited to, a diesel-electric gen set. In another embodiment, the power source 330 may be disposed on an opposite side of the field engagement unit 302 as the electrical distribution panel in order to more evenly distribute weight across the field engagement unit 302. For example, the electrical distribution panel 320 may be disposed at a first distal end of the support assembly 304, and the power source 330 may be disposed at a second distal end of the support assembly 304, wherein the second distal end is opposite the first distal end. It is noted herein, however, that the electrical distribution panel 320 and the power source 330 may be disposed on the support assembly 304 in any manner to evenly distribute weight along the support assembly 304; In this regard, the electrical distribution panel 320 and the power source 330 need not be disposed at distal ends of the support assembly 304. For instance, the electrical distribution panel 320 and the power source 330 may be disposed along the support assembly 304 proximate to locations where the support structures 310 are coupled to the support frame of the support assembly 304. By way of another example, the electrical distribution panel 320 and the power source 330 may be disposed along the support assembly 304 in such a manner as to position the center of gravity of the field engagement unit 302 in a particular location (e.g., along a center line of the support assembly 304, and the like).

Figure 21:
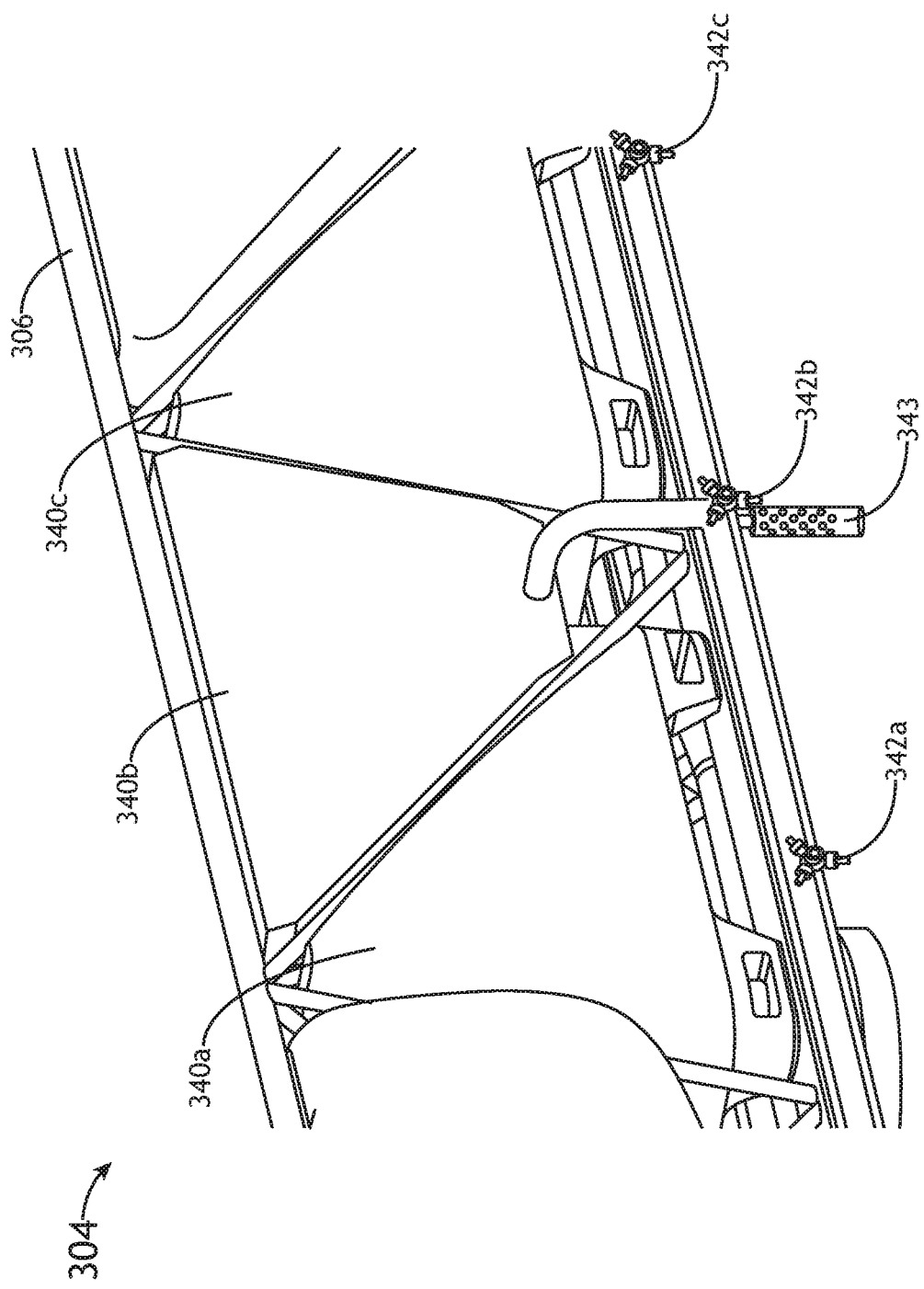
FIG. 21 illustrates material storage containers of a field engagement unit of a full farming system, in accordance with one or more embodiments of the present disclosure.

FIG. 21 illustrates material storage containers 340 of a field engagement unit 302 of a full farming system, in accordance with one or more embodiments of the present disclosure.

In one embodiment, the material storage containers 340a-340c are stored onboard the field engagement unit 302. The storage containers 340 may include, but are not limited to, liquid tanks, liquid mixing tanks, fluidized solids tanks, solid material containers, and the like. For example, the material storage containers 340 may include wedge-shaped containers that are sized and shaped to be reversibly fitted within a support frame of the support assembly 304 of the field engagement unit 302. By way of another example, the material storage containers 340 may include containers of any shape and size known in the art. In another embodiment, the material storage containers 340 may include various tools or equipment. For example, a material storage container 340 may include a central mixing station with one or more agitators or mixing elements configured to mix two or more liquids. In another embodiment, a material storage container 340 may include one or more spraying nozzles 342a, 342b, 342c configured to distribute/apply one or more liquids contained within the material storage containers 340 to one or more regions/areas beneath the support assembly 304. In another embodiment, the one or more material storage containers 340 include one or more drains configured to drain materials from the one or more material storage containers.

Figure 22A:
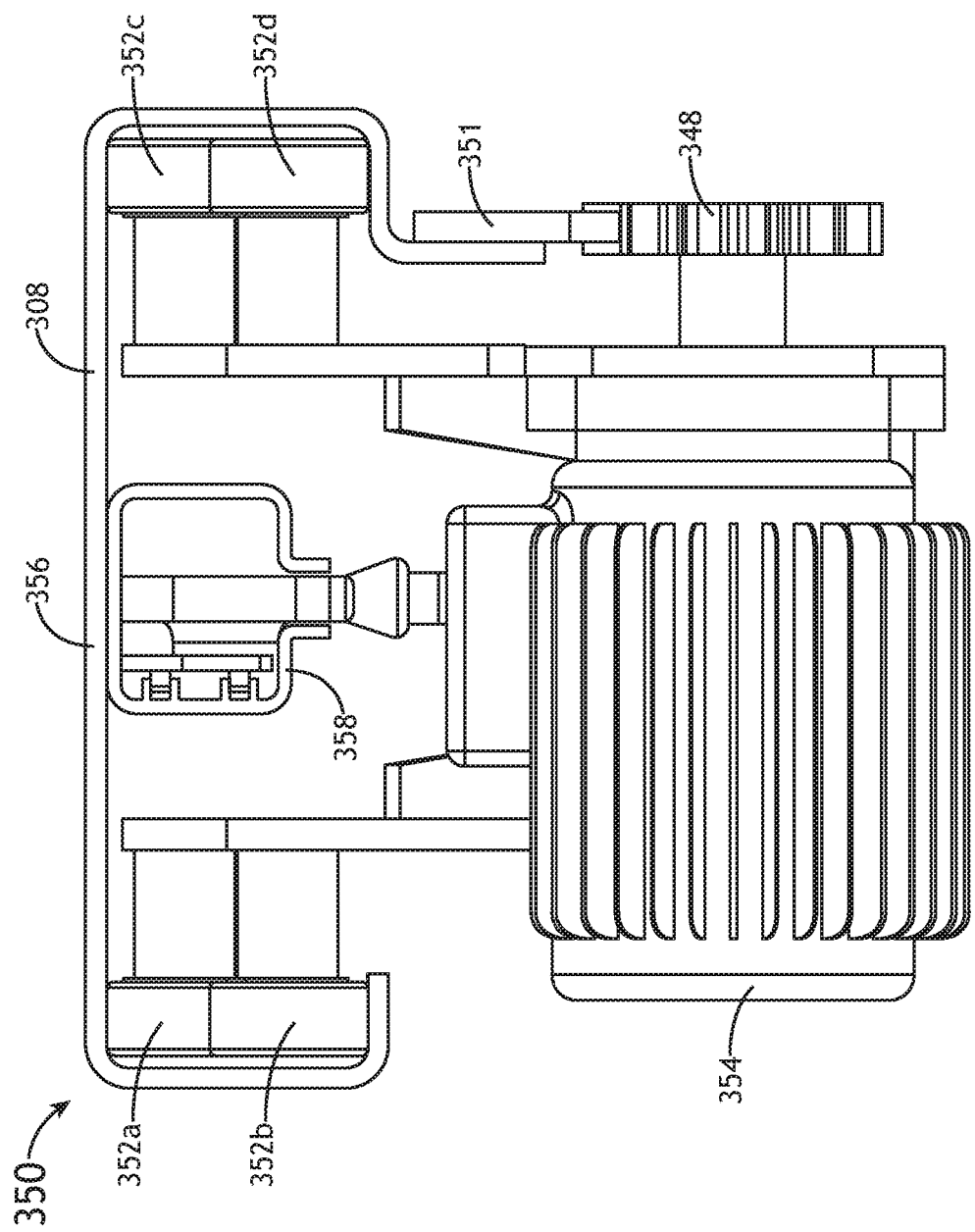
FIGS. 22A-22B illustrate a carriage assembly of a field engagement unit of a full farming system, in accordance with one or more embodiments of the present disclosure.
Figure 22B:
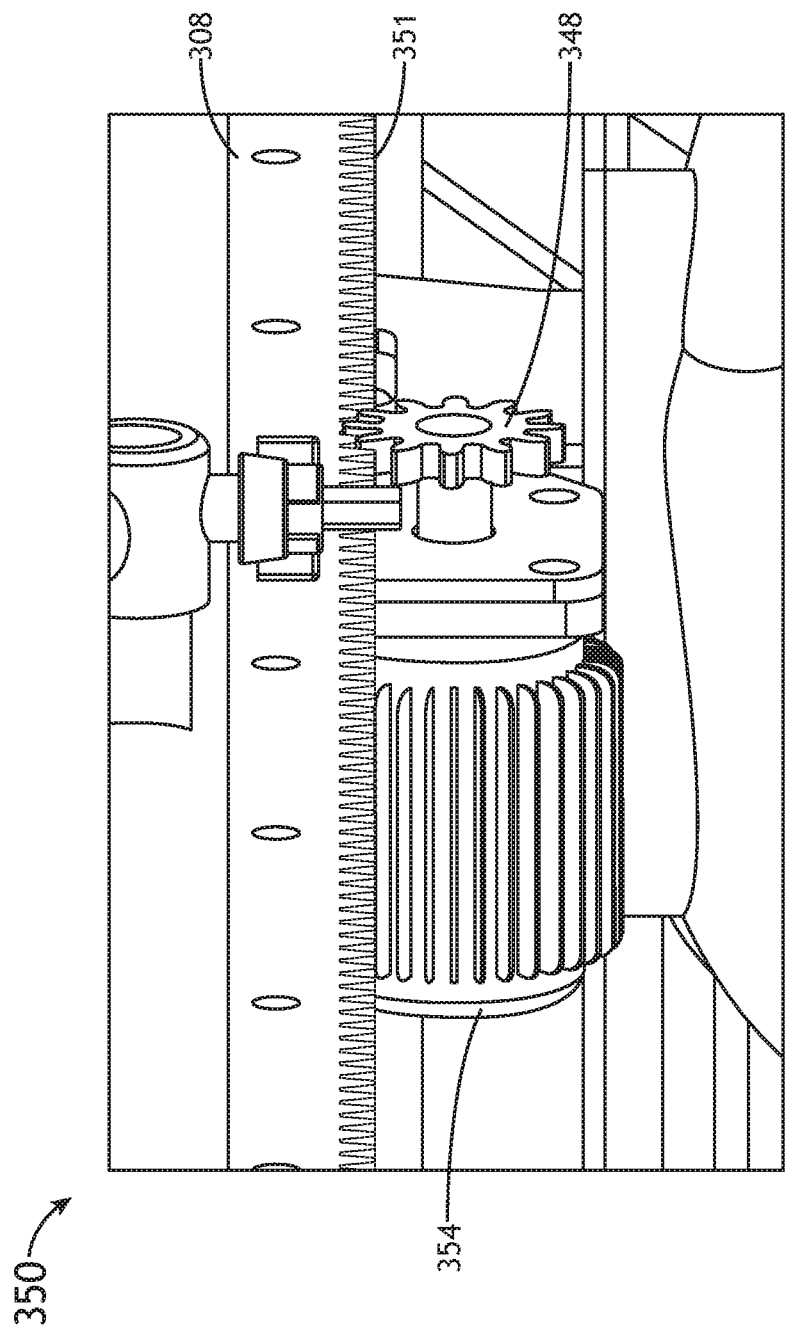

FIGS. 22A-22B illustrate a carriage assembly of a field engagement unit of a full farming system, in accordance with one or more embodiments of the present disclosure. It is noted herein that any discussion associated with the carriage assembly 142 of the gantry assembly 102 depicted in FIGS. 10A-10E may be regarded as applying to the carriage assembly 350 of the field engagement unit 302.

In one embodiment, the one or more carriage assemblies 350 include one or more carriage motors 354. For example, a carriage motor 354 may be configured to drive the pinion 348 such that the pinion 148 may engage the gear rack 351 of the work tool rail 308 and actuate the carriage assembly 350 along the work tool rail 308. The carriage motor 354 may include any motor known in the art including, but not limited to, an electric motor, a gas motor, a diesel motor, and the like.

In one embodiment, the work tool rail 108 may include one or more electrically powered tracks 356 configured to provide electrical power to the one or more carriage motors 354 via a power unit 358. For example, the work tool rail 308 may include an electrically powered track 356. A power unit 358 of the carriage assembly 350 may be configured to electrically couple to the electrically powered track 356 such that it receives electricity from the electrically powered track 356 and provides electricity to the carriage motor 354. Embodiments with an electrically powered track 356 may provide a direct connection from an electrical energy source to the carriage motors 354 along at least a portion of the work tool rail 308 without the use of wires or cables.

It is noted herein that the one or more electrically powered tracks 356 may not be required. For example, the one or more work tool assemblies 314 may additionally and/or alternatively be powered via one or more batteries, rechargeable batteries, replaceable/interchangeable batteries, and the like.

While embodiments of the present disclosure are directed to autonomous, nearly autonomous, or semi-autonomous functionality, it is noted herein that the one or more embodiments of the present disclosure may instead be user-operated. Additionally, it is noted herein that any of the one or more embodiments of the present disclosure may instead be operated by a self-propelled machine.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device-detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively, or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively, or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled//implemented/translated/converted into a high-level descriptor language (e.g., initially implementing described technologies in C, C++, python, Ruby on Rails, Java, PHP, .NET, or Node.js programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although a user is described herein as a single figure, those skilled in the art will appreciate that the user may be representative of a human user, a robotic user (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B.

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed:

1. A livestock management system, comprising:
    a gantry assembly comprising:
        a support assembly including one or more work tool rails and one or more support structures;
        one or more propulsion units coupled to the one or more support structures of the support assembly, the one or more propulsion units disposed on one or more support rails within a livestock facility and configured to provide movement of the support assembly along the one or more support rails; and
        one or more work tool assemblies actuatable along the one or more work tool rails so to provide one or more work tool attachments of the one or more work tool assemblies selective access to one or more regions located beneath the support assembly; and
    a controller configured to:
        actuate the support assembly to a selected position along the one or more support rails via the one or more propulsion units; and
        actuate the one or more work tool assemblies to a selected position along the one or more work tool rails via one or more carriage assemblies.
2. The livestock management system of claim 1, wherein the controller is further configured to
    generate one or more control signals configured to cause the one or more work tool attachments of the one or more work tool assemblies to interact with one or more objects beneath the support frame within the livestock facility.
3. The livestock management system of claim 1, wherein the one or more carriage assemblies comprise:
    one or more rollers configured to engage one or more tracks of the one or more work tool rails;
    a carriage motor; and
    a pinion coupled the motor, the pinion configured to engage a gear rack of the work tool rail.
4. The livestock management system of claim 1,
    wherein the one or more work tool rails include at least one electrical conductor bar, wherein the one or more carriage assemblies include one or more power units electrically coupled to the at least one electrical conductor bar and configured to provide electric power to a carriage motor.
5. The livestock management system of claim 1, wherein the one or more work tool attachments comprise at least one of:
    a power washer attachment, a camera attachment, a vaccination tool attachment, a temperature probe attachment, a wind speed sensor attachment, a physical weighing tool attachment, an animal corralling tool attachment, or a feeding attachment.
6. The livestock management system of claim 1, wherein the controller is further configured to receive data collected by the one or more work tool attachments and transmit the received data to at least one of a server or a remote controller.
7. The livestock management system of claim 1, wherein the gantry assembly further comprises a hose reel coupled to the support assembly, the hose reel configured to store one or more supply lines.
8. The livestock management system of claim 7, wherein the one or more supply lines comprise at least one of a liquid hose, a compressed air hose, or an electric power line.
9. The livestock management system of claim 7, wherein the controller is further configured to rotate the hose reel as the support assembly is actuated along the one or more support rails.
10. The livestock management system of claim 7, wherein the one or more supply lines are coupled to the one or more work tool assemblies via a festoon system along the support assembly.
11. A livestock management system, comprising:
    a plurality of gantry assemblies, wherein the plurality of gantry assemblies each comprise:
        a support assembly including one or more work tool rails and one or more support structures;
        one or more propulsion units coupled to the one or more support structures of the support assembly, the one or more propulsion units disposed on one or more support rails of a livestock facility and configured to provide movement of the support assembly along the one or more support rails; and
        one or more work tool assemblies actuatable along the one or more work tool rails so to provide one or more work tool attachments of the one or more work tool assemblies selective access to one or more regions located beneath the one or more work tool rails;
    a controller configured to:
        actuate the gantry assembly to a selected position along the one or more support rails via the one or more propulsion units; and
        actuate the one or more work tool assemblies to a selected position along the one or more work tool rails via one or more carriage assemblies; and
    a server communicatively coupled to each controller of the plurality of gantry assemblies, the server configured to cause the controller of two or more gantry assemblies to coordinate one or more actions of two or more of the plurality of gantry assemblies.

12. The livestock management system of claim 11, wherein the controller is further configured to generate one or more control signals configured to cause the one or more work tool attachments of the one or more work tool assemblies to interact with one or more objects beneath the support frame.

13. The livestock management system of claim 11, wherein the one or more carriage assemblies comprise:
one or more rollers configured to engage one or more tracks of the one or more work tool rails;
a carriage motor; and
a pinion coupled the motor, the pinion configured to engage a gear rack of the work tool rail.

14. The livestock management system of claim 11,
wherein the one or more work tool rails include at least one electrically powered track, wherein the one or more carriage assemblies include one or more power units electrically coupled to the at least one electrically powered track and configured to provide electric power to a carriage motor.

15. The livestock management system of claim 11, wherein the one or more work tool attachments comprise at least one of:
a power washer attachment, a camera attachment, a vaccination tool attachment, a temperature probe attachment, a wind speed sensor attachment, a physical weighing tool attachment, an animal corralling tool attachment, or a feeding attachment.

16. The livestock management system of claim 11, wherein the controller is further configured to receive data collected by the one or more work tool attachments and transmit the received data to at least one of a server or a remote controller.

17. The livestock management system of claim 11, wherein the gantry assembly further comprises a hose reel coupled to the support assembly, the hose reel configured to store one or more supply lines.

18. The livestock management system of claim 17, wherein the one or more supply lines comprise at least one of a liquid hose, a compressed air hose, or an electric power line.

19. The livestock management system of claim 17, wherein the controller is further configured to rotate the hose reel in concurrence with actuating the support assembly along the one or more support rails.

20. The livestock management system of claim 17, wherein the one or more supply lines are coupled to the one or more work tool assemblies via a festoon system along the support assembly.

21. The livestock management system of claim 11, further comprising a transfer rail configured to couple a first work tool rail of a first gantry assembly to an additional work tool rail of an additional gantry assembly, the transitional member configured to allow actuation of a work tool assembly between the first work tool rail and the additional work tool rail.

22. The livestock management system of claim 11, further comprising one or more product drop tubes configured to direct agricultural products from one or more feed tubes to one or more regions beneath at least one support assembly of the plurality of gantry assemblies.

23. The livestock management system of claim 22, wherein at least one product drop tube of the one or more product drop tubes includes a deflection portion, wherein the at least one product drop tube is configured to deflect at the deflection portion in order to allow the at least one support assembly to move between the one or more feed tubes and the one or more regions beneath the at least one support assembly.

24. The livestock management system of claim 11, wherein a first controller of a first gantry assembly is configured to transmit data to an additional controller of an additional gantry assembly.

25. The livestock management system of claim 11, further comprising an gantry assembly storage area, wherein the plurality of gantry assemblies are configured to be actuated along the one or more support rails into the gantry assembly storage area for storage.

26. A farming system comprising:
a field engagement unit comprising:
a support assembly comprising one or more work tool rails and one or more support structures;
one or more propulsion units coupled to the one or more support structures configured to provide directional control of the field engagement unit;
one or more work tool assemblies actuatable along the one or more work tool rails so to provide one or more work tool attachments of the one or more work tool assemblies selective access to one or more regions located beneath the support frame; and
a local controller, wherein the local controller includes one or more processors configured to execute a set of program instructions stored in memory, wherein the program instructions are configured to cause the one or more processors to control a position of the one or more work tool assemblies along the one or more work tool rails so to actuate the one or more work tool assemblies to a selected position along the support assembly.

27. The farming system of claim 26, wherein the one or more work tool assemblies are actuatable along the one or more work tool rails via one or more carriage assemblies.

28. The farming system of claim 27, wherein the one or more carriage assemblies comprise:
one or more rollers configured to engage one or more tracks of the one or more work tool rails;
a carriage motor; and
a pinion coupled the motor, the pinion configured to engage a gear rack of the work tool rail.

29. The farming system of claim 26, wherein the one or more support structures include one or more sets of one or more hinges configured to adjust a height of the field engagement unit.

30. The farming system of claim 26, wherein the one or more support structures are pivotally coupled to the support frame via one or more joints.

31. The farming system of claim 26, further comprising one or more material storage containers.

32. The farming system of claim 31, wherein at least one material storage container of the one or more material storage containers comprises a mixing station including one or more mixing elements.

33. The farming system of claim 26, further comprising a power source, wherein the local controller is included within an electrical distribution panel disposed at a first end of the support assembly, and wherein the power source is disposed at a second end of the support assembly opposite the first end.

34. The farming system of claim 26, wherein the program instructions are further configured to cause the one or more work tool attachments of the one or more work tool assemblies to interact with one or more objects beneath the support frame.

\* \* \* \* \*